United States Patent [19]

Naito et al.

[11] Patent Number: 5,153,680
[45] Date of Patent: Oct. 6, 1992

[54] ORGANIC DYE THIN FILM AND ORGANIC THIN FILM ELEMENT
[75] Inventors: Katsuyuki Naito; Syun Egusa; Nobuhiro Gemma, all of Yokohama, Japan
[73] Assignee: Kabushiki Kaisha Toshiba, Kawasaki, Japan
[21] Appl. No.: 316,186
[22] Filed: Feb. 27, 1989
[30] Foreign Application Priority Data Mar. 2, 1988 [JP] Japan .................................. 63-48891
Dec. 20, 1988 [JP] Japan ................................ 63-319582

[51] Int. Cl.[5] .......................................... H01L 29/28
[52] U.S. Cl. .......................................... 357/8; 357/30; 365/106; 365/153; 369/284; 369/100; 430/495; 430/270; 430/945
[58] Field of Search .................... 357/8, 6, 30 L, 30 R; 359/245, 273; 365/106, 153; 369/284, 288, 100; 430/495, 270, 945; 264/298; 427/434.3

[56] References Cited
U.S. PATENT DOCUMENTS 4,819,210  4/1989  Miura et al. ......................... 369/284
4,871,236  10/1989  Gemma et al. ..................... 359/273

FOREIGN PATENT DOCUMENTS 110717  6/1984  European Pat. Off. .
203780  12/1986  European Pat. Off. .
238759  9/1987  European Pat. Off. .
61-37862  2/1986  Japan .
62-222669  9/1987  Japan ..................... 357/8

OTHER PUBLICATIONS

Raudel-Teixier, A. et al., "Langmuir-Blodgett Films of Pure Porphyrins," *Thin Solid Films*, 99 (1983), pp. 33-40.
Wilson, E. G. "Principles of a Three-Dimensional Molecular Electronic Memory" *Electronics Letters*, Mar. 31, 1983, pp. 237-238.
Nakahara et al., *Thin Solid Films*, vol. 133, pp. 1-10, (1985).
Thin Solid Films, vol. 132, pp. 33-39; C. D. Fung & G. L. Larkins; Oct. 1986.
Liebigs Ann. Chem., pp. 802-815 (1983); J. H. Fuhrhop & H. Bartsch, May 1983.
Journal of Molecular Electronics, vol. 2, pp. 119-124; R. M. Metzger et al., Sep. 1986.
Thin Solid Films, vol. 134, pp. 195-199; A. Barrand et al., Dec. 1985.

*Primary Examiner*—Andrew J. James
*Assistant Examiner*—Sara W. Crane
*Attorney, Agent, or Firm*—Oblon, Spivak, McClelland, Maier & Neustadt

[57] ABSTRACT

An organic thin film formed of molecules of at least one dye compound selected from the compounds represented by the following general formulae:

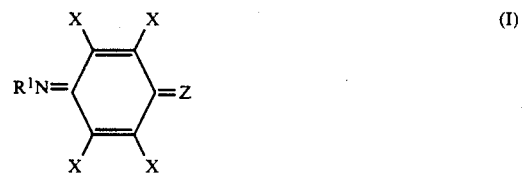

(I)

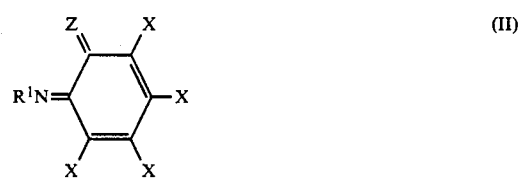

(II)

wherein X is a hydrogen atom, a methyl group, or a halogen atom, $R^1$ is an electron attractive group substituted with a hydrophobic group having 12 or more carbon atoms, Z is either $=O$ or $=NR^2$, and $R^2$ is an electron attractive group or an electron attractive group substituted with an organic group having 1 to 50 carbon atoms; and

R—(DS)    (III)

where R is an organic hydrophobic group having terminated with two long chain alkyl groups or an organic hydrophobic group having a steroid carbon skeleton, and DS is a dyestuff group having a dye skeleton of tetracyanoquino dimethane, N, N'-dicyanoquinonediimine, N-cyanoquinoneimine, benzoquinone, pheylenediamine, tetrathiafulvalne, tetraselenavalene, ferrocene, phthalocyanine, or porphyrin.

14 Claims, 32 Drawing Sheets

F I G. 16
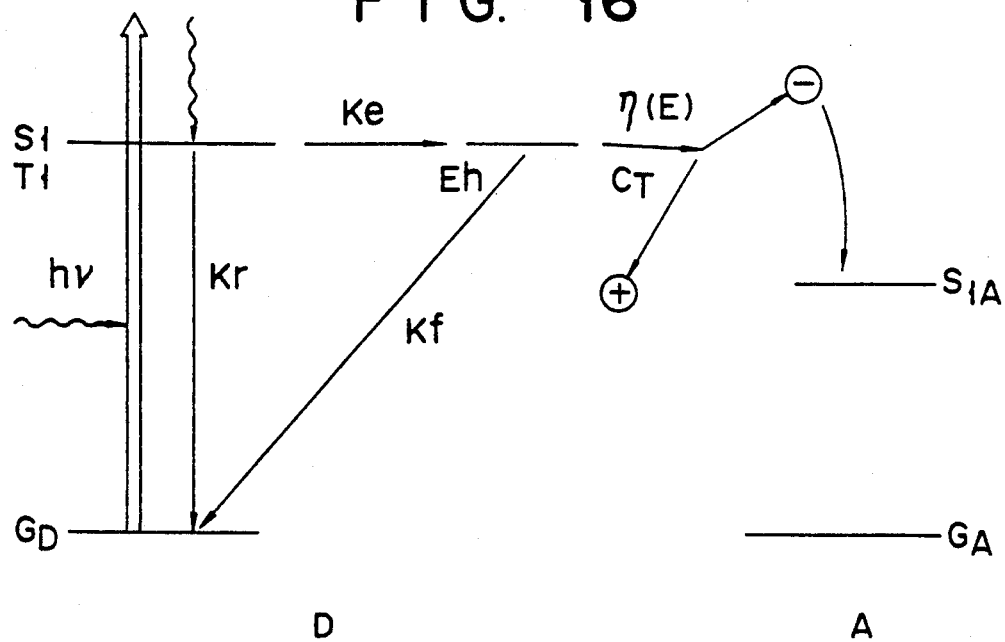
F I G. 17
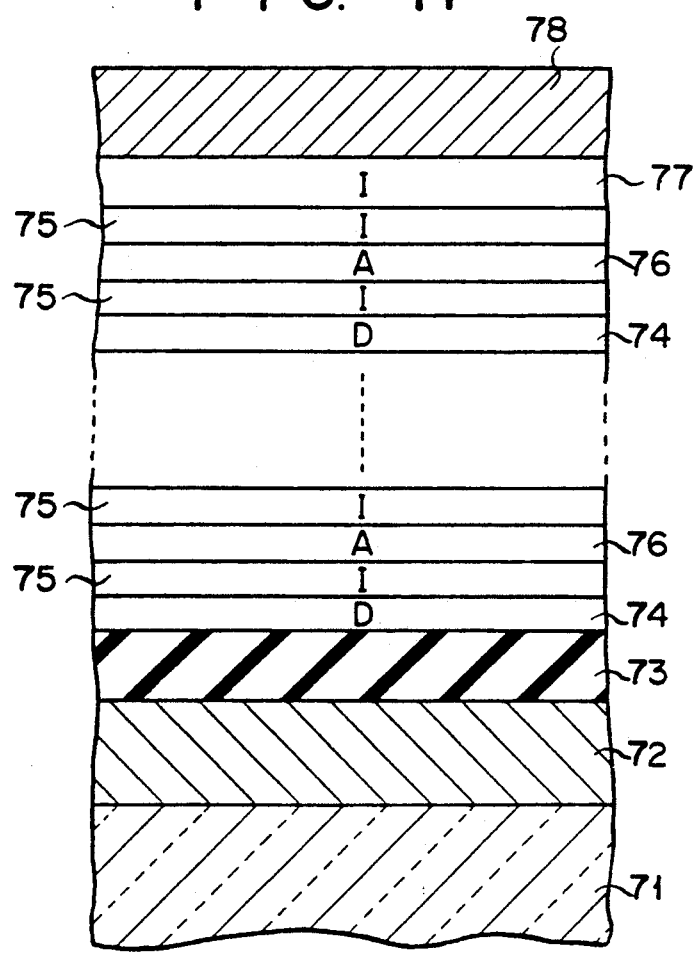

(D)　(I)　(A1)　(A2)

(D1)　(D2)　(I)　(A)

(D1) (D2) (A)

(D1) (D2) (A)

F I G. 27
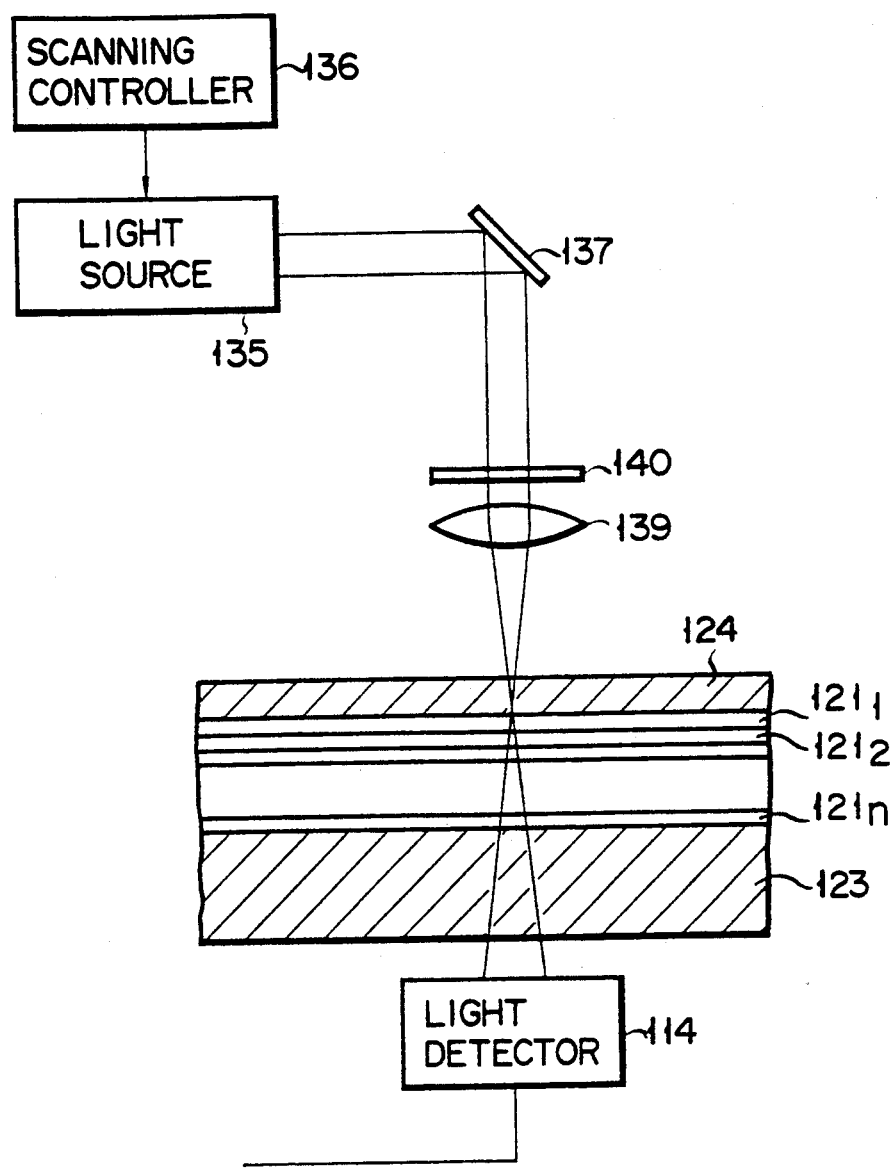

F I G. 28
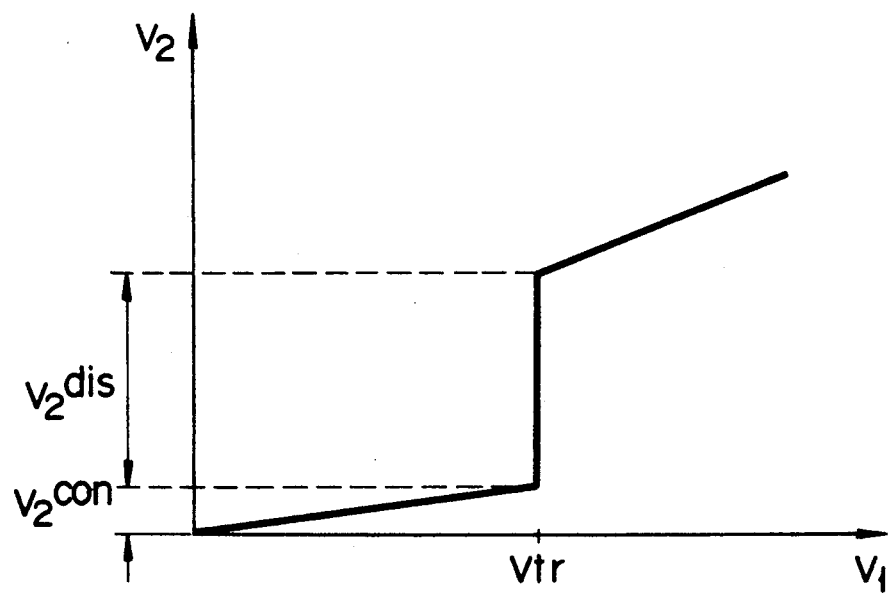

F I G. 36
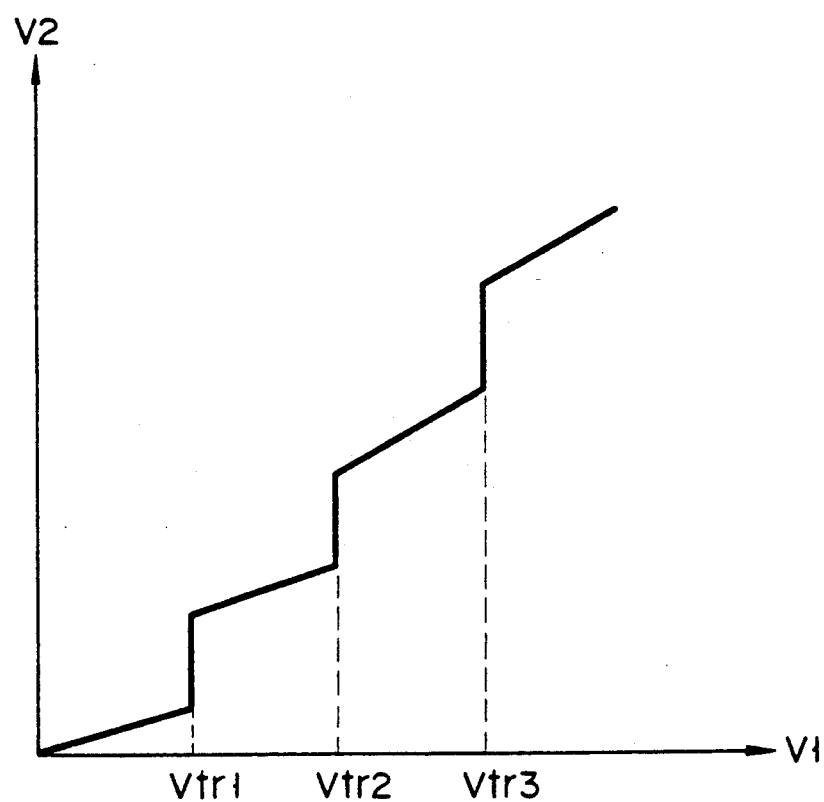

F I G. 53
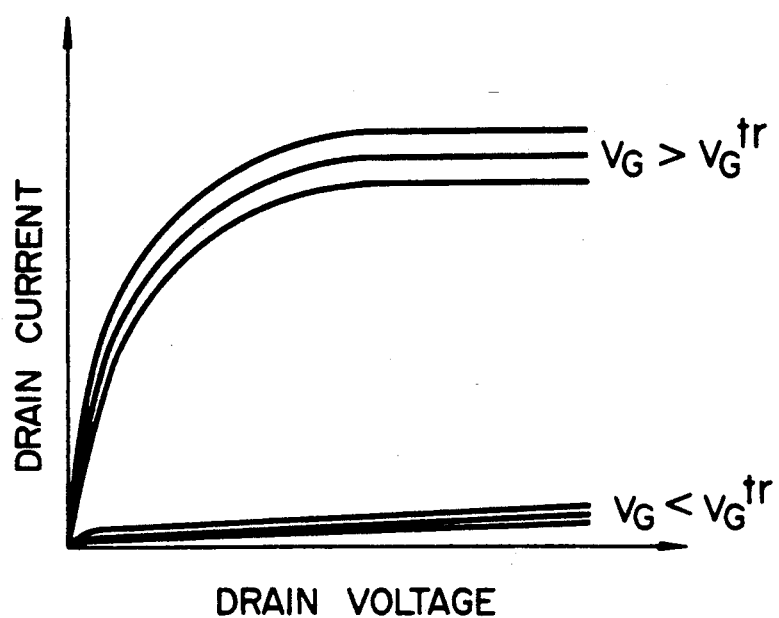
F I G. 54
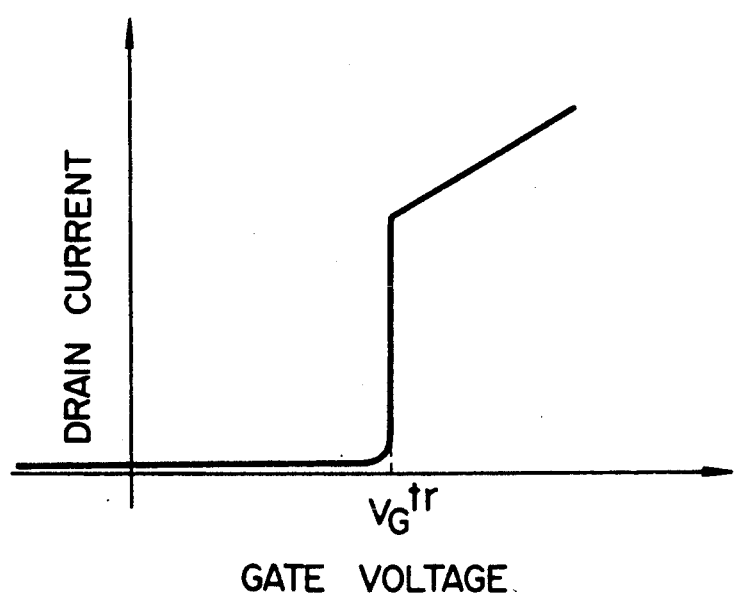

ORGANIC DYE THIN FILM AND ORGANIC THIN FILM ELEMENT

BACKGROUND OF THE INVENTION

The present invention relates to Langmuir-Blodgett thin film made of organic material having dye skeletons, and also to an organic thin film element having the Langmuir-Blodgett thin film.

Researches have been conducted in many places on various devices having elements having organic thin films, a typical example of which is Langmuir-Blodgett thin film. Such devices are disclosed in, for example, Japanese Patent Disclosure No. 52-35587, Japanese Patent Disclosure No. 55-17505, Japanese Patent Disclosure No. 57-196143, Patent Disclosure No. 60-239739, Japanese Patent Disclosure No. 61-37891.

The inventors hereof have invented organic thin film elements containing donor molecules or acceptor molecules, and methods of manufacturing these elements, these elements and methods are disclosed in Japanese Patent Disclosure No. 62-65477, Japanese Patent Disclosure No. 62-76551, etc. These elements use LB film containing dye molecules.

A number of reports have been published which relate to LB film containing dye skeletons. Dye alone can scarcely form a thin film. It is difficult to form uniform film since the dye skeletons firmly associate with each other and have great cohesion. Due to the great cohesion of the dye skeletons, film made of these skeletons will undergo three-dimensional crystallization, or will have excessive viscosity, even if it is developed on the surface of water.

Cohesion of the dye skeletons can be reduced by introducing bulky hydrophobic radicals into the dye skeletons. When the dye skeletons have their mutual cohesion thus reduced, stable monomolecular film can be formed on the surface of water with high efficiency. To provide material having dye skeletons having small mutual cohesion, dye molecules have been synthesized, each having one long alkyl group. In most cases, however, these dye molecules cannot form, by themselves, stable monomolecular films, failing to provide uniform LB films on the surface of water.

Generally, a long chain aliphatic acid is mixed with dye molecules, thereby forming a stable monomolecular film. This method inevitably reduces the concentration of the dye. Nor does it guarantee a uniform mixing of the dye molecules and the long chain aliphatic acid. To make matters worse, it is impossible with this method to strictly control the structure of the film to be manufactured.

Hitherto, dye molecules and matrix molecules of long chain aliphatic acids such as arachidic acid are mixed, and LB films are formed of the resultant mixture on a substrate. It is generally difficult to mix two kinds of molecules thoroughly. In some cases, the molecules of the first kind form a domain, and the molecules of the second kind form another domain, either domain being tens to hundreds of micrometers in size. This tendency is pointed out in H. Moehwald, "Thin Solid Films," Vol. 159, p. 1, 1988. Such domains, if formed, are not so much problematic, provided that the elements made having such LB film are relatively large. They give rise to a great problem, however, to the desired high integration density of electronic devices.

The condition in which the components of such LB film changes with time in some cases, as is discussed by Hamaguchi, Nishiyama, Fujihira in their report published by Electrochemical Society of Japan, 1986, p. 76, D123. The changes in the mixing condition may result in the instability of operating characteristics of the elements using the LB film.

Various kinds of dye molecules have been synthesized which have dye skeletons, each having two long alkyl groups. Of these kinds of dye molecules, many can form, by themselves, stable monomolecular films on the surface of water, as is disclosed in Nakahara, Fukuda, and Satoh, "Thin Solid Films," Vol. 133, 1985, p 1. In many cases, however, it is difficult to introduce two long alkyl groups to a dye skeleton, by the existing chemical synthesis techniques. A dye molecule having a dye skeleton and two alkyl groups linked to the skeleton by means of ester linkages which is readily hydrolyzable is known (e.g., a dye molecule having a dye skeleton and phospho-lipids bonded to the skeleton). In some cases, hydrolyzable linkage may be cleaved in the process of synthesizing dye skeletons, or in the process of coupling long alkyl groups to the dye skeletons.

Dye molecules which can function as acceptors cannot be so easily synthesized as dye molecules which can function as donors. It is difficult to control the degree to which these dye molecules can function as acceptors.

SUMMARY OF THE INVENTION

Accordingly, an object of the present invention is to provide organic thin films made of dye compound molecules which can be easily synthesized and which can form LB films by themselves.

Another object of the invention is to provide an organic dye thin film element comprising such an organic thin film as a functional constituent.

According to the present invention there is provided organic thin film comprising molecules of at least one dye compound selected from the group consisting of compounds which are represented by the following general formulae:

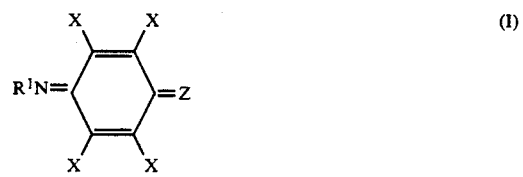

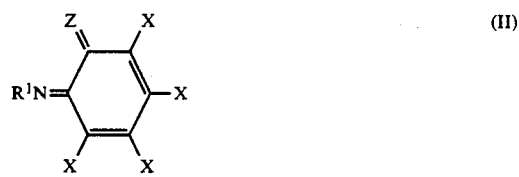

where X is a hydrogen atom, a methyl group, or a halogen atom, $R^1$ is an electron attractive group substituted with a hydrophobic group having 12 or more carbon atoms, Z is either $=O$ or $=NR^2$, and $R^2$ is an electron attractive group or an electron attractive group substituted with an organic group having 1 to 50 carbon atoms; and

where R is an organic hydrophobic group terminated with two long chain alkyl groups or an organic hydrophobic group having a steroid carbon skeleton, and DS is a dyestuff group having a dye skeleton of tetracyanoquinodimethane, N, N'-dicyanoquinonediimine, N-cyanoquinoneimine, benzoquinone, phenylenediamine, tetrathiafulvalene, tetraselenafulvalene, ferrocene, phthalocyanine, or porphyrin.

The organic thin film element according to the preinvention comprises the organic thin film described above, and includes a display element, a memory element, a field-effect transistor, a rectifying element, and a multi-value element.

BRIEF DESCRIPTION OF THE DRAWINGS

FIGS. 14 to 27 are views for illustrating organic thin film recording devices;

FIGS. 28 to 46 are views for illustrating organic thin film FET's;

FIGS. 49 to 56 are view for illustrating devices obtained in Examples of the invention.

DETAILED DESCRIPTION OF THE PREFERRED EMBODIMENTS

Figure 1:
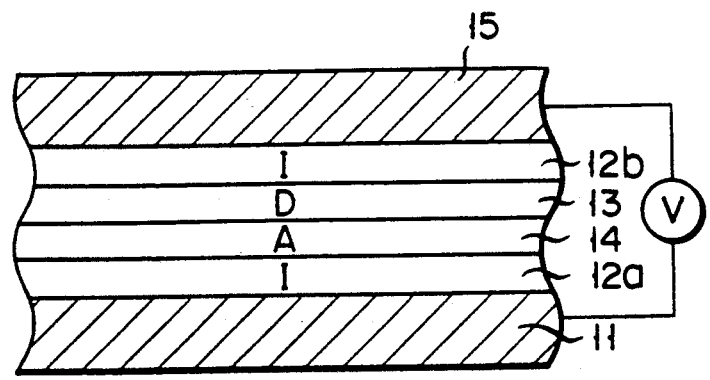
FIGS. 1 to 13 are views for illustrating organic thin film display elements.

As has been described, the dye compound forming the organic thin film according to the invention is selected from the group consisting of the compounds represented by the following general formulae:

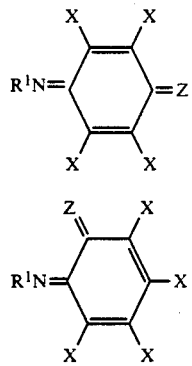

where X is a hydrogen atom, a methyl group, or a halogen atom, $R^1$ is an electron attractive group substituted with a hydrophobic group having 12 or more carbon atoms, Z is either =O or =$NR^2$, and $R^2$ is an electron attractive group or an electron attractive group substituted with an organic group having 1 to 50 carbon atoms; and

R—(DS)  (III)

where R is an organic hydrophobic group having terminated with two long chain alkyl groups or an organic hydrophobic group having a steroid carbon skeleton, and DS is a dyestuff group having a dye skeleton of tetracyanoquino dimethane, N, N'-dicyanoquinonediimine, N-cyanoquinoneimine, benzoquinone, pheylenediamine, tetrathiafulvalne, tetraselenafulvalene, ferrocene, phthalocyanine, or porphyrin.

Further, use can be made of a mixture of these dye compounds.

In the general formulae (I) and (II), X is a hydrogen atom, a methyl group, or halogen (e.g., chlorine or fluorine).

In the general formulae (I) and (II), $R^1$ is an electron attractive group substituted with a hydrophobic group having 12 or more carbon atoms. The electron attractive group includes carbonyl group, sulfonyl group, and oxycarbonyl group. The hydrophobic group, which substitutes for the electron attractive group and has 12 or more carbon atoms (usually, 100 carbon atoms at most), should preferably be a non-hydrolyzable one. Such a preferable hydrophobic group includes alkyl groups (preferably, forked alkyl groups i.e., alkyl groups having a straight chain moiety bonded to the electron attractive group and terminated with two long-chain branches), aryl groups, substituted aryl groups (e.g., di-(long alkyloxy) substituted phenyl groups), steroid groups (i.e., a group having a sterol carbon skeleton), aklylamino group (particularly, dialkylamino group having two long alkyl groups bonded to the amino nitrogen).

In the general formulae (I) and (II), Z is either =O or =$NR^2$; $R^2$ is either an electron attractive group or an electron attractive group substituted with an organic group having 1 to 50 carbon atoms. The electron attractive group can be not only carbonyl group, sulfonyl group, or oxycarbonyl group as in $R^1$, but also include cyano group or nitro group. The group containing such an electron attractive group can be acyl group (alkylcarbonyl group), alkyloxycarbonyl group, alkylsulfonyl group, or aminosulfonyl alkylsulfonyl group (—$SO_2$—Alkyl—$SO_2$—$NH_2$).

The dye compound represented by the general formula (I) can be classified into a p-quinonediimine compound and a p-quinoneimine compound which are respectively represented by the following formulae:

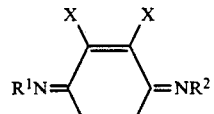

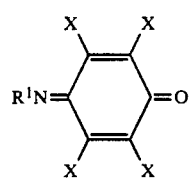

Either dye compound represented by the general formula (I) is an electron-accepting compound (i.e., acceptor).

The degree to which quinonediimine compound of the formula I-a can accept electrons varies in accordance with the kind of the electron attractive group which is directly bonded to the two nitrogen atoms of the dye skeleton

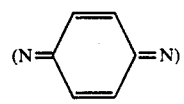

of this compound. For instance, any compound of the formula I-a wherein the substituent group X is an halogen atom, accepts electrons more readily than a compound, wherein the substituent group X is a hydrogen atom. P-quinonediimine compound of formula I-a can easily be synthesize by oxidation (or dehydrogenation) of the corresponding p-phenylenediamine derivatives:

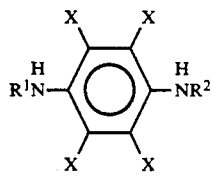

by using lead tetraacetate. These derivatives can also easily be synthesized from the corresponding amines and acid chlorides through a well known elimination of hydrogen chloride. The oxidation and the HCl elimination can be performed in an organic solvent, unlike in the preparation of other dyes which function as acceptors. Neither reaction is hindered in spite of the presence of hydrophobic substituent groups such as long alkyl groups or steroid skeletons.

Similarly, the degree to which quinoneimine compound of the formula I-b can accept electrons varies in accordance with the kind of the electron attractive group which is directly bonded to the nitrogen atom of the dye skeleton

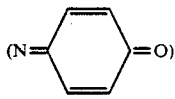

of this compound. Any compound of the I-b wherein the substituent group X is an halogen atom, accepts electrons more readily than a compound, wherein the substituent group X is a hydrogen atom. P-quinoneimine compound of formula I-b can easily be synthesize by oxidation (or dehydrogenation) of the corresponding p-aminophenol derivatives:

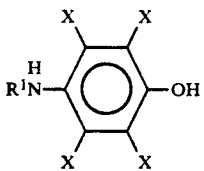

by using lead tetraacetate. These derivatives can also easily be synthesized from the p-aminophenols and acid chlorides through elimination of hydrogen chloride, which is known per se. The oxidation and the HCl elimination can be performed in an organic solvent, unlike in the preparation of other dyes which function as acceptors. Neither reaction is hindered, in spite of the presence of hydrophobic substituent groups such as long alkyl groups or steroid skeletons.

The dye compound represented by the general formula (II) can be classified into a o-quinonediimine compound and a o-quinoneimine compound which are respectively represented by the following formulae:

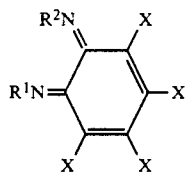

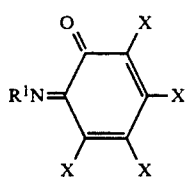

Either dye compound represented by the general formula (II) is an electron-accepting compound (i.e., acceptor).

The degree to which quinonediimine compound of the formula II-a can accept electrons varies in accordance with the kind of the electron attractive group which is directly bonded to the two nitrogen atoms of the dye skeleton

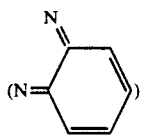

of this compound. For instance, any compound of the formula II-a wherein the substituent group X is an halogen atom, accepts electrons more readily than a compound, wherein the substituent group X is a hydrogen atom. O-quinonediimine compound of formula II-a can easily be synthesize by oxidation (or dehydrogenation) of the corresponding p-phenylenediamine derivatives:

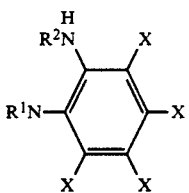

by using lead tetraacetate. These derivatives can also easily be synthesized from the corresponding amines and acid chlorides through a well known elimination of hydrogen chloride. The oxidation and the HCl elimination can be performed in an organic solvent, unlike in the preparation of other dyes which function as acceptors. Neither reaction is hindered in spite of the presence of hydrophobic substituent groups such as long alkyl groups or steroid skeletons.

Similarly, the degree to which quinoneimine compound of the formula II-b can accept electrons varies in accordance with the kind of the electron attractive group which is directly bonded to the nitrogen atom of the dye skeleton

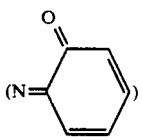

of this compound. Any compound of the formula I-b wherein the substituent group X is an halogen atom, accepts electrons more readily than a compound, wherein the substituent group X is a hydrogen atom. O-quinoneimine compound of formula II-b can easily be synthesize by oxidation (or dehydrogenation) of the corresponding o-aminophenol derivatives:

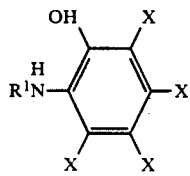

by using lead tetraacetate. These derivatives can also easily be synthesized from the o-aminophenols and acid chlorides through elimination of hydrogen chloride, which is known per se. The oxidation and the HCl elimination can be performed in an organic solvent, unlike in the preparation of other dyes which function as acceptors. Neither reaction is hindered, in spite of the presence of hydrophobic substituent groups such as long alkyl groups or steroid skeletons.

In the general formula (III), DS is a dyestuff group having a dye skeleton of tetracyanoquino dimethane, N, N'-dicyanoquinonediimine, N-cyanoquinoneimine, benzoquinone, pheylenediamine, tetrathiafulvalene, tetraselenafulvalene, ferrocene, phthalocyanine, or porphyrin. The tetracyano dimethane dye skeleton is represented by the following formula:

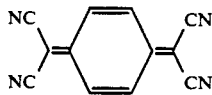

The dye skeleton of N, N'-dicyanoquinonediimine is represented by the following formula:

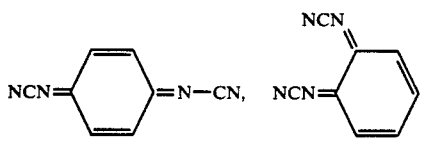

The dye skeleton of N-cyanoquinoneimine is represented by the following formula:

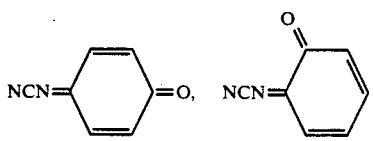

The dye skeleton of benzoquinone is identified with the following formula:

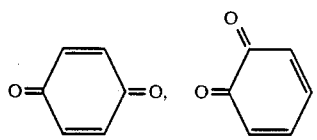

The dye skeleton of phenylenediamine is represented by the following formula:

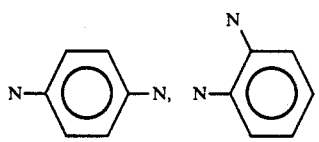

The dye skeleton of tetrathiafulvalene is identified with the following formula:

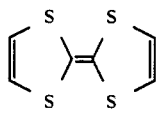

The dye skeleton of tetraselenafulvalene is represented with the following formula:

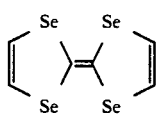

The dye skeleton of ferrocene is identified with the following formula:

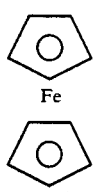

The dye skeleton of phthalocyanine is identified with the following formula:

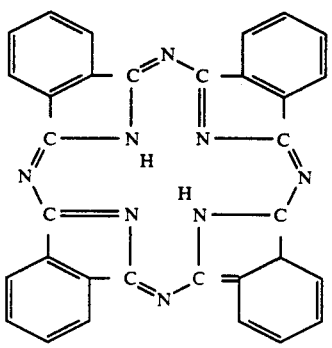

The dye skeleton of porphyrin is represented by the following formula:

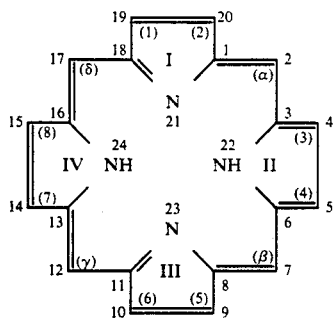

R is a hydrophobic group having two long chain alkyl groups one end, or a hydrophobic group containing a steroid carbon skeleton. It is desirable that these hydrophobic groups have at least 12 carbon atoms, and preferably 100 carbon atoms at most. The alkyl groups or the steroid carbon skeleton can be bonded through carbonyl groups to the dye skeleton.

Of the dye compounds represented by the general formula (III), those having the skeletons of teyracyanoquinonedimethane (preferred), N, N'-dicyanoquinonediimine (preferred), N-cyanoquinoneimine, or benzoquinone are electron accepting (acceptors). By contrast, the compounds having the skeletons of phenylenediamine, tetrathiafulvalene, tetraselenafulvalene, ferrocene, or phthalocyanine, of porphyrin donate electrons (donors). All compounds identified with the general formula (III) can be easily synthesized as will be understood from the following description of the embodiments. Compounds are known, each consisting of the dye skeleton DS which is a component of the molecule represented by the formula (III), and a single-chain alkyl group which is bonded to the dye skeleton. However, no dye molecules are known, each of which consists of the dye skeleton DS and double-chain alkyl group or a hydrophobic group containing a steroid carbon skeleton.

As p-quinonediimine compounds represented by the general formula (I-a), the following can be exemplified:

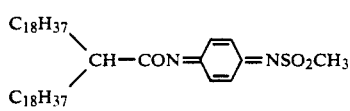

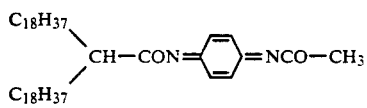

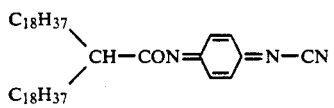

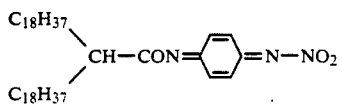

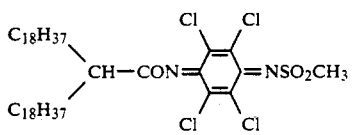

-continued

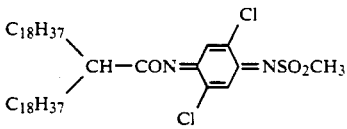

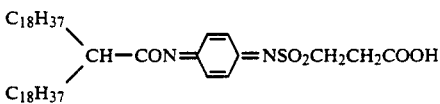

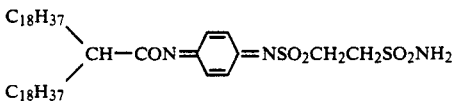

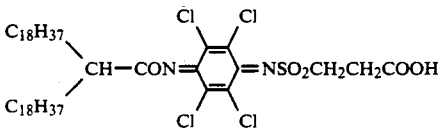

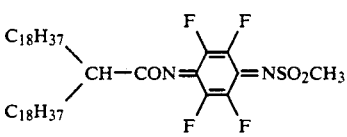

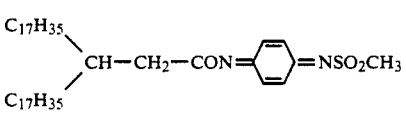

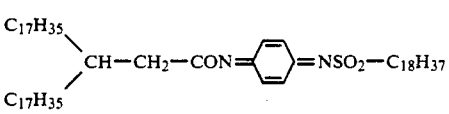

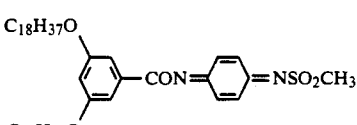

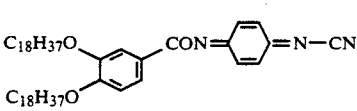

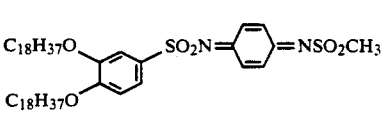

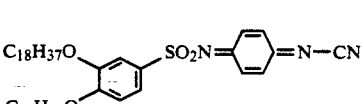

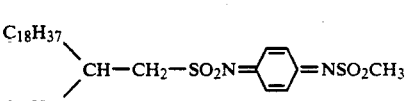

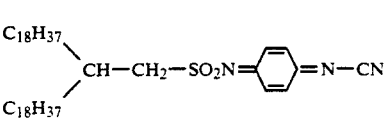

-continued
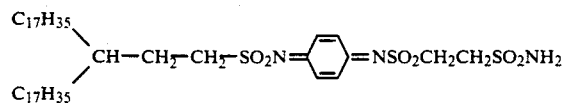
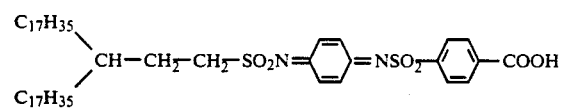
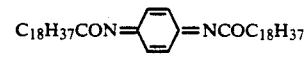
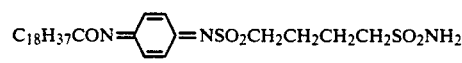
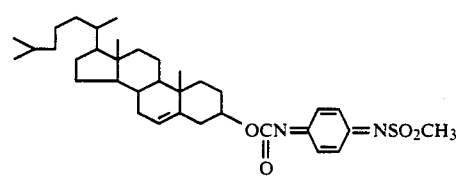
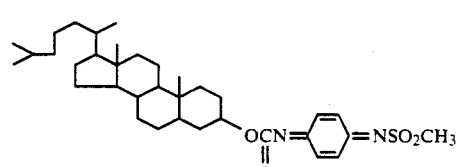
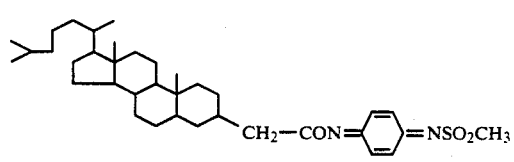
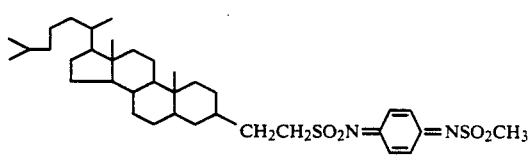
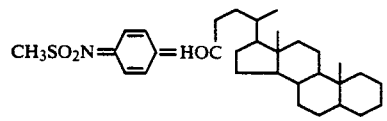
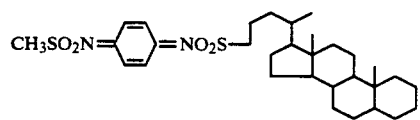
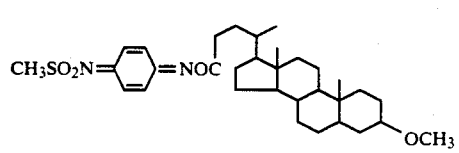
-continued
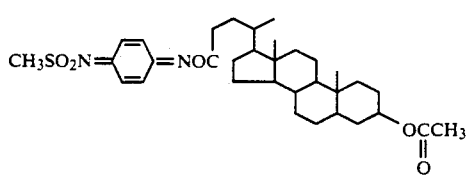
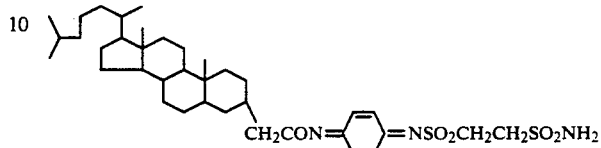
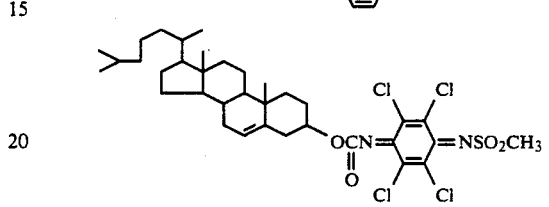
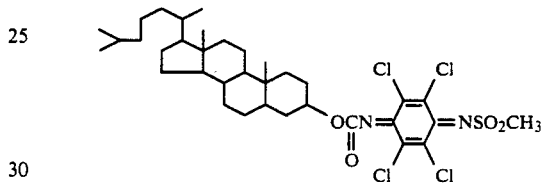
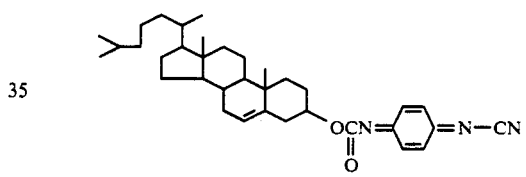
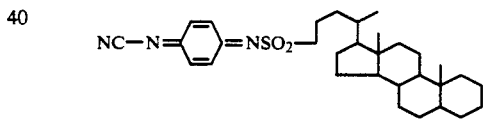
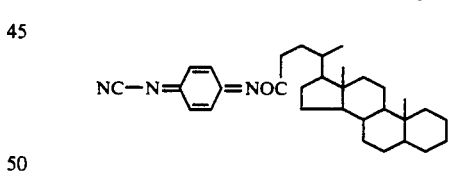
As p-quinoneimine compounds represented by the general formula (I-b), the following can be exemplified:
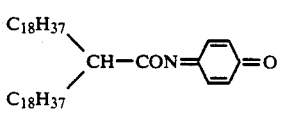
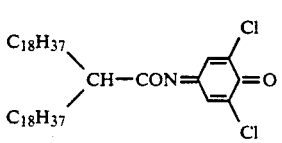

-continued
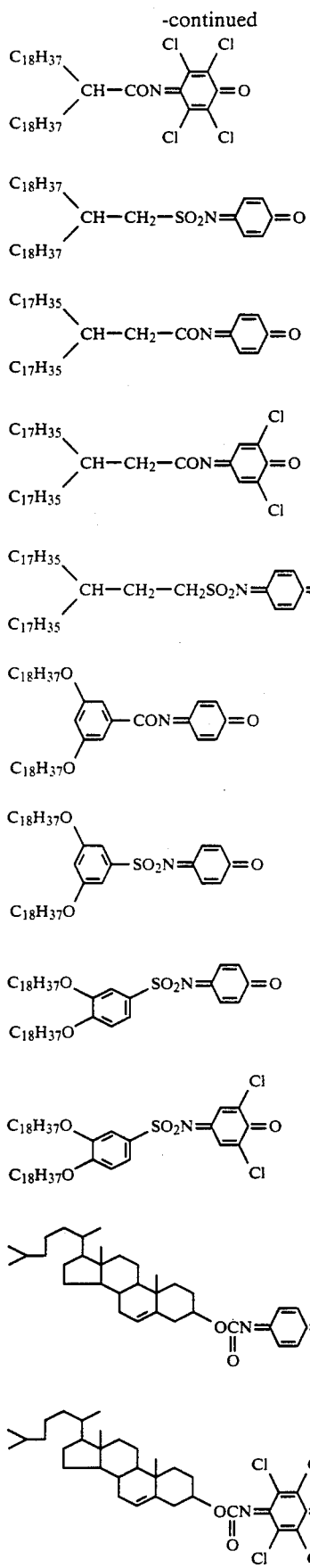
-continued
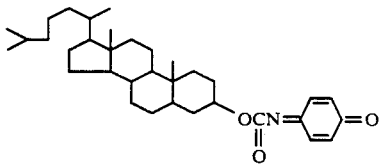
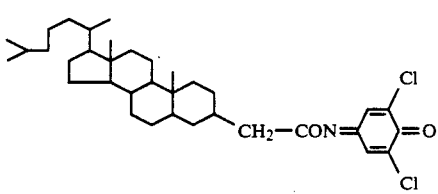
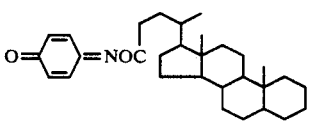
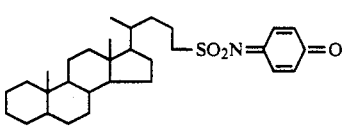
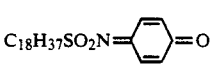
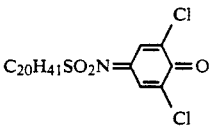
As o-quinonediimine compounds represented by the general formula (II-a), the following can be exemplified:
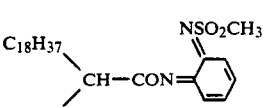
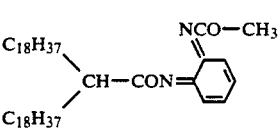
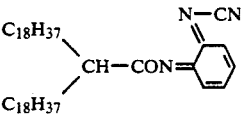
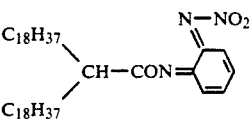

-continued
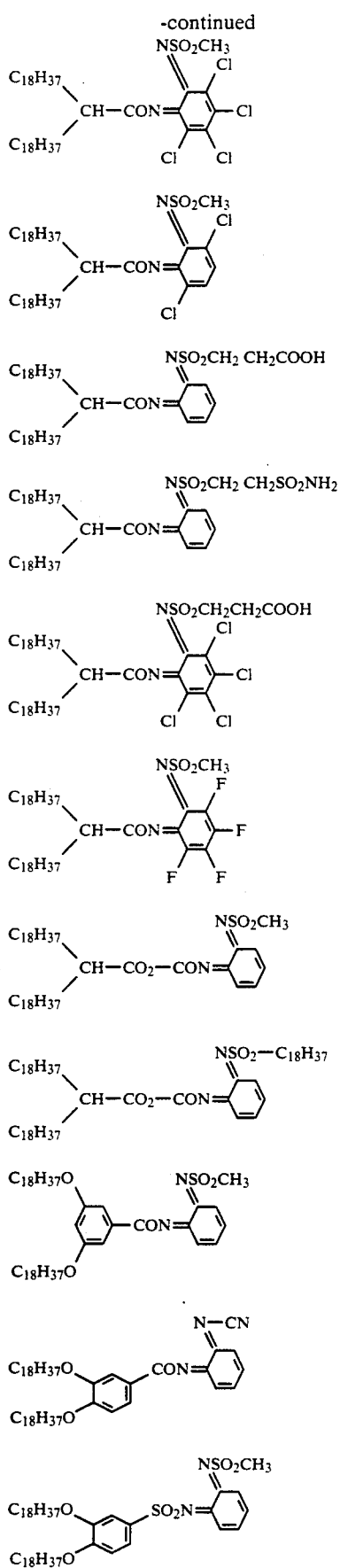
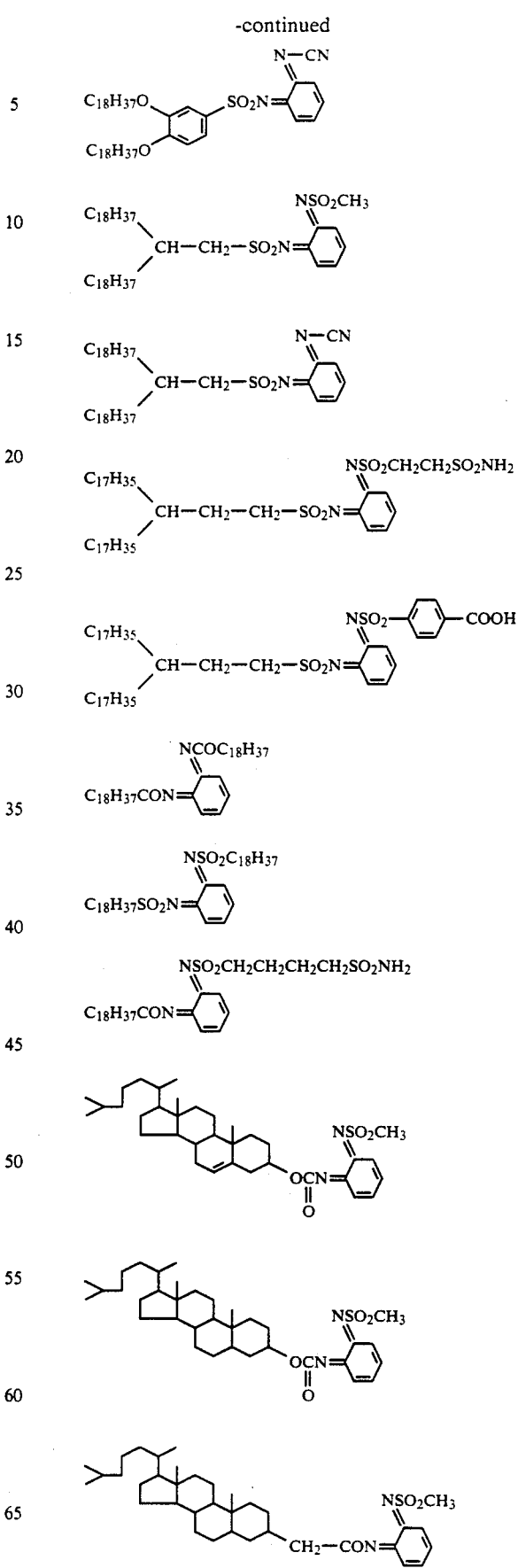

-continued
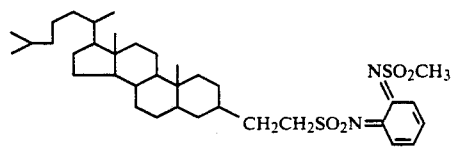
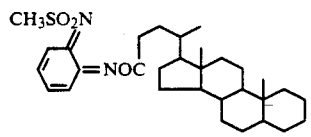
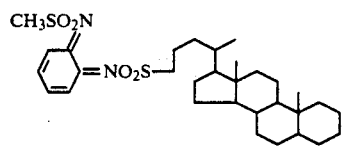
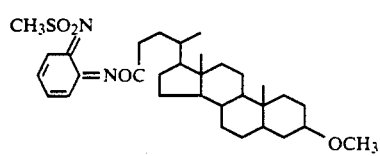
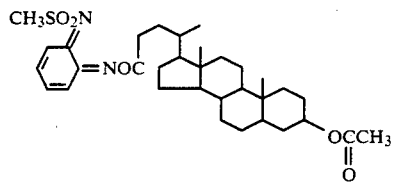
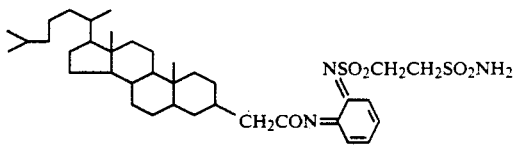
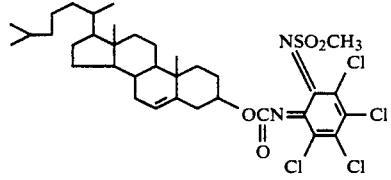
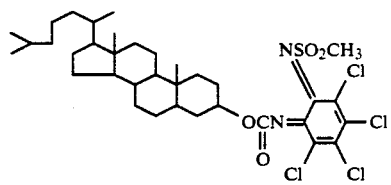
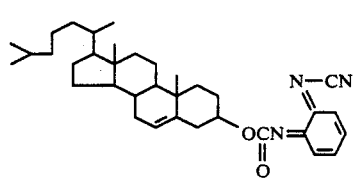
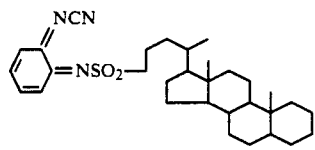
-continued
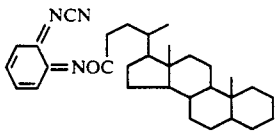
As o-quinoneimine compounds represented by the general formula (II-b), the following can be exemplified:
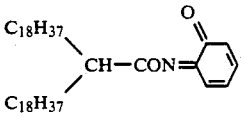
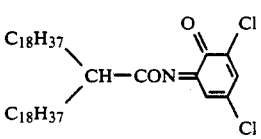
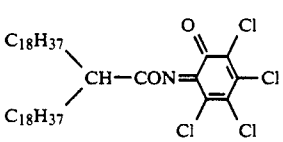
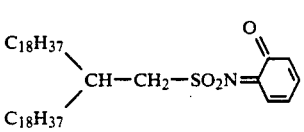
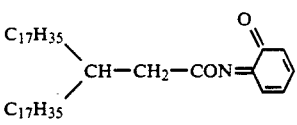
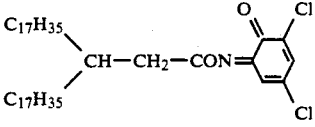
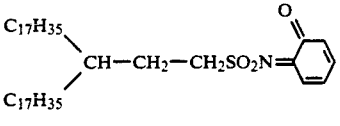
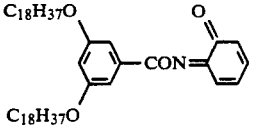
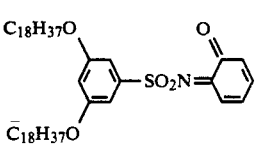
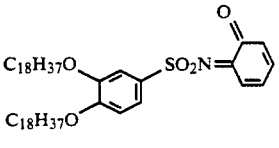

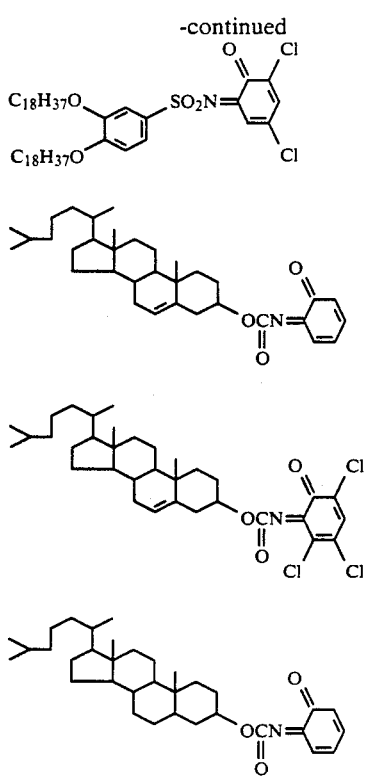
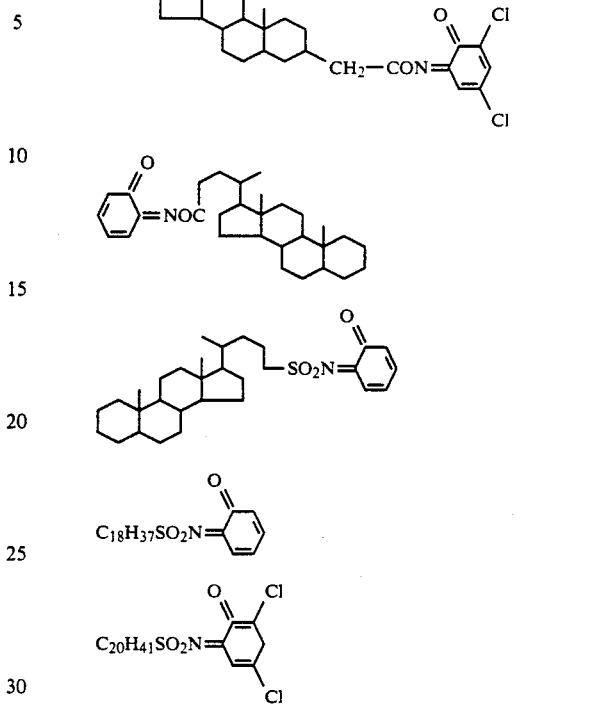
As compounds represented by the general formula (III), the following can be exemplified:
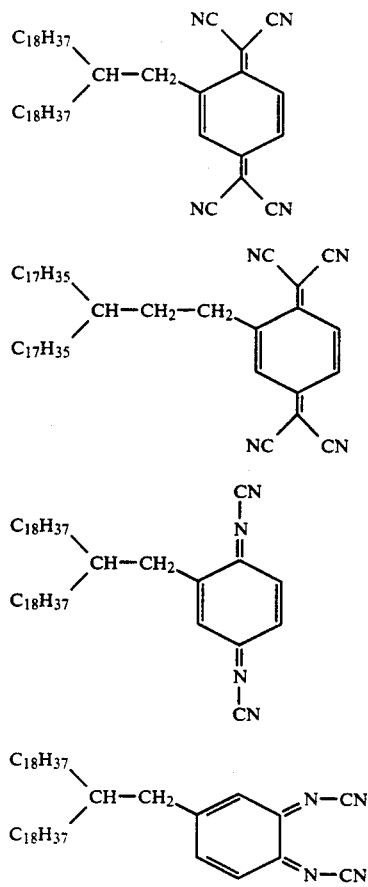

-continued
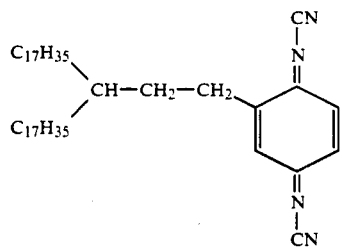
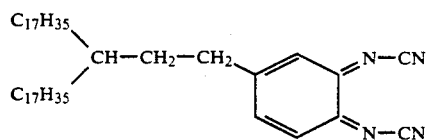
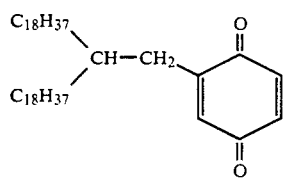
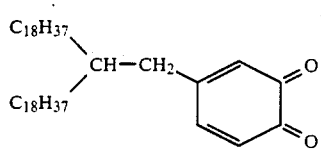
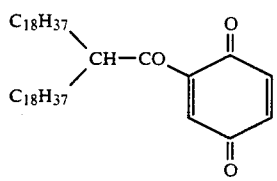
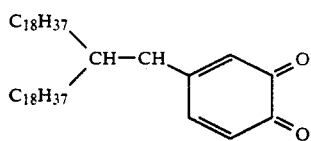
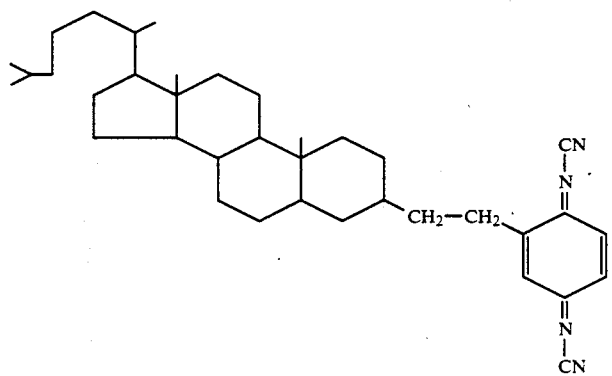

-continued
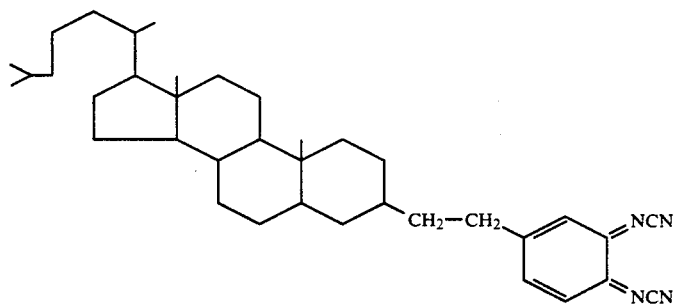
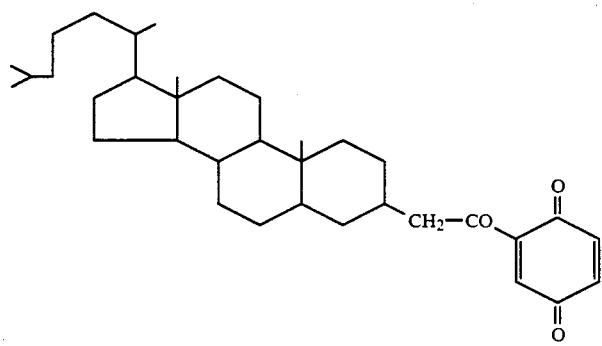
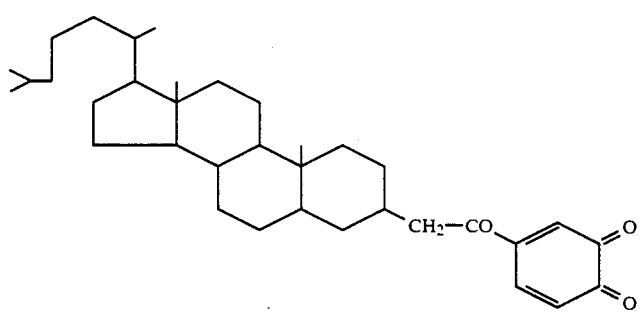
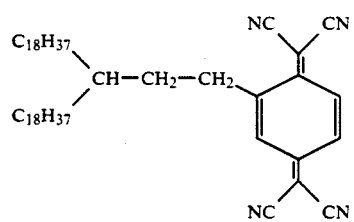
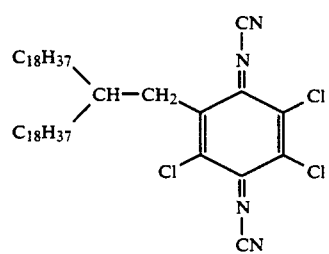
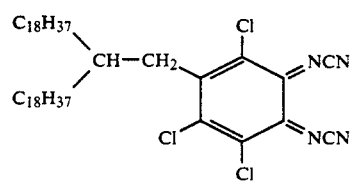

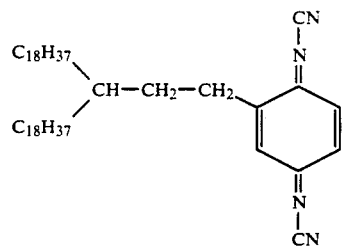
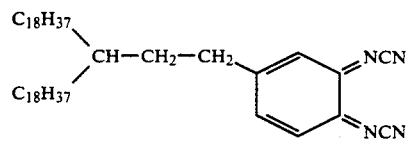
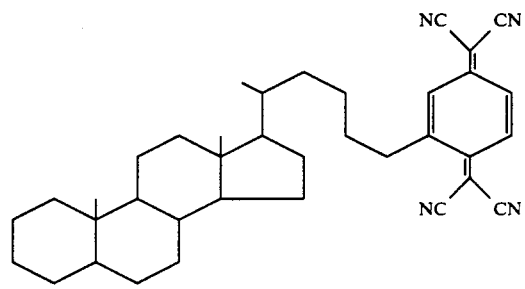
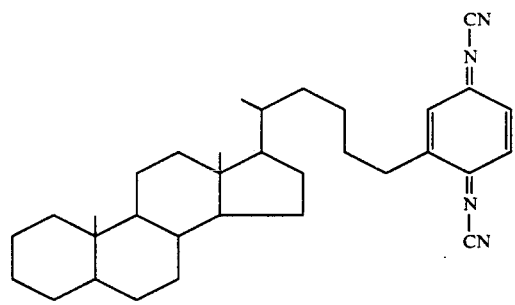
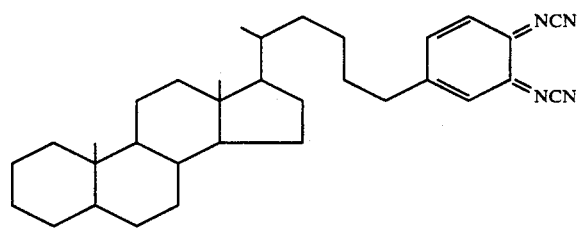
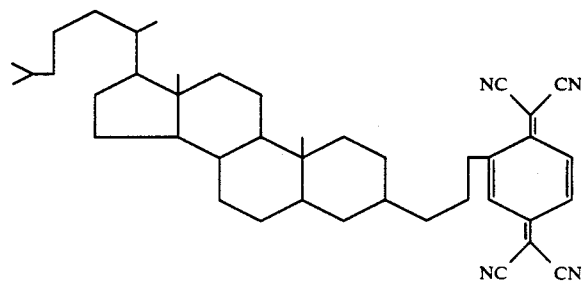

-continued
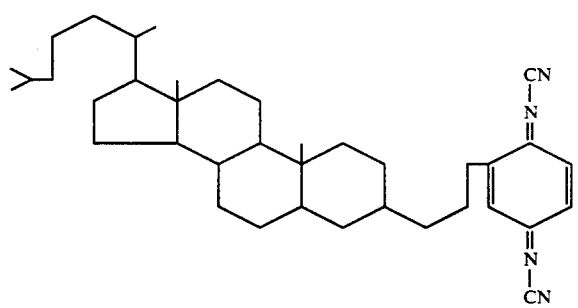
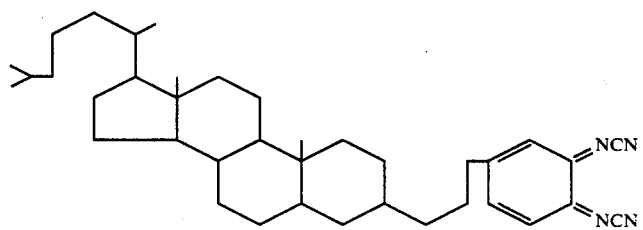
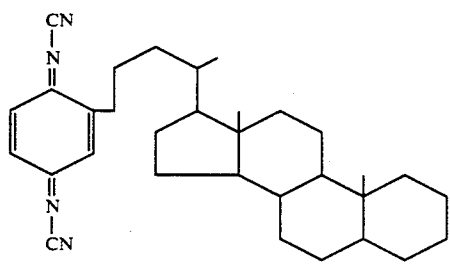
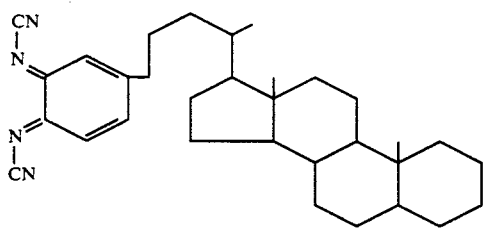
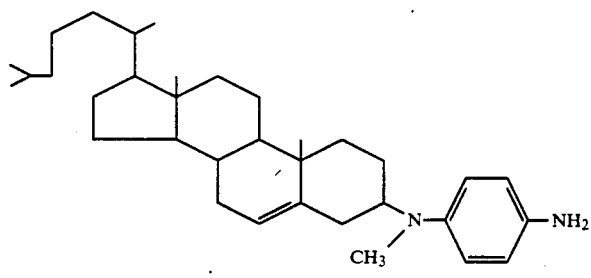
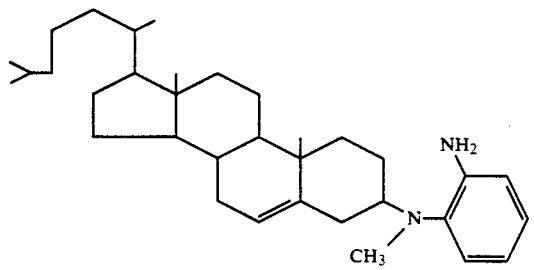

-continued
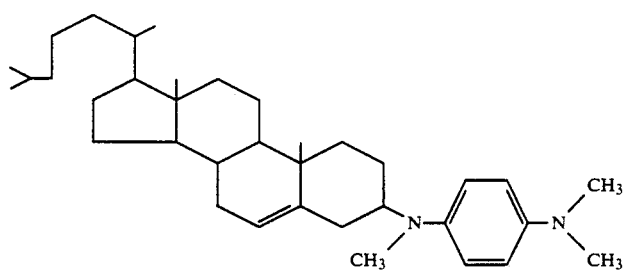
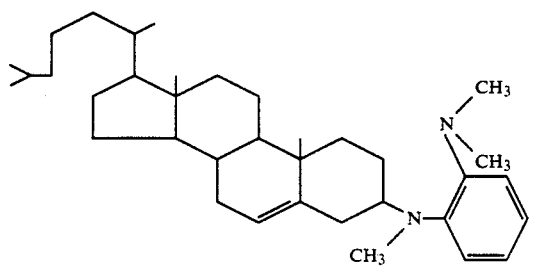
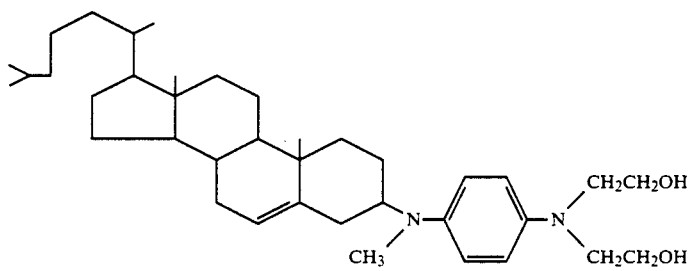
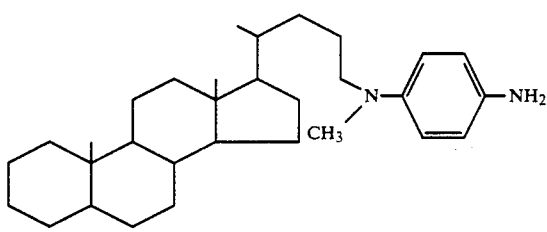
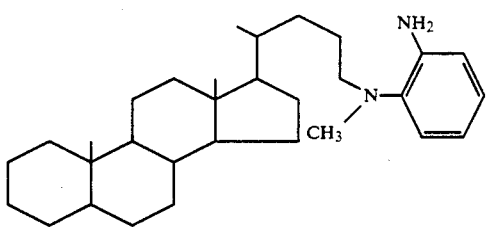
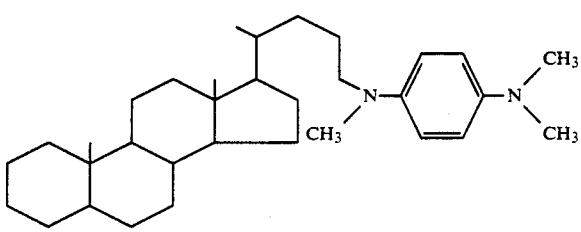

-continued
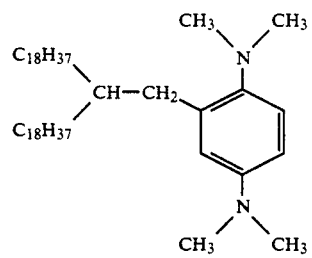
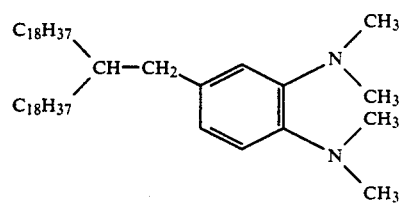
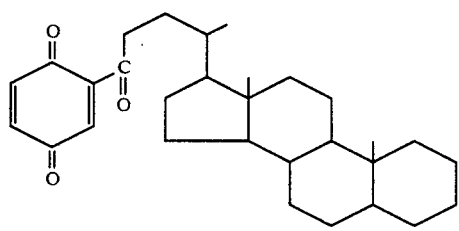
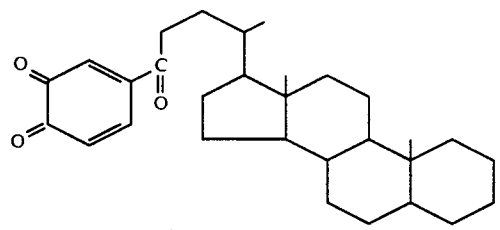
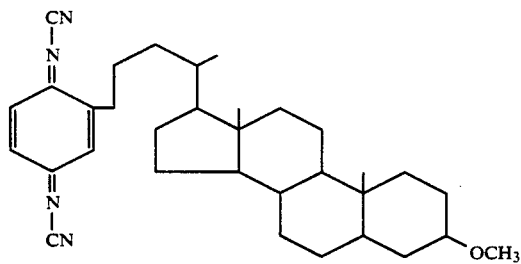
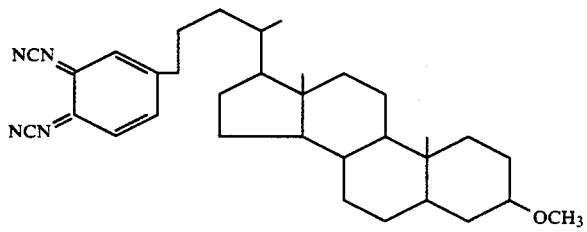
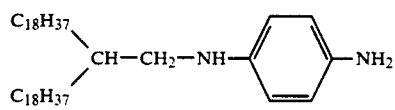

-continued
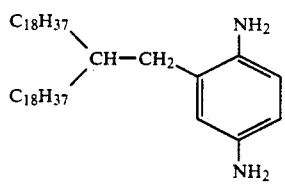
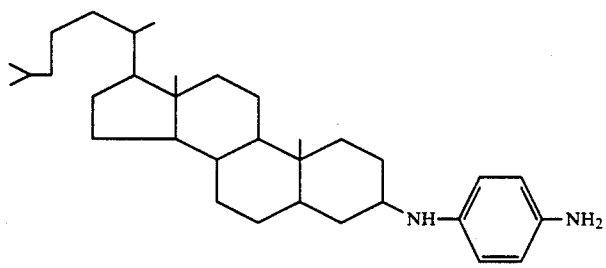
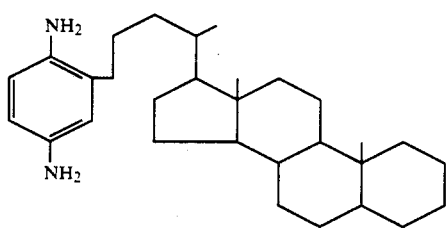
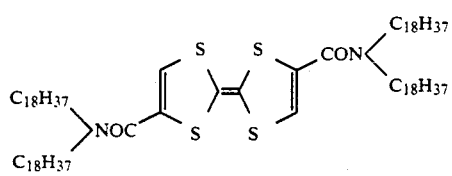
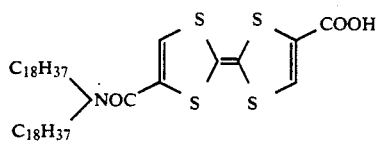
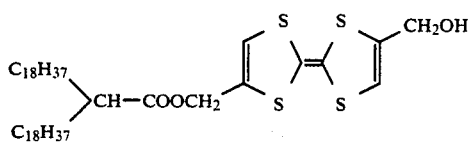
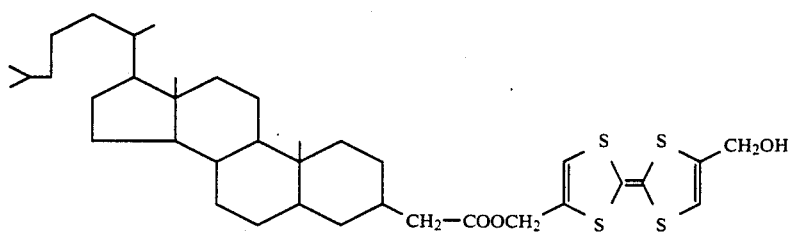

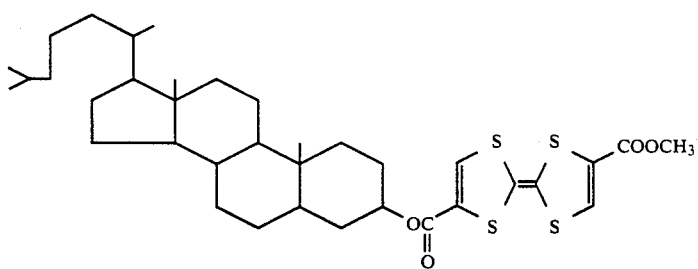
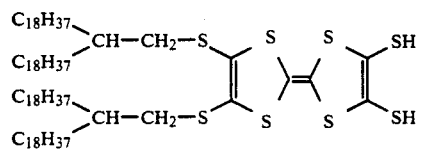
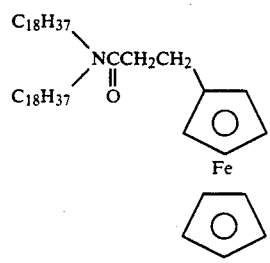
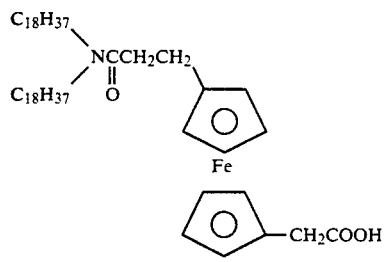
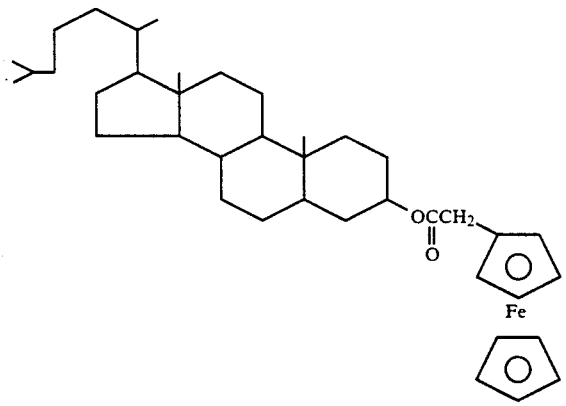
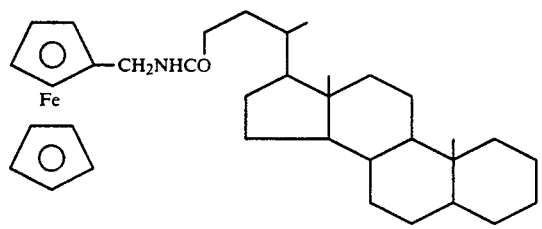
As has been explained, the compounds represented by the general formulae (I), (II) and (III) can be easily synthesized. In addition, bulky hydrophobic groups, such as two long alkyl groups or steroid skeletons, are not disconnected from the dye skeleton during the synthesization of any of these compounds. Since the bulky hydrophobic groups reduce the cohesion among the dye skeletons, almost all of the dye molecules can alone form stable organic dye monomolecular films. The dye molecules according to the invention can form various types of thin films. Of these films, Langmuir-Blodgett (LB) film preserves the excellent properties of the dye molecules.

The elements having organic dye thin films according to the present invention will now be briefly described.

(a) Display Element

Most of donor molecules or acceptor molecules have their absorption spectra located close to the ultraviolet side and are not colored so much before they undergo charge transfer. Once they have undergone charge transfer, their absorption spectra shift into the visible region, whereby the molecules are distinctly colored. Because of this shift of the absorption spectra, which results from the charge transfer, the thin film made of these donor or acceptor molecules can be used as material of display elements. The degree of shift of the absorption spectra depends on the kind of the molecules and the magnitude of the charge transfer. Hence, the display element can present variety of colors.

(b) Rectifier Element

A rectifier element can be made of a strip of organic thin film formed of donor molecules orientated in a direction and acceptor molecules orientated in another direction, and two electrodes connected to the ends of the strip. When a forward bias is applied on this rectifier element, thereby charging the donor molecules negative and the acceptor molecules positive, charge transfer occurs in the element, whereby an electric current flows through the element. Conversely, when a reverse bias is applied on this rectifier element, thereby charging the donor molecules positive and the acceptor molecules negative, charge transfer does not occur in the element, whereby an electric current does not flow through the element. Hence, the element rectifies AC currents.

(c) Switching Element

A switching element can be made of organic thin film. When energy externally applied to the thin film (such as light or an electric field) is increased over a threshold value, charge transfer occurs between the donor molecules and the acceptor molecules, whereby the absorption spectrum or the electric conductivity of the film drastically changes, and the film is "turned on." Conversely, when the energy is reduced to or below the threshold value, charge transfer occurs, in the reverse direction, between the donor molecules and the acceptor molecules, whereby the absorption spectrum or the conductivity of the film is restored, and the film is "turned off." According to the present invention, the threshold value is adjusted by selecting the kinds of both the donor molecules and the acceptor molecules or changing the distance of the dye skeletons.

(d) Multi-Value Element

This element is a modification of the switching element described above. It has two or more threshold values, if it is made of organic thin film formed of donor or acceptor molecules of two or more kinds, or if made of organic thin film formed of donor molecules of one kind which are spaced apart for a distance and acceptor molecules of one kind which are set apart for a different distance.

(e) Photo-Memory Element

A photo-memory element can be made of organic thin film. When photo energy is applied to the thin film, charge transfer takes place in the film. Due to this charge transfer, the absorption spectrum or the electric conductivity of the thin film changes. The absorption spectrum and the conductivity, thus changed, are maintained by applying an electric field on the film or by maintaining the film at low temperature. To erase the data, it suffices to stop applying the electric field on the film, to apply a reverse bias to the strip, or to heat the strip. Photo-memory elements can also be made of either organic thin film having two or more threshold values or organic thin film formed of donor and acceptor molecules of two or more kinds which have different absorption spectra. Such photo-memory elements can constitute a memory which has a high integration density.

The organic thin film of the invention can also be applied in fabricating field effect transistors.

The organic thin film functional element or device will now be described below with reference to the accompanying drawings.

FIGS. 1 to 13 are intended to explain organic thin film display elements. These elements have the same structure as those disclosed in U.S. Ser. No. 908,014 filed in U.S. on Sep. 16, 1986 by Nobuhiro GEMMA et al. except that the organic films of the invention are used therein.

Description is first made of the phenomenon of charge transfer in the laminate structure consisting of a first organic film containing donor molecules and a second organic film containing acceptor molecules.

The operation of the display element of the present invention is fundamentally based on the charge transfer occurring in the laminated body of the first and second films.

FIG. 1 shows a basic structure of an organic thin film display element including first and second films 13, 14 having hetero structures which are interposed between two electrodes 11, 15. A third film 12a containing insulating molecules is interposed between electrode 11 and second film 14. Another third film 12b containing insulating molecules is intervened between electrode 15 and first film 13. The third films 12a, 12b are provided as barriers for preventing charge transfer between electrode 11 and second film 14 as well as between electrode 15 and first film 13.

According to the display element of the present invention arranged as described above, voltage is applied through a voltage source V across electrodes 11, 15 so as to cause the side of electrode 11 to be rendered positive. When the voltage becomes higher than voltage Vtr indicated by the formula:

$$Vtr = \frac{l}{a} \cdot \frac{1}{e} \left( \left( I_{PD} - E_A - \frac{e^2}{a} \right) \right) \quad (1)$$

electrons transit from first film 13 to second film 14, thereby causing the donor molecules to have a positive ion (D$^+$) and the acceptor molecules to have a negative ion (A$^-$).

In the above formula (1), $I_{PD}$ represents the ionization potential of the donor molecule, and $E_A$ denotes the electron affinity of the acceptor molecule. l is a distance between electrodes 11, 15. a indicates a distance between the hole of the donor molecule and the electron of the acceptor molecule. e denotes a charge elementary quantity.

Molecules absorb light beams to noticeably different extents according as they assume a neutral or ionized state. When electron transfer takes place, for example, from the donor molecule to the acceptor molecule, a tremendous change appears in the light absorption spectrum of the organic film having the structure illustrated in FIG. 1.

Figure 2:
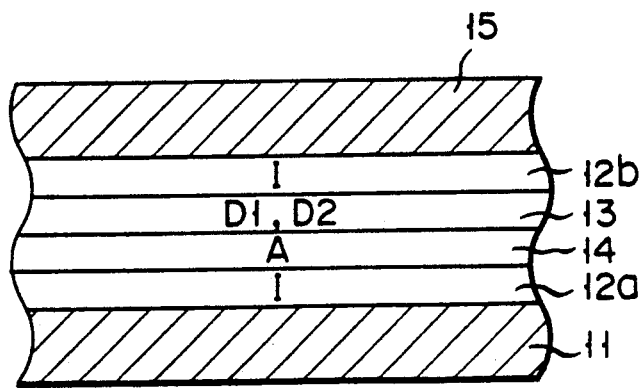

The phenomenon of charge transfer also occurs when a multicolor display is performed when either donor molecule or acceptor molecule comprises a plurality of kinds. FIG. 2 represents the case where first film 13 is composed of two different donor molecules $D_1$, $D_2$. Now assume that the ionization potential of the donor molecule is represented by $I_p(D_1) < I_p(D_2)$, and that the concentration of the acceptor molecules is equal to the total concentration of two donor molecules. Further, threshold voltages $V_{tr}(1)$ and $V_{tr}(2)$ shown in formula (1) are assumed to correspond to two assemblies of donor and acceptor molecules $\{D_1, A\}$, $\{D_2, A\}$. If a voltage applied across the two electrodes 11, 15, is higher than $V_{tr}(1)$, electron transfer occurs between $D_1$ and A. If the applied voltage rises higher than $V_{tr}(2)$, electron transfer appears between $D_2$ and A. The arrangement of FIG. 2, therefore, gives rises to three absorption spectrum patterns, namely, one neutral state and two ionized state. When changes in the absorption spectra are utilized as a color display function, it is possible to cause a single picture element to display a plurality of colors.

Figure 3:
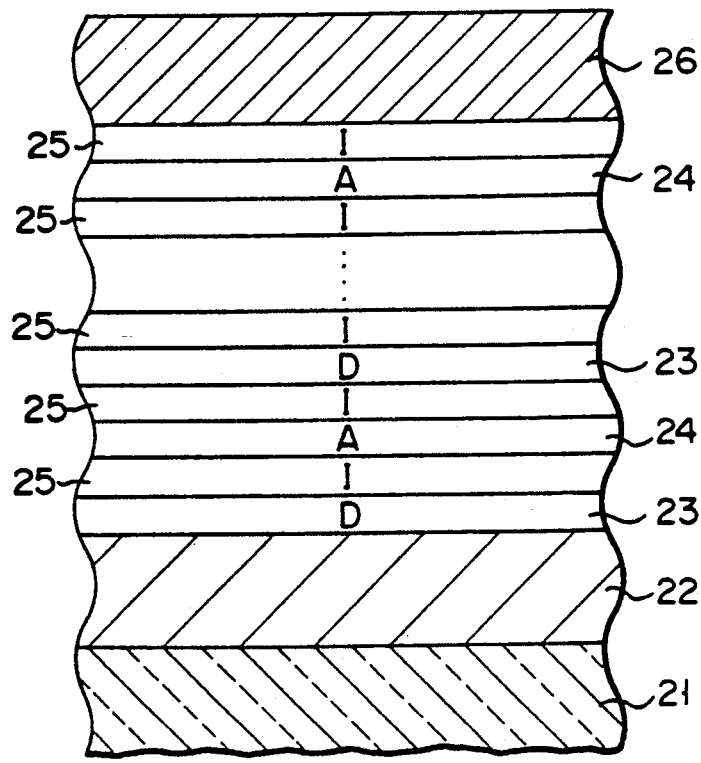

FIG. 3 is a sectional view of the display element according to the first embodiment of the invention. Reference numeral 21 denotes a glass substrate. A transparent conductive film 22 is formed on the surface of the substrate 21. 10 to 100 layers of first donor molecule-containing films 23 and second acceptor molecule-containing films 24 are alternately laminated with an insulating organic film 25 interposed between the first and second organic films 23, 24, thereby providing a super lattice structure. These films are fabricated by the Langmuir-Blodgett process. A translucent gold electrode 26 is thermally deposited in vacuum on the top of said super lattice structure with a thickness of 50 nm. Though not shown in FIG. 3, a gold lead having a diameter of 0.3 mm is fitted by means of silver paste of gold electrode 26 and transparent electrode 22 deposited on the substrate 21.

Figure 4:
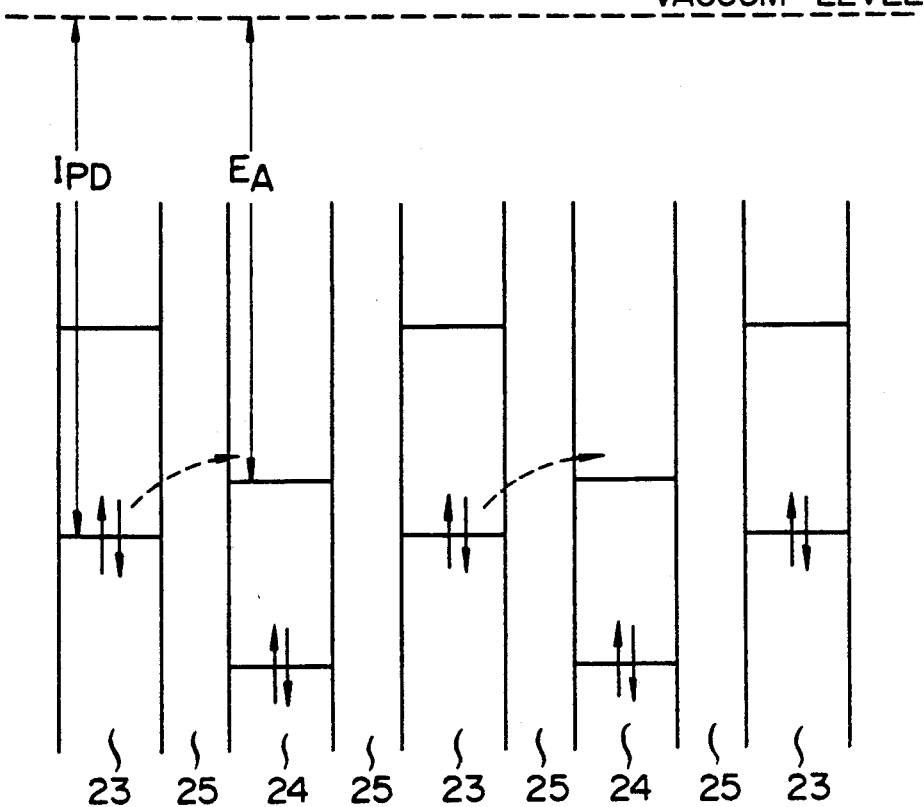

FIG. 4 is a typical band pattern of the surface lattice structure of a display element fabricated in the aforementioned manner. First organic film 23 containing donor molecules has a low ionization potential $I_{PD}$. Second organic film 24 containing acceptor molecules has such electron affinity $E_A$ as is slightly lower than the ionization potential $I_{PD}$ of the first organic film. Insulative organic film 25 has a sufficiently smaller electron affinity and yet a fully higher ionization potential than first and second organic films 23, 24. When, therefore, bias voltage is so impressed as to render first organic film 23 negative, then the transition of electrons takes place from first organic film 23 to second organic film 24 as indicated by a broken line arrow in FIG. 4. As a result, the light absorbing property of the super lattice structure is changed to ensure a display function.

Figure 5:
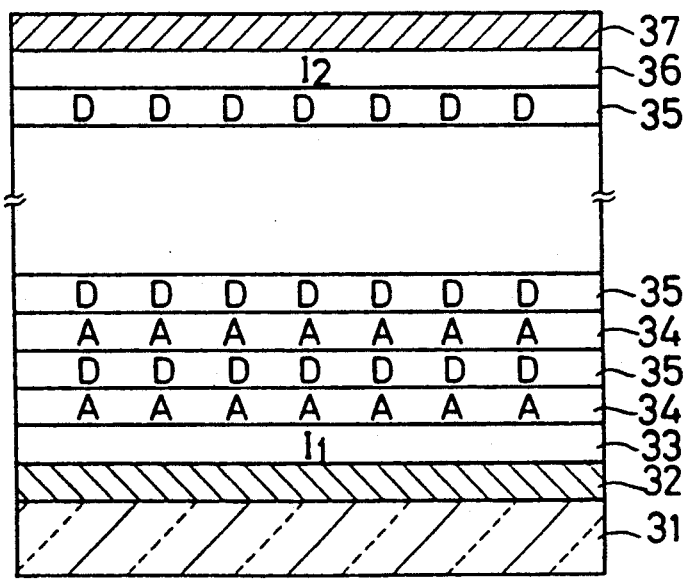

FIG. 5 shows a display element of the invention according to another embodiment. In FIG. 5, first and second organic thin films 34 and 35 are alternately stacked between insulating films 33 and 36. An electrode 32 is formed on the insulating film 33, and an electrode 37 is formed on the insulating film 36. The laminate structure is supported on a transparent substrate 31.

Figure 6:
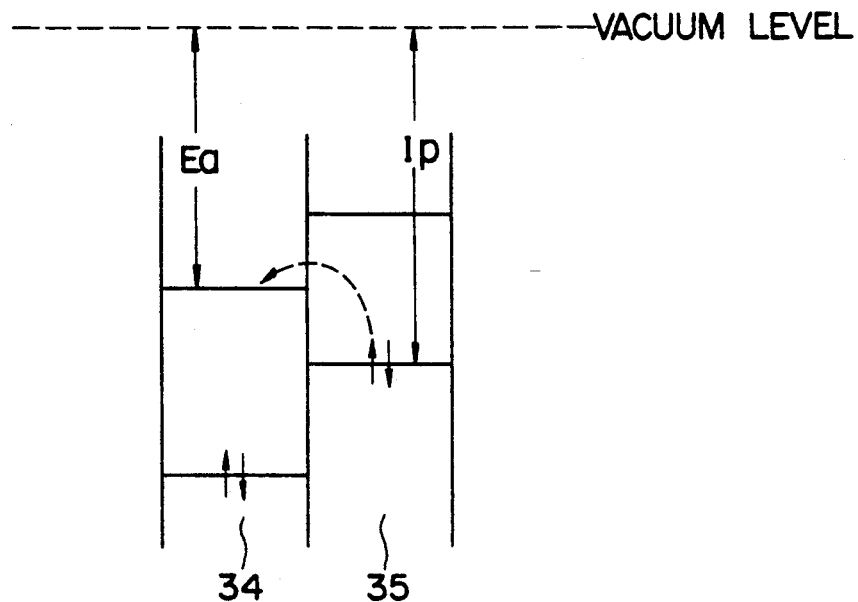

FIG. 6 shows an energy band diagram of the super lattice structure body of the display element shown in FIG. 5. Detailed explanation is given hereinafter.

Figure 7:
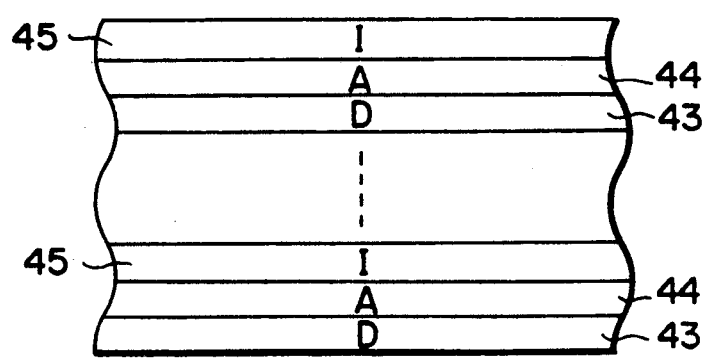

FIG. 7 shows the case where laminated bodies of first and second films 43, 44 are stacked on upon another with an insulating film 45 interposed therebetween.

Figure 8A:
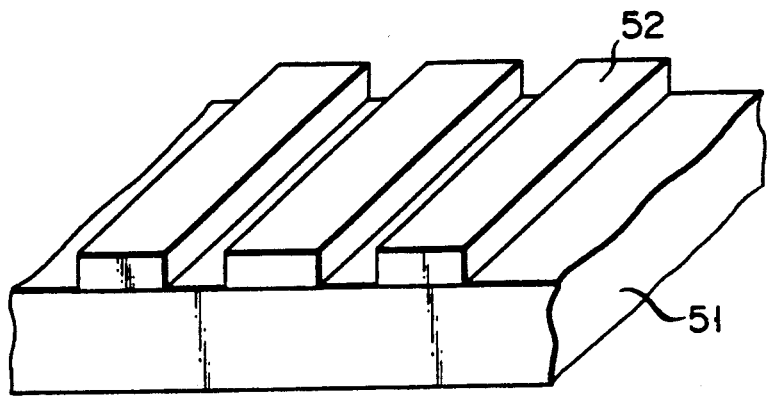
Figure 8B:
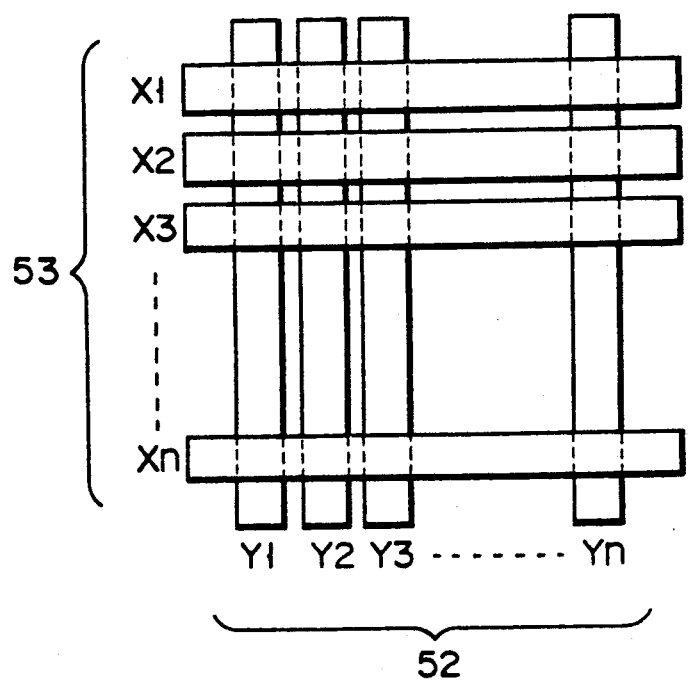

FIGS. 8A and 8B show matrix electrodes used for the display element of the invention. As shown in FIG. 8A, ITO film stripes 52 are deposited on quartz glass substrate 51 at an interval of, for example, about 100 microns and with a width of 500 microns. The super lattice structure as indicated in FIG. 5, is provided wherein first donor molecule-containing film 35 and second acceptor molecule-containing film 34 are alternately laminated ten times.

On the super lattice structure, Al stripe films 53, as shown in FIG. 8B, are deposited at an interval of about 100 microns and with a width of about 500 microns, in such a manner that said Al stripe films 53 extend in the perpendicular direction as well as in the same direction as that in which ITO films 52 are deposited. In this case, Al films 53 with a thickness of 200 Å are formed by vacuum evaporation by means of a metal mask. A region (500 microns × 500 microns) defined by the overlapping of ITO film 52 on Al film 53 constitutes one picture element. In this case, ITO film 52 corresponds to a signal electrode, and Al film 53 corresponds to a scanning electrode.

In the display element embodying the present invention, the number of picture elements can be set at 10,000, and the picture area can be defined to have a size of 6 cm × 6 cm.

Description may now be made of the operation of the above-described display element.

Figure 9A:
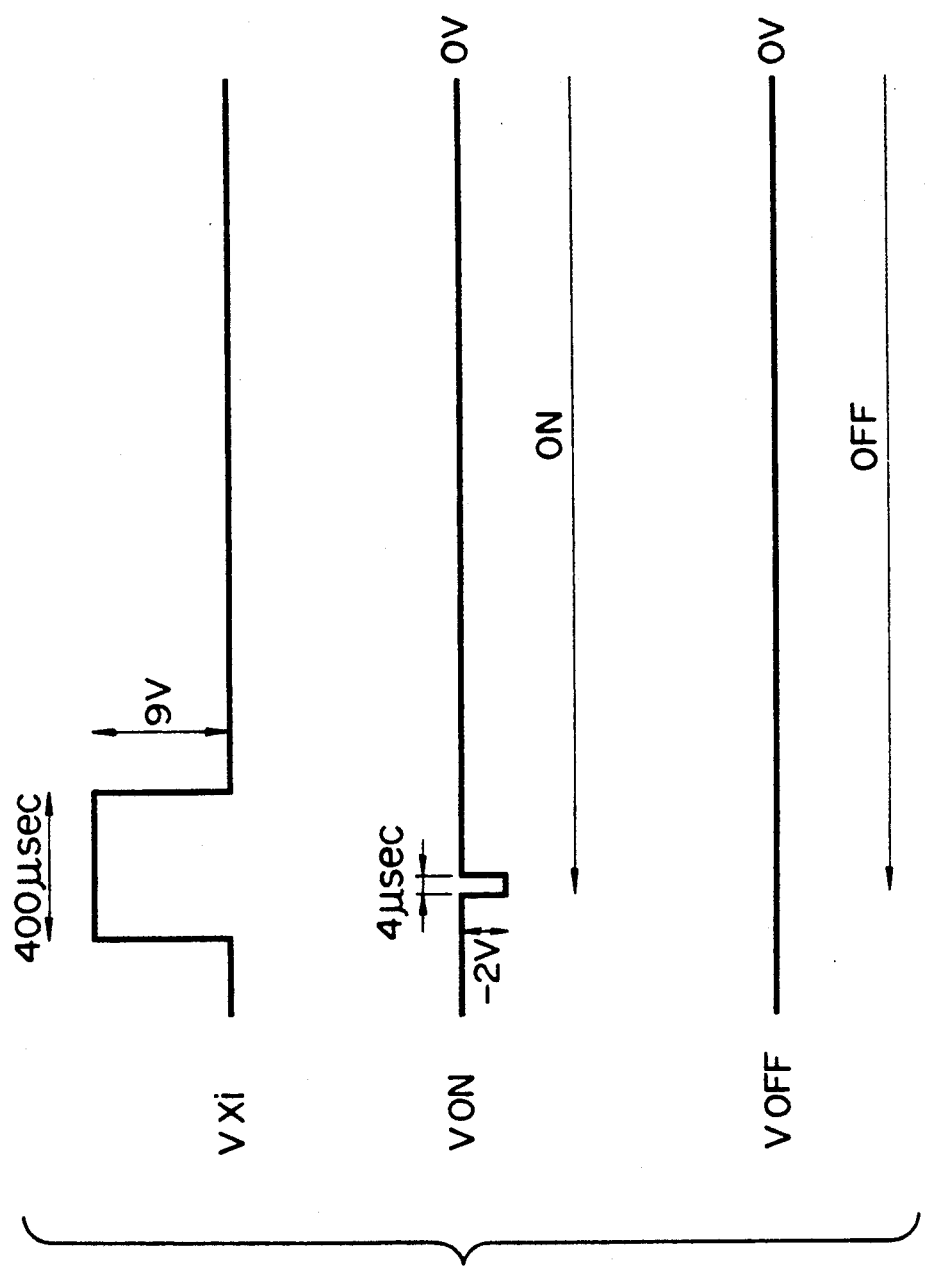

FIG. 9A is a chart illustrating the principle on which the start and stop of the display operation of one picture element (Xi; Yj).

Now let it be assumed that pulse voltage $V_{Xi}$ (e.g., 9 V) is impressed on scanning electrode Xi for a length of time tx (e.g., 400 microseconds). During the period tx, signal voltage $V_{Yj}$ is successively applied on signal electrode $Y_j$ for a length of time ty (e.g., 4 microseconds). In this case, a picture element desired to display a color has its signal electrode applied with pulse voltage VON (e.g., −2.0 V). A picture element required to cease a color display has its signal electrode applied with voltage $V_{OFF}$ (e.g., 0.0 V). Namely, when the picture element (Xi; Yj) is turned on, the following steps are taken:

$$V_{Xi} = V_X = 9.0\ V$$

$$V_{Yj} = V_{ON} = -2.0\ V$$

Therefore, $V_{Xi} - V_{Yd} = 11.0\ V > Vth = 10.0\ V$.

When the picture element is turned off, the following step are taken:

$V_{Xi} = V_X = 9.0 \ V$ $V_{Yi} = V_{OFF} = 0.0 \ V$

Therefore $V_{Xi} - V_{Yd} = 9.0 \ V < Vth = 10.0 \ V$.

Once turned on, a picture element sustains display during a period of time tm (=40 milliseconds).

Figure 9B:
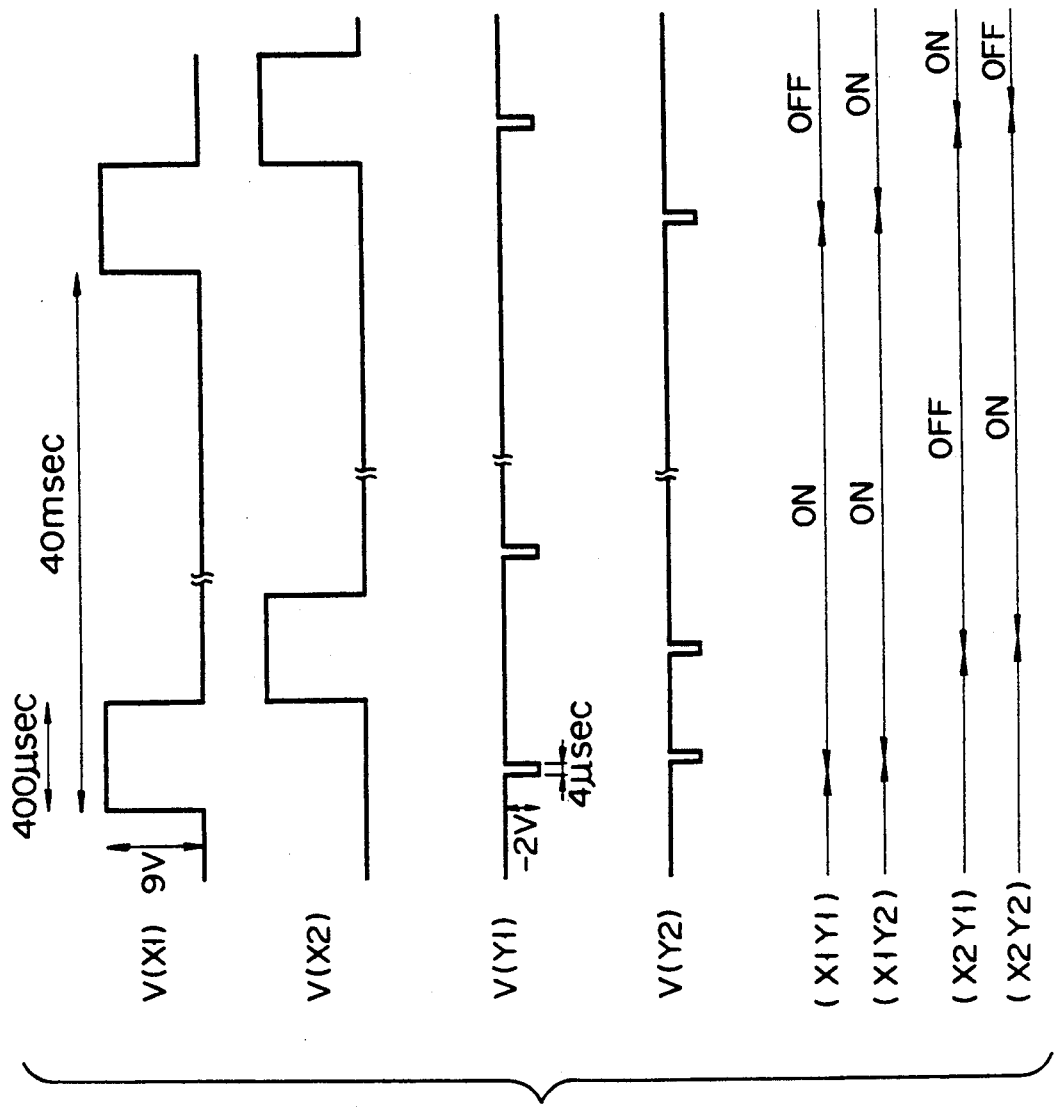

FIG. 9B represents the driving signal timing chart of a matrix display. The scanning electrodes $X_1, X_2 \ldots X_n$ are successively applied with a pulse voltage of 9 V having a width of 400 microseconds. Since 100 scanning electrodes are provided, pulse voltage is applied with a period of 40 milliseconds. Signal electrodes $Y_1, Y_2 \ldots Y_m$ are applied with signal pulse voltage having a width of 4 microseconds with a period of 400 microseconds. When the signal pulse voltage stands at −2 V, the corresponding element is rendered conducting for display. When the signal pulse voltage indicates 0 V, the corresponding picture element is rendered off. FIG. 9B indicates the on and off states of the respective picture elements.

Figure 10:
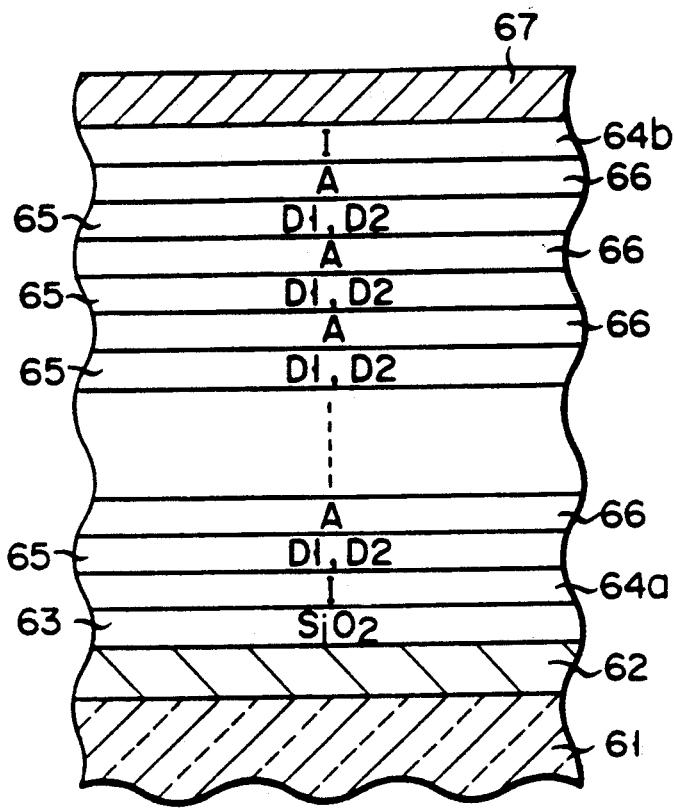

FIG. 10 illustrates the construction of a multicolor display element embodying the present invention. Reference numeral 61 represents a glass substrate. Deposited on this substrate is a transparent conductive film 62 prepared from, for example, ITO. Further, insulative molecule film 64a is deposited on said conductive film 62 with inorganic insulative film 63 interposed therebetween. Formed on said laminated assembly is a super lattice structure constructed by alternately laminating acceptor molecule-containing film 66 and donor molecule-containing film 65 which comprises two different donor molecules $D_1, D_2$.

Inorganic insulative film 63 can be formed by depositing SiO$_2$ film by the CVD process with a thickness of 2000 Å. Insulative molecule-containing films 64a, 64b, acceptor molecule-containing film 66 and donor molecule-containing film 65 can be prepared by the Langmuir-Blodgett process. Acceptor molecule-containing film 66 comprises one kind of acceptor molecules A, and donor molecule-containing film 65 comprises two kinds of donor molecules $D_1$ and $D_2$. Insulative molecule-containing films 64a, 64b can be formed by laminating stearic acid LB films. Top electrode 67 can be fabricated by the evaporation of aluminium with a thickness of 100 Å.

Figure 11:
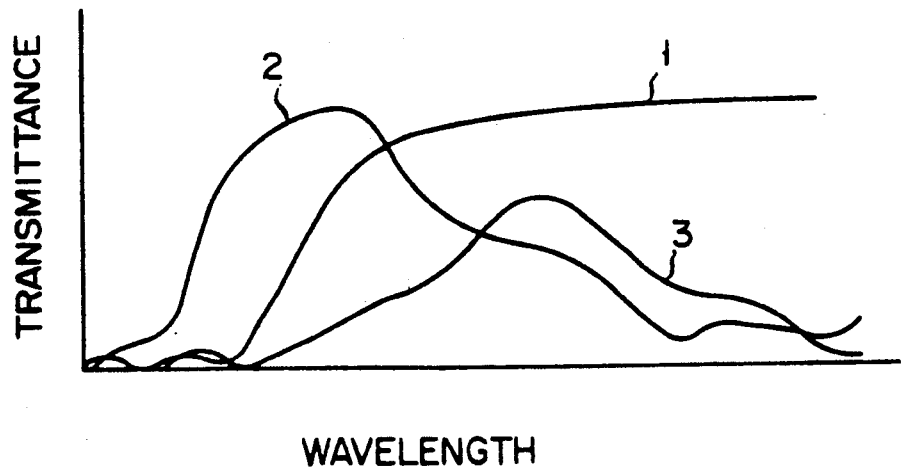

When the top electrode 67 is applied with such voltage as to be rendered positive, then a white transmitted spectrum changes as mentioned below in accordance with the level of said voltage. FIG. 11 indicates the spectrum changes. Notation ① indicates a pattern of a transmitted spectrum appearing when no voltage is applied. When the impressed voltage rises higher than $V_{tr}(1)$, the transmitted spectrum shows a pattern represented by notation ②. Further when the applied voltage exceeds $V_{tr}(2)$, the transmitted spectrum presents a pattern marked by notation ③. Accordingly, a color to be displayed can be changed in 3 steps in accordance with the level of the applied voltage as illustrated below:

In case of $V < V_{tr}(1)$
In case of $V_{tr}(1) < V < V_{tr}(2)$
In case of $V_{tr}(2) < V$ In the above-mentioned display element representing the present invention, the organic films can be laminated in any optional number of plies. Further, the thickness of the insulative film 63 may have any optional thickness. Proper selection of the number of the laminated films and the thickness of the respective films ensures the identical property of the basic display element, though minor changes appear in threshold voltage $V_{tr}(1)$, $V_{tr}(2)$.

Figure 12:
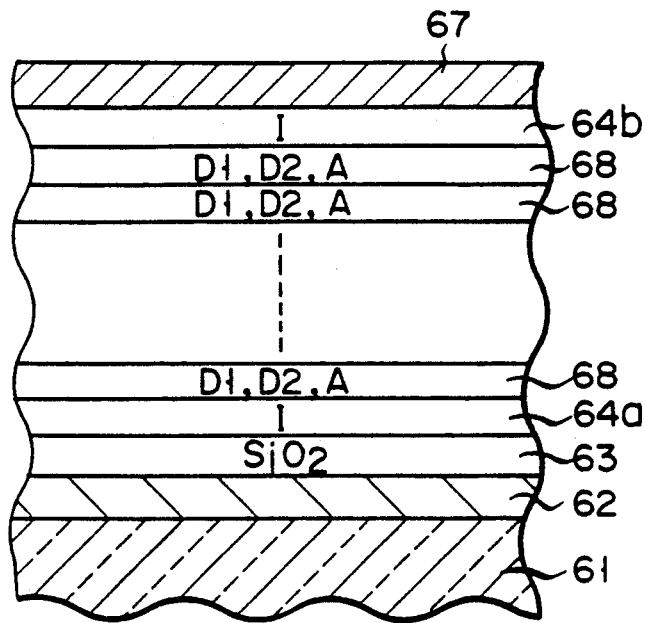

FIG. 12 shows another type of multicolor display element. The multicolor display element of FIG. 12 has a different arrangement from that of FIG. 9 is the undermentioned respect. Namely, the organic film has a hetero structure represented by film 68 consisting of two donor molecules $D_1$, $D_2$ and one acceptor molecule A.

Figure 13:
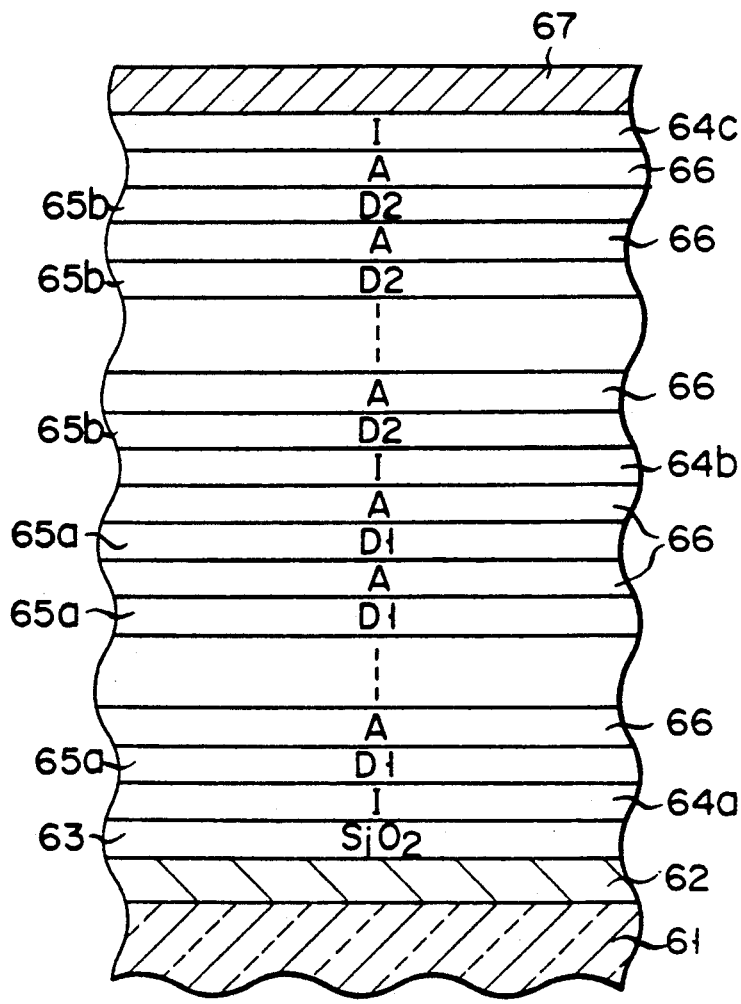

FIG. 13 refers to still another type of multicolor display element. The display element has two hetero super lattice structures. This assembled body is composed of one super lattice structure prepared by laminating a large number of hetero layers respectively consisting of donor molecule films 65a containing donor molecule $D_1$ and acceptor molecule films 66 and another super lattice structure constructed by laminating a large number of hetero layers composed of donor molecule film 65b containing donor molecule $D_2$ and acceptor molecule film 66.

In the foregoing Embodiments of FIGS. 11 to 13, two kinds of donor molecules and one kind of acceptor molecule were assembled together. However more kinds of donor and acceptor molecules may be assembled, thereby ensuring the display of more than three colors. Further, various kinds of organic films described in Embodiments of FIGS. 11 to 13 may be properly assembled.

In Embodiments of FIGS. 11 to 13, inorganic insulative film 63 may be omitted. Similarly, insulative molecule-containing films 64a, 64b and 64c may be omitted, in case it is possible to build a barrier sufficiently effective to obstruct the electric charge transfer between an organic film and electrode 67 or transparent conductive film 62 deposited on the substrate by selection of proper materials. However, insulative molecule-containing films 64a, 64b and 64c are indispensable in order to ensure more effective charge transfer by reliably preventing carries from being taken into an organic film from an electrode or substrate. Further as viewed from the stability of the properties of elements, it is required to provide the insulative molecule-containing films 64a, 64b and 64c particularly the insulative molecule-containing film 64b, 64c positioned underneath electrode 67.

With reference to FIGS. 14 to 27, there will now be described organic thin film optical recording devices. These devices have the same structure as those described in U.S. Ser. No. 205,542 filed in U.S. on Jun. 6, 1988 by Akira MIURA et al. which in turn is a continuation of U.S. Ser. No. 943,716 filed on Dec. 19, 1986, except that the dyes of the invention are used as acceptor and donor molecules.

First, the principle of charge transfer in the super thin film hetero structure of the organic molecules used in the present invention, i.e., a charge transfer phenomenon from donor to the adjacent acceptor molecule in the films, will first be described with reference to FIGS. 14 and 15.

Figure 14:
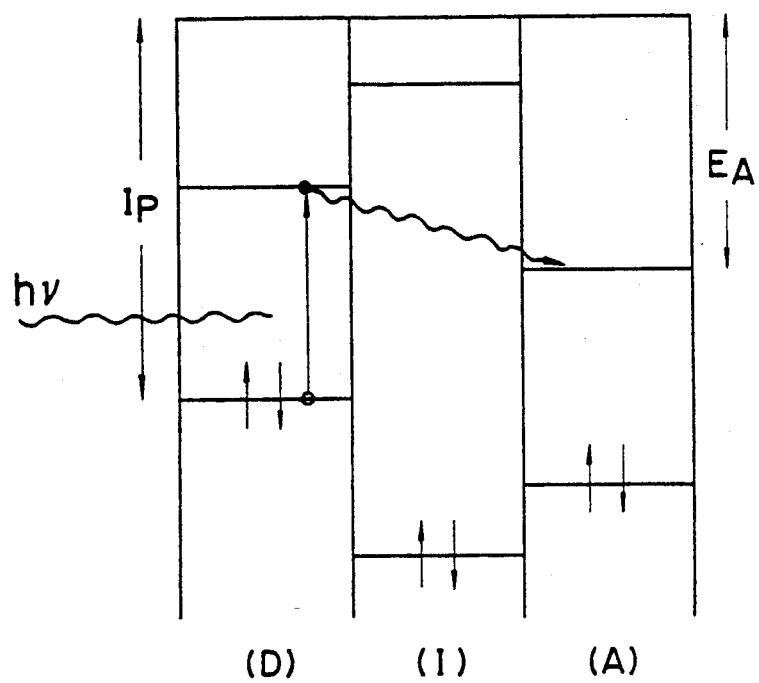
Figure 15:
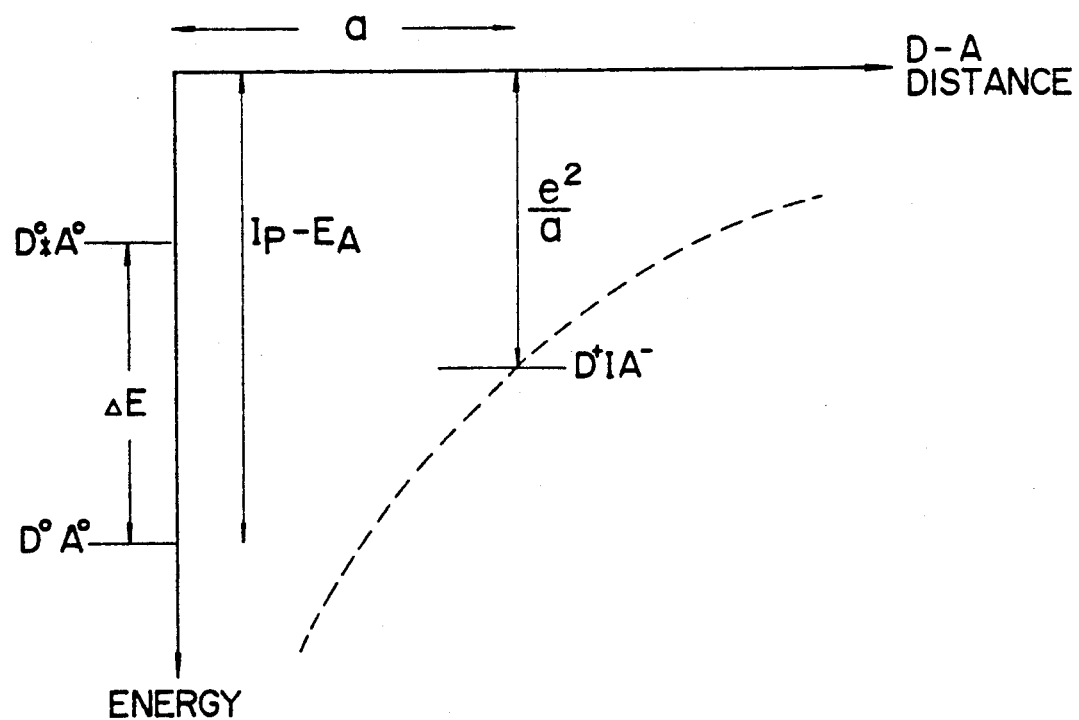

FIG. 14 is an energy state diagram showing a state wherein insulating molecule film I having thickness a is provided between donor molecule film D, having an ionization potential Ip, and acceptor molecule film A, having electron affinity $E_A$. As shown in FIG. 15, when light having such an absorption wavelength that it can be absorbed by the donor molecule film is irradiated in state $D°A°$, wherein the respective molecules are neutral, the structure is shifted to state $D*°A°$, wherein donor molecules are selectively excited. In state $D*°A°$, part of the structure is returned to the ground state and its other part is shifted to state $D^+IA^-$, wherein charge transfer is caused. Note that $D^+IA^-$ indicates a state wherein donor and acceptor molecules have respectively been changed into positive and negative ionic species, with insulating molecule film I sandwiched therebetween. In order to allow the latter process, the energy in state $D^+IA^-$ must be lower than that in state $D*°A°$, i.e., $$Ip = E_A - \Delta E \leq e^2/a \quad (1)$$

must be satisfied.

The transition speed from state $D*°A°$ to $D^+IA^-$, conversion efficiency, and recording stability depend on the electron affinity and thickness of insulating molecule film I. When a third organic molecule film (donor molecule film or acceptor molecule film) is provided in place of or in addition to film I, the conversion efficiency becomes higher and more stable recording is possible.

When an external voltage is applied to the stack layer structure shown in FIG. 14, the condition for causing a process of transition from state $D*°A°$ to $D^+IA^-$ is:

$$Ip - E_A \Delta E \leq e^2/a + e\phi \quad (2)$$

In other words, the process from state $D*°A°$ to $D^+IA^-$ can be controlled by the direction and intensity of the external electric field. Therefore, memory damage during efficient writing and recording can be prevented by applying an external voltage.

This will be described in more detail with reference to the energy model shown in FIG. 16.

More specifically, when donor molecules D are selectively excited by light energy hv, which is higher or similar to the energy of the lowest excited singlet state $S_1$, the relaxation process of the excitation undergoes a radiationless process or a fluorescence process (rate constant: Kr), to ground state $G_D$, or a phosphorescence relaxation process (rate constant: Df), which returns to the ground state after intersystem crossing via the triplet state Eh. Assume that an external electric field is applied during the relaxation process. Then, transition of the electron-hole pairs formed by the excitation from state Eh (rate constant: Ke) to state $C_T$ occurs at constant rate $\eta(E)$, and electrons migrate to acceptor molecules nearby and holes migrate to donor molecules in the neutral state, as a result of the electric field (charge transfer state).

This charge transfer state can be caused only by light excitation without applying an external electric field. In this case, however, after the electron-hole pairs are formed in state Eh, as described above, relaxation (quantum yield $\phi$) thereof to the initial ground state ($G_D$ and $G_A$) occurs prior to other transitions, and the recording state is instantaneously extinguished by the following reaction scheme:

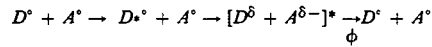
(3)

In excitation and relaxation processes of the donor molecules, the value of quantum yield is expressed as:

$$\phi(0) = Kf/(Kr + Ke + Kr) \quad (4)$$

when no bias is applied. In contrast to this, when a voltage is applied as in the first embodiment of the present invention, electron-hole dissociation occurs at rate $\eta(E)$, and the quantum yield for the relaxation to the initial state is thus considerably decreased as expressed as follows:

$$\phi(E) = [\phi(0) - \eta(E)]/\phi(0) \quad (5)$$

It is also possible to cause a charge transfer state only by applying an electric field without light excitation. In this case, however, an energy required for forming electron-hole pairs, i.e., precursors of charge transfer is about:

$$V = [(Ip - E) - (e^2/F)]/e \quad (6)$$

in voltage. Accordingly, in order to sufficiently increase the ratio of charge transfer and to raise the recording contrast, an organic thin film must have a very high threshold voltage.

FIG. 17 shows an arrangement of a recording medium according to a first embodiment of the present invention. Referring to FIG. 17, 150-Å thick NESA (a transparent conductive electrode) film 72 is formed on glass substrate 71, and 500-Å thick $SiO_2$ film 73 is formed on film 72. A stack layer of donor molecule film 74, insulating molecule film 75, and acceptor molecule film 76, is repeatedly formed on the resultant structure by the LB process to provide a super lattice structure, and Al electrode 8 is formed thereon.

Figure 18:
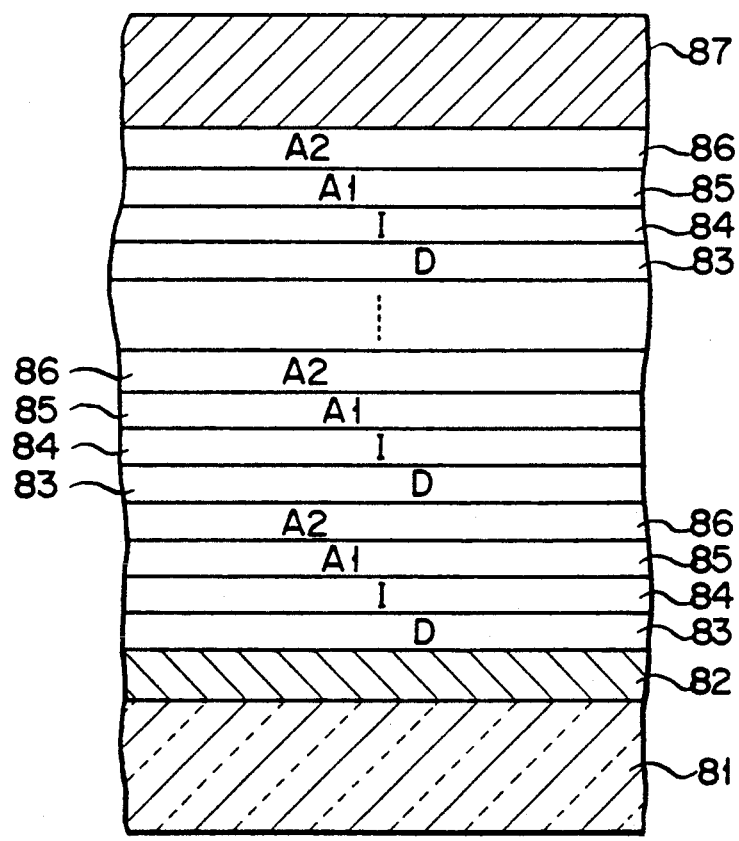

FIG. 18 shows an arrangement of a recording medium according to a second embodiment of the present invention. Referring to FIG. 18, 150-Å thick nesa film 82 is formed on glass substrate 81. A stack layer of donor molecule film (first organic thin film) 83, insulating molecule film 84, acceptor molecule film (third organic thin film) 85, and acceptor molecule film (second organic thin film) 86, containing acceptor molecules A2 having a larger electron affinity than that of film 85, is repeatedly formed on the resultant structure by the LB process to provide a super lattice structure, and Au electrode 17 is formed thereon.

Figure 19:
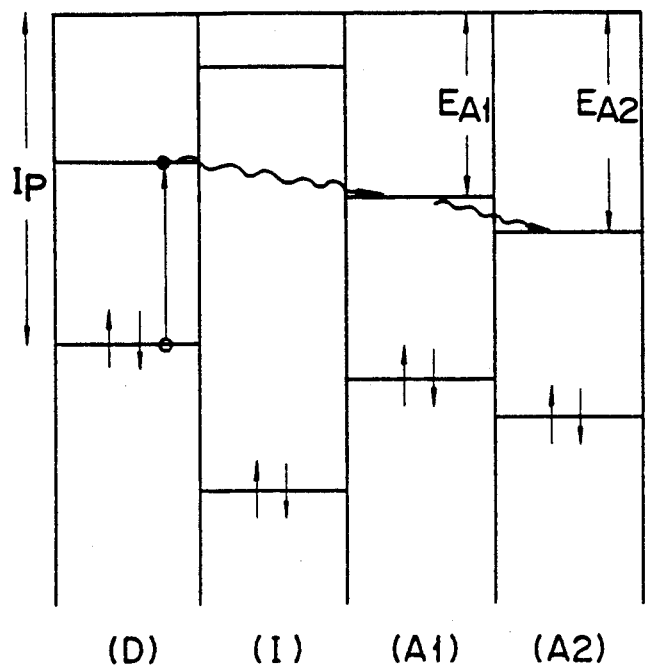

FIG. 19 is an energy state diagram of a unit stack layer structure of a recording medium having the arrangement of FIG. 18. When light having a predetermined wavelength is irradiated to excite donor molecule film D, electrons formed therein migrate from insulating molecule film I to acceptor molecule film $A_2$ through acceptor molecule film $A_1$, and are set in an ionic state. This corresponds to a writing state. Since films I and $A_1$ are provided between film D and $A_2$, the recording condition can be stably held and efficient writing can be performed.

While a reverse bias voltage is applied to the recording medium in which information has been written, light of a Xenon lamp of 1 mW/mm$^2$ can be irradiated for 1 minute. The absorption strength for a wavelength of 850 nm is decreased to 0.001 or less. In this manner, information can be erased by light irradiation.

As described above, according to this embodiment, a reversible information recording device capable of recording and erasing information by light irradiation can be obtained. In this recording device, a change in the light absorption rate which occurs as a result of the charge transfer phenomenon is significant. Therefore, this recording device does not require an expensive optical system. Moreover, the recording medium of the recording device contains inexpensive organic molecules, the device has a good S/N ratio and excellent versatility. Between donor and acceptor molecules in the layered structure of films, which perform charge transfer, an acceptor molecule film using different acceptor molecules is provided, together with an insulating molecule film. Therefore, a recording device having a good writing efficiency and stable holding characteristics for recording conditions can be obtained. In particular, when an appropriate bias voltage is applied upon writing, erasing, and reading, more efficient writing/erasing characteristics and more stable holding characteristics for recording conditions can be obtained.

Figure 20:
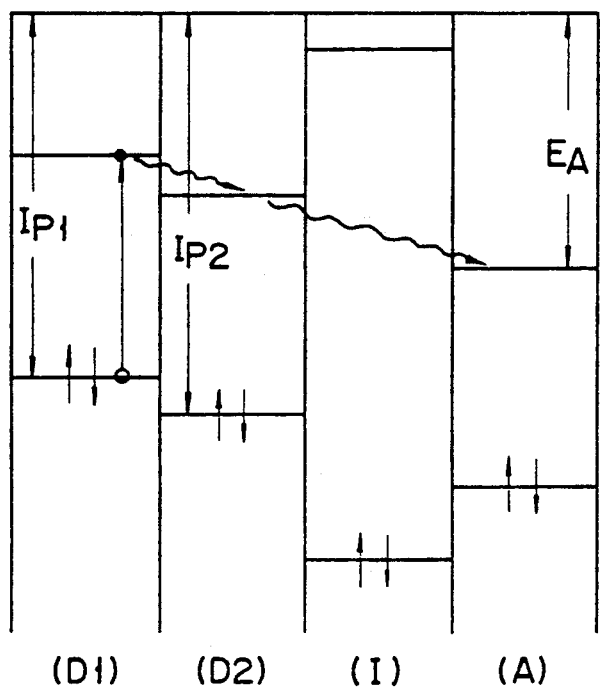
Figure 21:
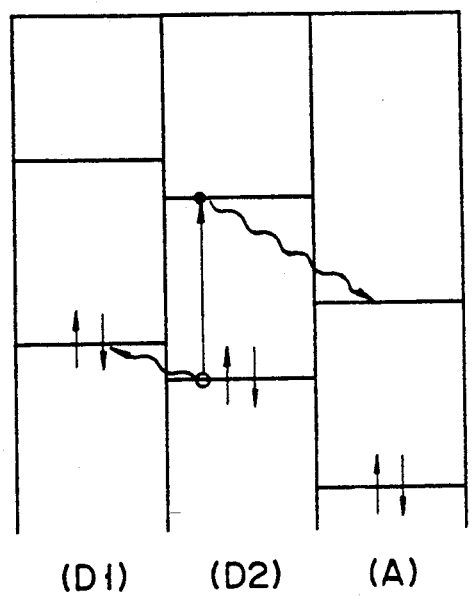
Figure 22:
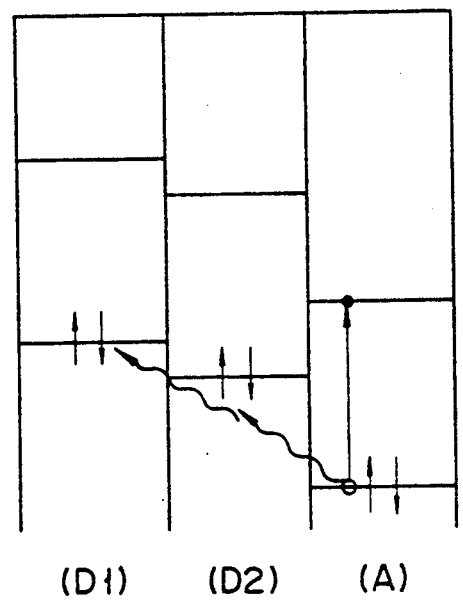

The present invention is not limited to the above embodiments but can be modified and embodied in various manners. FIGS. 20 to 22 show arrangements of unit organic thin film stack layer structures according to other embodiments in correspondence with the energy state diagram of FIG. 19 of the embodiment described above.

FIG. 20 shows a case wherein two types of donor molecule films and one type of acceptor molecule film are used. More specifically, between donor molecule film $D_1$ and acceptor molecule film A, donor molecule film $D_2$, which has ionization potential $I_{p2}$ higher than ionization potential $I_{p1}$ of film $D_1$, is provided together with insulating molecule film I. With this stack layer structure, efficient writing and erasing characteristics, and stable characteristics for holding recording conditions can be obtained in accordance with the same principle as the embodiment described above.

FIG. 21 shows a case wherein the insulating molecule film shown in FIG. 20 is omitted and two types of donor molecule films $D_1$ and $D_2$ and acceptor molecule film A are used. In this case, when writing light having a selected wavelength is used to excite central film $D_2$, the electrons and holes migrate to film A and $D_1$, respectively, as shown in FIG. 11, thereby providing an ionic state, i.e., a writing state. In this embodiment, an insulating molecule film is not used. However, when the thickness and ionization potential of central film $D_2$ are appropriately selected, stable holding characteristics for recording conditions can be obtained.

FIG. 22 shows a case of the same structure as FIG. 21, wherein information can be written by optically exciting acceptor molecule film A.

In addition to the embodiments shown in FIGS. 20 to 22, it is possible to combine two types or more or three types or more of each of donor and acceptor molecule films, thus providing a stack layer structure. It is also possible to use an organic molecule which contains both donor and acceptor groups, or to use a thin film containing both donor and acceptor molecules.

Figure 23:
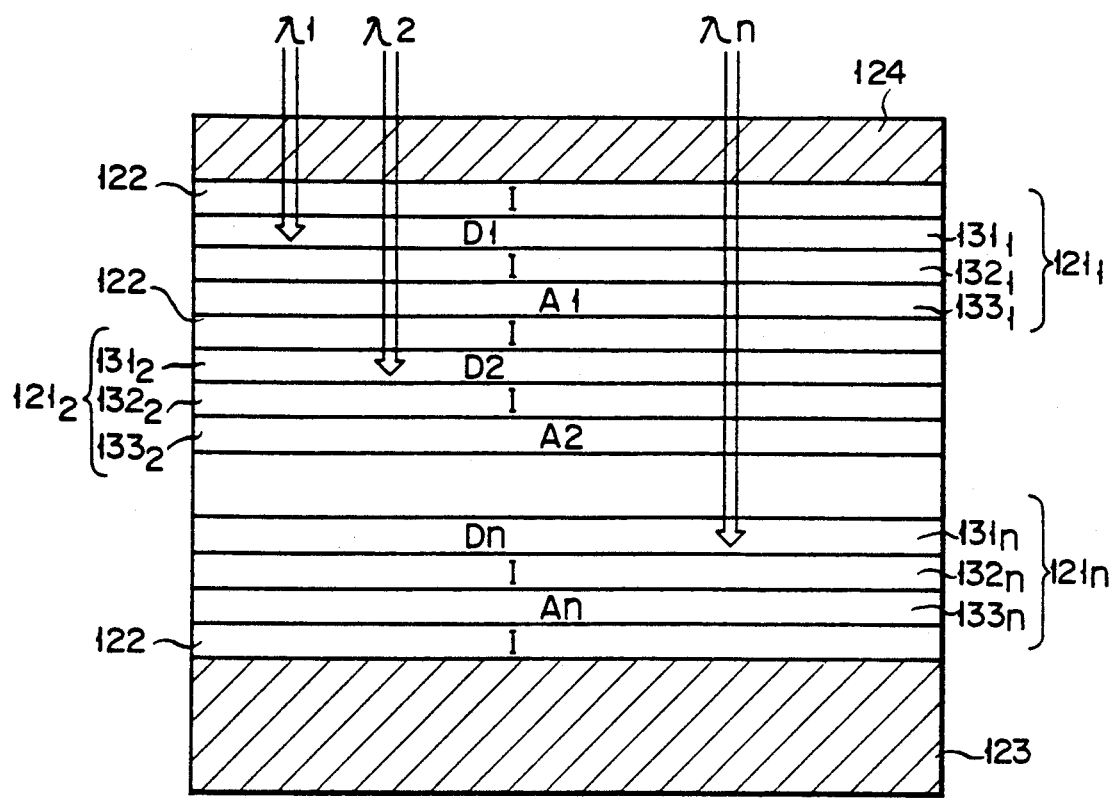

FIG. 23 schematically shows an arrangement of an information recording medium according to a third embodiment of the present invention. Reference numeral 123 denotes a substrate, e.g., a glass substrate having a nesa film formed thereon. A super lattice film is formed on substrate 123 by the LB process, and electrode 124 is formed thereon. More specifically, the super lattice film is formed by stacking first, second, . . . and nth recording layers $121_1$, $121_2$, . . . and $121_n$ through insulating molecule films 122. First layer $121_1$ is formed by stacking donor molecule film $131_1$, containing first donor molecules $D_1$, and acceptor molecule film $133_1$, containing first acceptor molecules $A_1$, through insulating film $132_1$. Second layer $121_2$ is formed by stacking donor molecule film $131_2$, containing second donor molecules $D_2$, and acceptor molecule film $133_2$, containing second acceptor molecules $A_2$, through insulating film $132_2$. In this manner, a plurality of recording layers, having different light absorption characteristics by different combinations of donor and acceptor molecule films, are stacked.

Figure 24A:
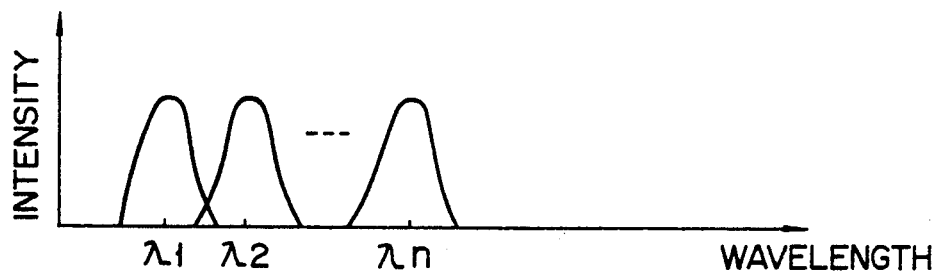
Figure 24B:
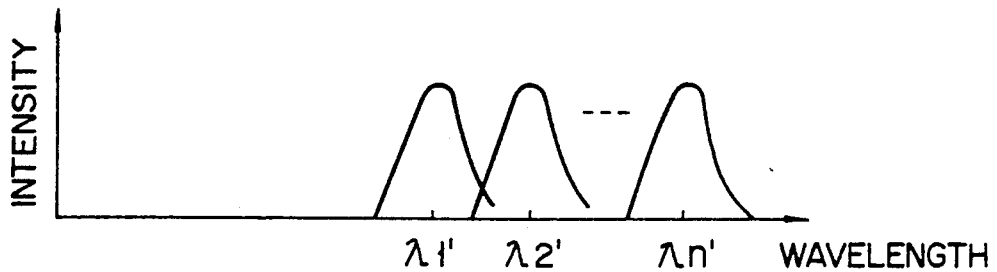

Information is recorded in the recording medium having the above arrangement in the following manner. FIGS. 24A and 24B show light absorption characteristics of this recording medium. FIG. 24A shows the characteristics of the recording medium in which no information has been recorded. The absorption peak of wavelength $\lambda 1$ corresponds to the donor molecule film first layer $121_1$, that of wavelength $\lambda 2$ corresponds to the donor molecule film of second layer $121_2$, . . . and that of wavelength $\lambda n$ corresponds to the donor molecule film of nth layer $121_n$. Assume that information is written in the recording medium having such absorption characteristics by using light having wavelength $\lambda 1$. In this case, charge transfer occurs between donor and acceptor molecule films $131_1$ and $133_1$ of first layer $121_1$ where light irradiates, and the ionization state at this portion is held. Upon occurrence of the ionization state, new charge transfer/absorption occurs. More specifically, the absorption peak at wavelength $\lambda 1$ in FIG. 24A shifts to the absorption peak at wavelength $\lambda 1'$ in FIG. 24B. In this manner, information is written in a two-dimensional manner in first layer $121_1$ as a change in light absorption characteristics by using light having a wavelength $\lambda 1$. Similarly, information is written in second layer $121_2$ as a change in light absorption characteristics by using light having wavelength $\lambda 2$.

In the above information writing operation, a predetermined external electric field may be applied to the recording medium. This is effective since it promotes dissociation of electron-hole pairs formed by light excitation. The insulating molecule film in each recording layer serves to increase the writing efficiency and to hold the recording conditions.

Figure 25:
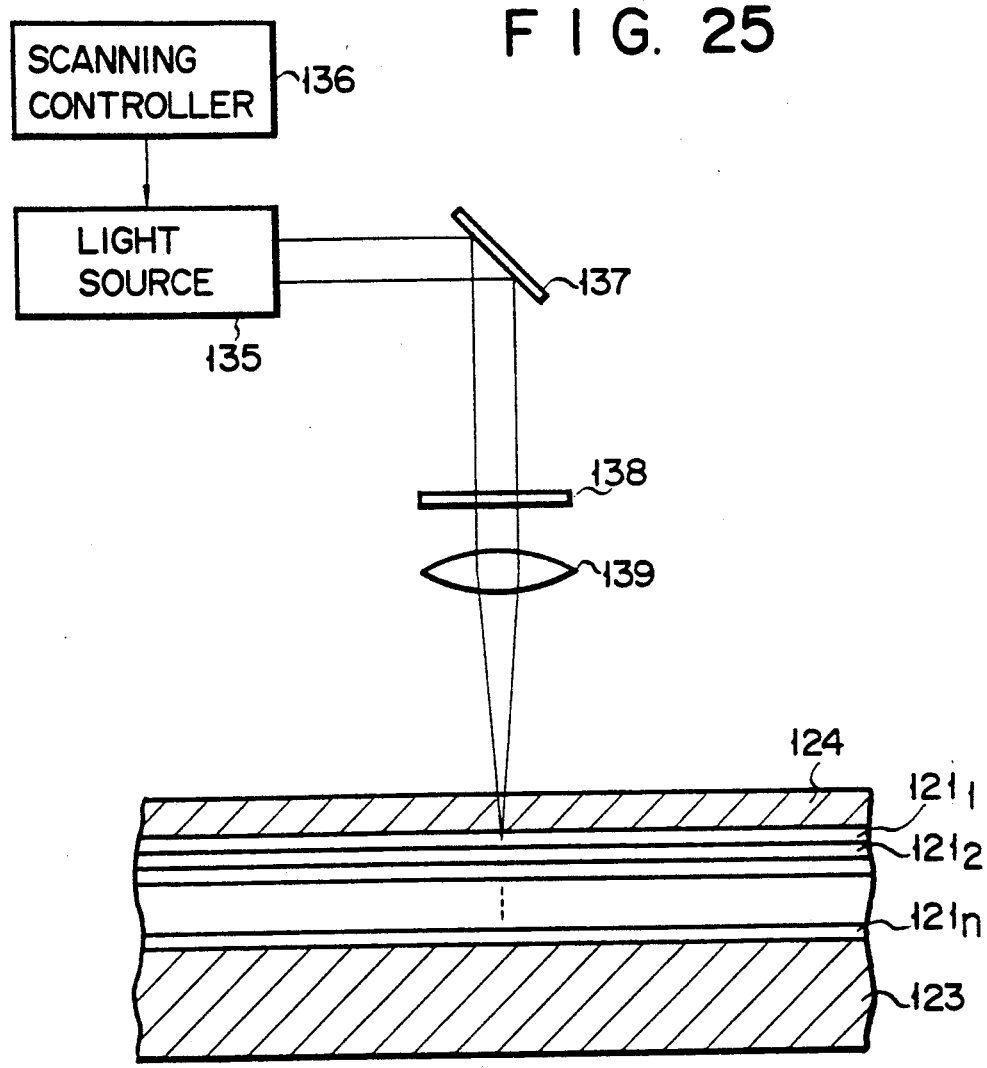

FIG. 25 shows an example of a practical information writing system. Reference numeral 135 denotes an incandescent light source; 136, a scan control system of light source 135; 137, a mirror; 138, a filter; and 139, a focusing lens. A wavelength is selected by filter 138 and information writing is performed in a predetermined recording layer of the recording medium in the above manner by using light having a predetermined wavelength. In this manner, information can be written in a recording medium in a three-dimensional manner and in a multiplex manner by using a plurality of wavelengths.

Figure 26:
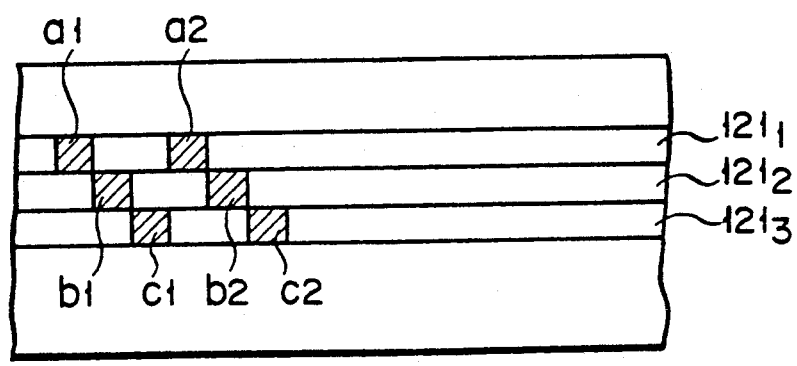

FIG. 26 schematically shows a case wherein information is read from a recording medium in which information is written. Reference symbols a1, a2, . . . respectively denote information recording units of first recording layer $121_1$; b1, b2, . . . respectively denote information recording units of second recording layer $121_2$; and c1, c2, . . . respectively denote information recording units of third recording layer $121_3$. As shown in FIG. 26, when information is to be recorded in different recording layers, no space need be reserved between the information recording units. Thus, information recording of a higher density can be performed, compared to those of the conventional heat mode method.

Information is optically read using wavelengths λ1', λ2', ..., and λn' in FIG. 24B as reading wavelengths. More specifically, when the light source for light having wavelength λ1' is scan-controlled and a light absorption strength distribution by the recording medium is measured, information in first layer 121₁ can be read out. Similarly, when light having wavelength λ2' is scanned, information in second layer 121₂ can be read out.

FIG. 27 schematically shows an arrangement of a system for reading out information in this manner. The system of FIG. 27 is basically the same as that of FIG. 25. Reading wavelengths are sequentially selected by filter 140 in the order of λ1', λ2', ... , and λn' and absorption strength distributions in the recording medium with the respective wavelengths are measured. Multiplex information can be read out in this manner. In FIG. 27, light transmitted through the recording medium is detected by photodetector 114. However, when the substrate is designed as a reflecting substrate, light reflected by the substrate can be read out.

As described above, according to the present invention, a recording device, wherein information is recorded in a considerably high density by using light having a plurality of wavelengths, can be obtained. Furthermore, since the information recording principle of the present invention utilizes charge transfer between molecules by the photon mode, when writing is performed using an external electric field as well, high-sensitive, high-contrast information recording can be performed.

The present invention is not limited to the above embodiments. For example, in the arrangement of the recording medium shown in FIG. 23, either the donor or acceptor molecule films of first, second, ... recording layers 121₁, 121₂, ... can be the same. An appropriate acceptor or donor molecule film can be provided in place of an insulating molecule film between the donor and acceptor molecule films of each recording layer. More specifically, between a first organic thin film containing donor molecules and a second organic thin film containing acceptor molecules, a third organic thin film containing acceptor molecules having a smaller electron affinity than that of the second organic thin film, or a third organic thin film containing donor molecules having a larger electron affinity than that of the first organic thin film, can be provided. Furthermore, the combination of different donor and acceptor molecule films need not be stacked as different layers, but can be an appropriate mixture film.

With reference to FIGS. 28 to 46, there is now be described field effect transistors (FETs). These FET's have the same structure as those disclosed in U.S. Ser. No. 029,968 field in U.S. on Mar. 25, 1987 by Nobuhiro GEMMA et al., except that the dyes of the invention are used as acceptor or donor molecules.

A charge transfer phenomenon is described above with reference to FIG. 1. When electrons pass from the donor molecules to the acceptor molecules, a potential distribution in the hetero structure shows discontinuous changes.

The present invention will be described, in greater detail, with reference to examples.

EXAMPLE 1

62 m mol of dibutyl malonate, 63 m mol of stearyl bromide, and 69 m mol of sodium were made to react in butanol in the presence of 2 m mol of a crown ether, thereby forming 30 m mol of dibutyl distearylmalonate. Dibutyl distearylmalonate, 15 m mol, was first hydrolyzed, and was then heated in vacuum to be decarboxylated, whereby obtaining 10 m mol of 2-octadecyl eicosanoic acid. This acid, 8 m mol, was converted into its acid chloride. The acid chloride was allowed to react with 10 m mol of p-amino-methylsulfonylanilide in pyridine, thereby obtaining 7 m mol of p-methylsulfonamide-3-heptadecyleicosanoylanilide. The eicosanoylanilide, 5 m mol, was allowed to react with lead tetraacetate in toluene, thus forming 3.2 m mol of N-(2-octadecyleicosanoyl)-N'methylsulfonyl-p-quinonediimine which is represented by the following formula:

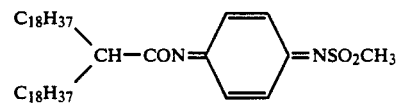

Figure 47:
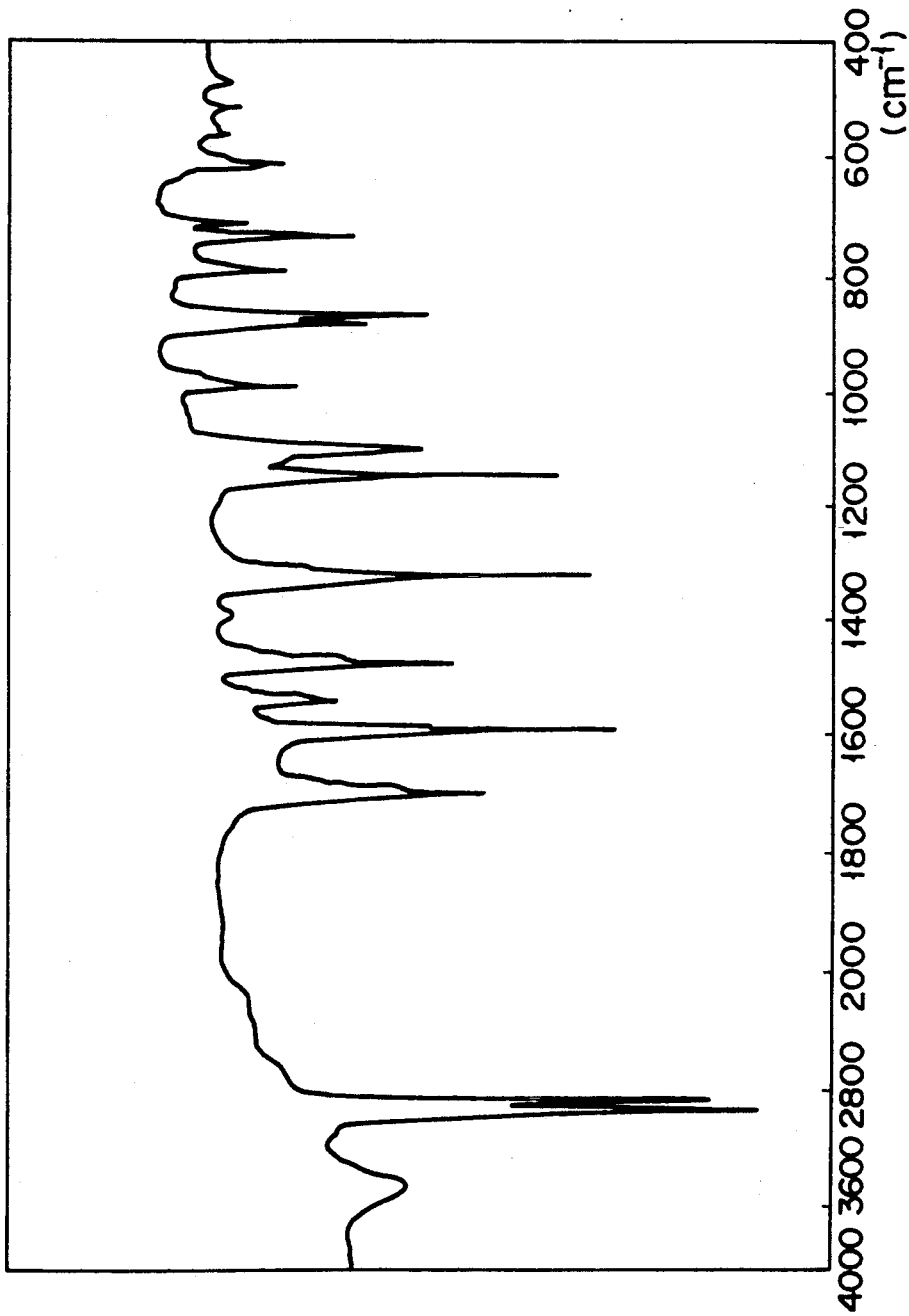
FIGS. 47 and 48 are infrared and NMR spectrum of the compound obtained in Example 1 of the invention.
Figure 48:
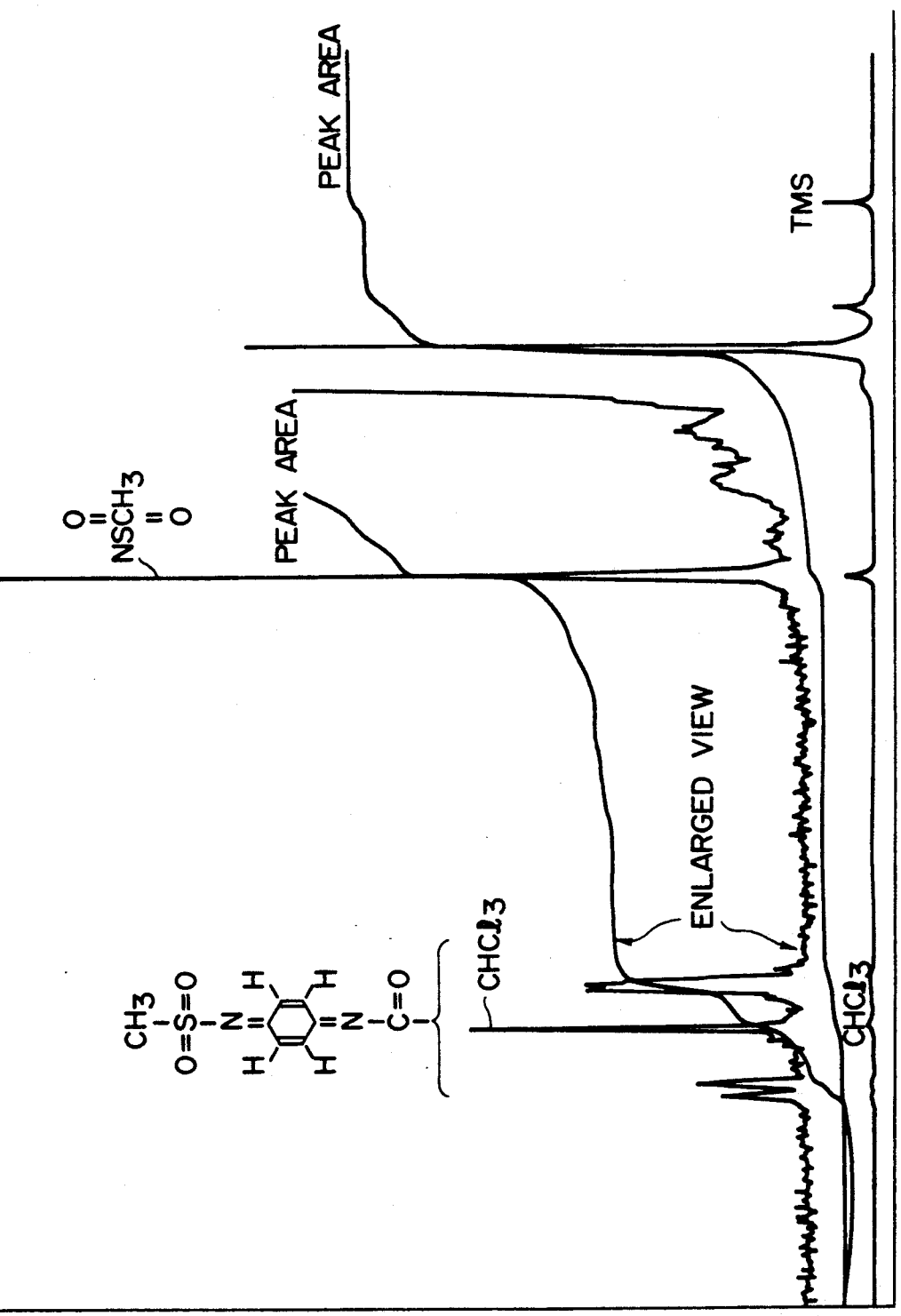

This compound had melting point of 62° C., and presented the infrared absorption spectrum (KBr) shown in FIG. 47. The characteristic groups identified from the characteristic group absorption (cm$^{-1}$) shown in FIG. 47 were: 2910-2850 (s, —CH$_2$—), 1695 (s, C=O), 1585 (s, C=C, C=N), 1470 (s, —CH$_2$—), and 1310, 1140 (s, —SO$_2$—). The compound had the $^1$H—NMR spectrum (CDCl$_3$) which is shown in FIG. 48. The characteristic groups identified from the chemical-shift position (ppm) shown in FIG. 48 are: 7.74 (m, syn SO$_2$ —N=C—CH=, 1.0 H), 6.8 (m, —CH=, 2.8 H), 3.24 (s, SO$_2$ —CH$_3$, 2.8 H), 2.5 (m, >CH—, 1 H), 2.0-1.0 (—CH$_2$—, 68 H), 0.88 (t, —CH$_3$, 6.0 H).

The compound was analyzed to determine its composition. The results were as follows:

| | Element Analysis (wt %) | | | |
| --- | --- | --- | --- | --- |
| | C | H | N | S |
| Measured Value | 74.56 | 11.87 | 3.43 | 3.94 |
| Calculated Value | 73.92 | 11.30 | 3.83 | 4.38 |

N-(2-octadecyl-eicosanoyl)-N'-methylsulfonyl-p-quinonediimine was dissolved in toluene, thus preparing a developing solution. This solution was dripped onto the surface of the water filled in a tank, thus forming monomolecular film. The monomolecular film was compressed to have the surface pressure of 25 dyn/cm. While maintaining the surface pressure of 25 dyn/cm, twenty layers of the monomolecular film were laid, one upon another, on a silicon substrate which has been treated with a silane coupling agent and thus been rendered hydrophobic. These layers of the film were examined under a differential interference microscope. It was ascertained that the film was a clean LB film having neither globular portions nor water-streaks.

EXAMPLE 2

50 m mol of 3,5-dihydroxybenzoic acid ethyl ester, 120 m mol of stearyl bromide, and 110 m mol of sodium were made to react in ethanol, thereby forming 35 m mol of 3,5-dioctadecyloxybenzoic acid ethyl ester. This ester, 25 m mol, was first hydrolyzed into the corresponding acid, which in turn was converted into its acid chloride. The acid chloride was reacted in the same way as in Example 1, whereby 10 m mol of N-(3,5-dioctadecyloxybenzoyl)-N'methylsulfonyl-p-quinonediimine was obtained which is represented by the following formula:

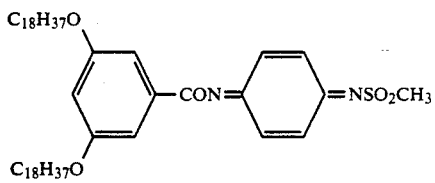

The compound was analyzed to determine its composition. The results were as follows:
Melting Point: 39° C.

| | Element Analysis (wt %) | | | |
|---|---|---|---|---|
| | C | H | N | S |
| Measured Value | 69.12 | 10.50 | 2.78 | 6.90 |
| Calculated Value | 68.32 | 9.83 | 3.25 | 7.44 |

Infrared Absorption Spectra (KBr): 2910–2850 (s. —CH$_2$—) 1660 (m, —C=O), 1595 (s, Bz, C=C, C=N), 1470 (s, —CH$_2$—), 1320, 1150 (s, —SO$_2$—), 1170 (s, C—O).

$^1$H—NMR Spectrum (CDCl$_3$): 7.9–6.6 (m, PhH, N=C—CH=, 6.7 H), 3.96 (t, —OCH$_2$—, 4.0 H), 3.24 (s, SO$_2$—CH$_3$, 2.9 H), 2.0–1.0 (—CH$_2$—, 64 H), 0.88 (t, —CH$_3$, 6.1 H).

N-(3,5-dioctadecyloxybenzoyl)-N'-methylsulfonyl-p-quinonediimine used in the same way as in Example 1, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 3

20 m mol of Cholesterol chloroformate was reacted with 25 m mol of p-amino-methylsulfonylanilide in pyridine, thereby forming 15 m mol of p-cholesteneoxycarbonylamino-methylsulfonylanilide. This compound, 10 m mol, was allowed to react with lead tetraacetate in toluene, forming 7.5 m mol of N-cholesteneoxycarbonyl-N'-methylsulfonyl-p-quinonediimine, which is represented by the following formula:

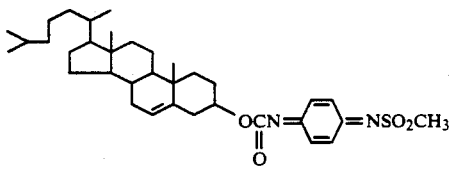

This compound did not have a specific melting point; denatured at 120° C. The compound was analyzed to determine its composition. The results were as follows:

| | Element Analysis (wt %) | | | |
|---|---|---|---|---|
| | C | H | N | S |
| Measured Value | 70.61 | 9.08 | 4.30 | 5.14 |
| Calculated Value | 70.43 | 8.78 | 4.69 | 5.37 |

Infrared Absorption Spectra (KBr): 2950–2850 (s, cholestene) 1720 (s, C=O), 1590 (s, C=C, C=N), 1320, 1140 (s, —CH$_2$—), 1230, (s, C—O).

$^1$H—NMR Spectrum (CDCl$_3$): 7.8 (d, syn SO$_2$—N=C—CH=, 0.7 H), 6.8 (m, CH=, 2.9 H), 5.4 (d, cholestene CH=, 1.1 H), 4.9 (m, >CH—O, 1,1 H), 3.24 (s, SO$_2$—CH$_3$, 2.7 H), 2.5–0.8 (cholestene, 43 H).

N-cholesteneoxycarbonyl-N'-methylsulfonyl-p-quinonediimine, thus prepared, was used in the same way as in Example 1, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 4

50 m mol of 5β-cholanic acid and thionyl chloride were allowed to react, thereby preparing 30 m mol of 5β-cholanic acid chloride. The compound, thus prepared, was made to react with 35 m mol of p-aminomethylsulfonylanilide methylsulfonylanilide in pyridine, forming 27 m mol of 5β-cholanic acid amidomethylsulfonylanilide. The sulfonylanilide, 10 m mol, was reacted with lead tetraacetate, prearing 8.5 m mol of N-5β-cholanoyl-N'-methylsulfonyl-p-quinonediimine, which is represented by the following formula:

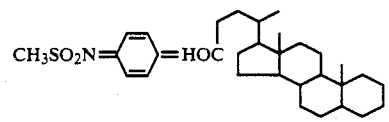

Infrared Absorption Spectra (KBr): 2950–2850 (s, cholan); 1689 (s, C=O); 1600 (s, C=C, C=N); 1310, 1140 (s, —SO$_2$—).

N-5β-cholanoyl-N'-methylsulfonyl-p-quinonediimine, thus obtained, was used exactly in the same way as in Example 1, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 5

50 m mol of Cholesterol chloroformate and 50 m mol of 2,6-dichloro-4-aminophenol were allowed to react, processed, thereby synthesizing 36 m mol of 2,6-dichloro-4-cholesteneoxycarbonylaminophenol. This compound, 20 m mol, was made to react with lead tetraacetate, thereby forming 12.5 m mol of 2,6-dichloro-N-cholesteneoxycarbonylquinoneimine, which is represented by the following formula:

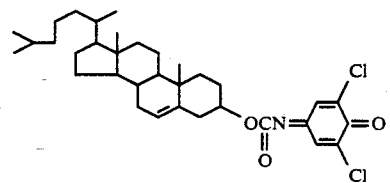

This compound did not have a specific melting point; denatured at 125° C.

Infrared Absorption Spectra (KBr): 2950–2850 (s, cholestene); 1720 (s, NC=O); 1690 (s, quinone C=O); 1625 (m, C=N); 1580 (s, C=C); 1470 (m, —CH$_2$—); 1230, (s, C—O).

$^1$H—NMR Spectrum (CDCl$_3$): 20 7.25 (s, CH=, 1.7 H); 5.4(d. cholestene CH=, 0.8 H); 4.9 (m, >CH—O, 0.8 H); 2.0–0.6(cholestene, 43 H).

The compound, 2,6-dichloro-N-cholesteneoxycarbonylquinoneimine, thus obtained, was used exactly in the same way as in Example 1, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 6

50 m mol of Cholesterol was allowed to react with 50 m mol of anthraquinone-β-carbonyl chloride in pyridine, thereby forming 45 m mol of cholesterylanthraquinone-β-carboxylate. The compound, thus obtained, is identified with the following formula:

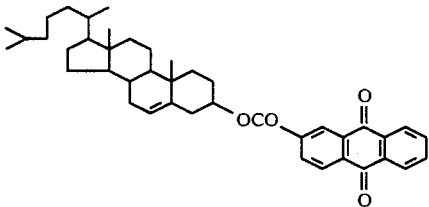

This compound dit not have a specific melting point; denatured at 170° C.

Infrared Absorption Spectra (KBr): 2950–2850 (s, cholestene); 1730 (s, ester C=O); 1680 (s, quinone C=O); 1590 (s, Bz); 1470 (m, cholestene); 1240, 1265 (=, C—O).

$^1$H—NMR Spectrum (CDCl$_3$): 8.92 (s, PhH, 0.9 H); 8.4 (m, PhH, 3.9 H); 7.8 (m, PhH, 2.1 H); 5.46 (d, CH=, 0.9 H); 4.9 (m, >CH—O, 0.9 H); 2.5–0.6 (cholestene, 34 H).

The compound, i.e., cholesteryl-anthraquinone-β-carboxylate, thus obtained, was used exactly in the same way as in Example 1, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 7

25 m mol of 3-cholestanone, 28 m mol of ethyl diethylphosphonoacetate, and 28 m mol of sodium were put into ethanol, and were then heated under reflux for one day. Thereafter, the ethanol was stripped off, and the residual solid matter wa washed with water. The solid matter was recrystallized from ethanol. The resultant crystal was reduced in a hydrogen atmosphere of 50 atoms in the presence of palladium carbon used as catalyst. The reduced product was hydrolyzed with sodium hydroxide, thereby forming 12 m mol of (3-cholestyl) acetic acid. The acid, 10 m mol, was treated with thionyl chloride, thus preparing the corresponding acid chloride. The acid chloride was made to react with 11 m mol of p-amino-methylsulfonylanilide in pyridine. The product of this reaction was treated with lead tetraacetate in toluene, thereby preparing 7.5 m mol of N-(3-cholestyl)methylenecarbonyl-N'-methylsulfonyl-p-quinonediimine was obtained, which is represented by the following formula:

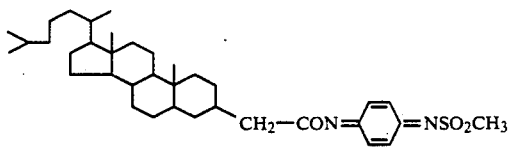

This compound was analyzed for its infrared absorption spectra (KBr). The results were as follows:

Infrared Absorption Spectra (KBr): 2950–2850 (s, cholestene); 1680 (s, C=O); 1600 (s, C=C, C=N); 1310, 1145 (s, —SO$_2$—).

The compound, i.e., N-(3-cholestyl)-methylenecarbonyl-N'-methylsulfonyl-p-quinonediimine, thus obtained, was used exactly in the same way as in Example 1, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 8

50 m mol of stearone, 60 m mol of ethyl diethylphosphonoacetate, and 60 m mol of sodium were put into ethanol, and were then heated under reflux for one day. Thereafter, the ethanol was stripped off, and the residual solid matter was washed with water. The solid matter was recrystallized in ethanol, thus obtaining 35 m mol of 3-heptadecyl-2-eicosanoic acid ethyl ester. This crystal, 30 m mol, was reduced in ethanol under a hydrogen pressure of 50 atom in the presence of palladium carbon used as catalyst, thereby forming 27 m mol, 3-heptadecyleicosanoic acid ethyl ester. Thus product, 25 m mol, was hydrolyzed with sodium hydroxide, whereby 23 m mol of 3-heptadecyl eicosanoic acid was prepared. This acid, 20 m mol, was treated with thionyl chloride, thus preparing acid chloride. The acid chloride was made to react with 22 m mol of p-aminomethylsulfonylanilide in pyridine. The reaction product was treated with lead tetraacetate in toluene, thereby preparing 15 m mol of N-(3-heptadecyleicosanoyl)-N'-methylsulfonyl-p-quinonediimine was obtained, which is represented by the following formula:

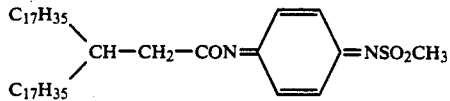

The compound, i.e., N-(3-heptadecyl-eicosanoyl)-N'-methylsulfonyl-p-quinonediimine, thus prepared, was used exactly in the same way as in Example 1, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 9

The product obtained in Example 1, i.e., 25 m mol of 2-octadecyl-eicosanoyl chloride was allowed to react with 25 m mol of p-dimethoxybenzene in carbon disulfide in the presence of 25 m mol of aluminum chloride, thus preparing 18 m mol of 2-octadecyleicosanoyl-p-dimethoxybenzene. This product, 15 m mol, was subjected to Clemmensen reduction, and made into, 10 m mol of 2-octadecyleicosanyl-p-dimethoxybenzene. This compound was demethylated in benzene, by using aluminum chloride, thereby forming 8.2 m mol of 2-octadecyleicosanyl-p-dihydroxyquinone. The dihydroquinone, 7 m mol, was oxidized in toluene, by using sliver oxide, whereby 6.3 m mol of 2-octadecyleicosanyl-p-benzoquinone, which is represented by the following formula:

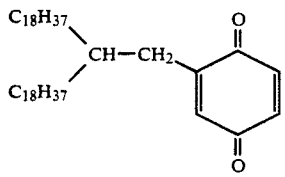

The compound, i.e., 2-octadecyleicosanylpbenzoquinone, thus prepared, was used exactly in the same way as in Example 1, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 10

50 m mol of dimethylaminomethylferrocene and 80 m mol of methyl iodide were processed, thus forming 48 m mol of a quaternary ammonium salt. The quaternary ammonium salt was reacted with 48 m mol of malonic acid diethyl ester, whereby 30 m mol of ferrocenemethyl malonic acid diethyl ester was prepared. This reaction product, 25 m mol, was hydrolyzed and decarboxylated thereby obtaining 21 m mol of ferrocene propionic acid. Condensation was performed between this product, 15 m mol, and 15 m mol of dioctadecylamine, in the presence of dicyclohexylcarbodiimide, thus preparing ferrocene 12 m mol of propionic acid dioctadecylamide, which is represented by the following formula:

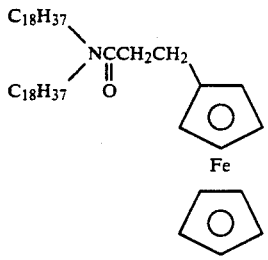

The compound, i.e., ferrocene propionic acid dioctadecylamide, thus prepared, was used exactly in the same way as in Example 1, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 11

20 m mol of cholestanol and 20 m mol of p-toluenesulfonylchloride were allowed to react in pyridine, thus forming sulfonic acid ester. This ester, 15 m mol, was made to react with 50 m mol of p-aminoacetoanilide in DMF, obtaining 3.5 m mol of p-cholestaneaminoacetoanilide. This product, 2.5 m mol, was hydrolyzed in ethanol, by using hydrochloric acid. The hydrolyzed product was treated with sodium hydroxide, whereby 1.5 m mol of N-cholestane-p-pheylenediamide, which is identified with the following formula:

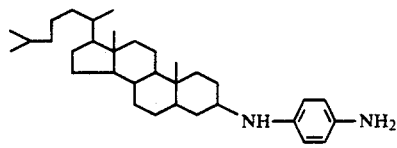

The compound was analyzed to determine its composition. The results were as follows:
Melting Point: 125° C.

| | Element Analysis (wt %) | | |
|---|---|---|---|
| | C | H | N |
| Measured Value | 81.92 | 12.02 | 5.83 |
| Calculated Value | 82.78 | 11.37 | 5.85 |

Infrared Absorption Spectra (KBr): 2950-2850 (s. cholestane) 1620 (m, Bz), 1520 (s, Bz); 1260-1300 (m, C—N).

$^1$H—NMR Spectrum (CDCl$_3$), 6.54 (q, Ph—H, 3.6 H); 3.55 (b, >CH—N, 0.9 H); 3.35 (b, —NH$_2$, —NH—, 2.7 H); 2.0-0.6 (cholestane, 46 H).

The compound thus obtained, i.e., N-cholestane-p-pheylenediamide was used in the same way as in Example 1, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 12

20 m mol of Stearoyl chloride was processed in the same way as in Example 1, thereby preparing 10 m mol of N-stearoyl-N'-methyl-sulfonyl-p-quinonediimine, which is represented by the following formula:

The compound, thus obtained was analyzed to determine its composition. The results were as follows:
Melting Point: 90° C.

| | Element Analysis (wt %) | | | |
|---|---|---|---|---|
| | C | H | N | S |
| Measured Value | 66.02 | 9.15 | 6.04 | 7.09 |

| Element Analysis (wt %) | | | | |
|---|---|---|---|---|
| | C | H | N | S |
| Calculated Value | 65.71 | 9.65 | 6.39 | 7.31 |

Infrared Absorption Spectra (KBr): 2910–2850 (s. —$CH_2$—); 1680 (s, —C=O); 1600 (s, C=C, C=N); 1470 (m, —$CH_2$—); 1310, 1140 (s, —$SO_2$—).

$^1$H—NMR Spectrum ($CDCl_3$): 7.8 (d, syn $SO_2$—N=C—CH=, 1.0 H); 6.8 (m, CH=C, 2.8 H); 3.24 (S, SO2—CH3′ 2.8 H); 2.50 (t, —$CH_2$—CO, 1.8 H); 2.0–1.0 (—$CH_2$—, 30 H); 0.88 (t, —$CH_3$, 3.2 H).

The compound, thus obtained, i.e., N-stearoyl-N′-methylsulfonyl-p-quinonediimine was dissolved in toluene, thus preparing a developing solution. This solution was dripped onto the surface of the water filled in a tank, thus forming a monomolecular film. The monomolecular film was compressed, while maintaining the surface pressure at 25 dyn/cm. Twenty layers were cut from the film, each layer having the same size as a silicon substrate which has been treated with a silane coupling agent and thus been rendered hydrophobic. These layers were laid, one upon another, on the silicon substrate. The layers were positioned horizontally until they were laid on the substrate. The layers of the film were examined under a differential interference microscope. It was ascertained that the film was a clean LB film.

EXAMPLE 13

20 m mol of stearoyl chloride and 20 m mol of p-aminoacetoanilide were processed, thereby synthesizing 18 m mol of p-acetoamide-stearoylanilide. This product was reacted with lead tetraacetate, thus forming 13 m mol of N-stearoyl-N′-acetyl-p-quinoneimine, which is identified with the following formula:

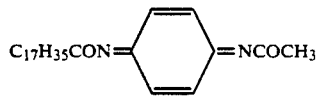

This compound was analyzed to determine its composition. The results were as follows:
Melting Point: 92° C.

| | Element Analysis (wt %) | | |
|---|---|---|---|
| | C | H | N |
| Measured Value | 73.78 | 9.96 | 6.39 |
| Calculated Value | 75.32 | 10.21 | 6.76 |

Infrared Absorption Spectra (KBr): 2910–2850 (s. —$CH_2$—); 1695 (s, —C=O); 1610 (s, C=C, C=N); 1475 (m, —$CH_2$—).

$^1$H—NMR Spectrum ($CDCl_3$): 7.8 (d, syn $SO_2$—N=C—CH=, 1.0 H); 6.8 (m, CH=C, 2.8 H); 3.24 (s, SO2—$CH_3$, 2.8 H); 2.50 (t, —$CH_2$—CO, 1.8 H); 2.0–1.0 (—$CH_2$—, 30 H); 0.88 (t, —$CH_3$, 3.2 H).

The compound thus obtained, i.e., N-stearoyl-N′-acetyl-p-quinoneimine was used in the same way as in Example 12, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 14

10 m mol of octadecyl sulfonyl chloride and 10 m mol of p-aminophenol were reacted, thus synthesizing 8.5 m mol of octadecylsulfonyl-p-hydroxyanilide. This product was made to react with lead tetraacetate, thereby preparing 7 m mol of N-octadecylsulfonyl-quinoneimine, which is represented by the following formula:

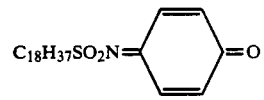

The compound was found to have a melting point of 87° C.

This compound, i.e., N-octadecylsulfonylquinoneimine, was used in the same way as in Example 12, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 15

10 m mol of Tetrathiafulvalenedicarbonylchloride and 20 m mol of dioctadecylamine were reacted with each other, forming 5.1 m mol of tetrathiafulvalenedicarboxylic acid N,N-dioctadecyldiamide, which is identified with the following formula:

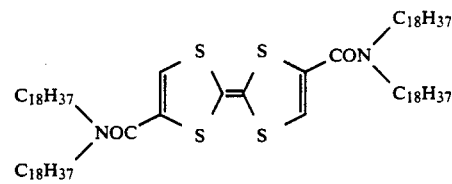

This compound was analyzed for its melting point, its infrared absorption spectra (KBr), and its $^1$H—NMR spectrum ($CDCl_3$). The results were as follows:
Melting Point: 75° C.

Infrared Absorption Spectra (KBr): 2910–2850 (s. —$CH_2$—); 1625 (s, —C=O); 1555 (m, C=C, C=N); 1470 (s, —$CH_2$—)

$^1$H—NMR Spectrum ($CDCl_3$): 6.50 (s, CH=, 2 0 HH); 3.36 (t, —$CH_2$—N, 8 H); 2.0–1.0 (—$CH_2$—, 128 H); 0.88 (t, —$CH_3$, 12.4 H).

The compound thus obtained, i.e., tetrathiafulvalenedicarboxylic acid N, N-dioctadecyldiamide was used in the same way as in Example 12, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 16

20 m mol of Cathecol, 45 m mol of stearylbromide, and 22 m mol of sodium were allowed to react in ethanol, thereby preparing 12 m mol of 1,2-dioctadecyloxybenzene. This reaction product, 11 m mol, was made to react with chlorosulfonic acid, whereby 10 m mol of 3,4-dioctadecyloxybenzenesulfonylchloride. This product was, 8 mol mol, allowed to react with 9 m mol of p-aminomethylsulfonyl anilide, thus forming 8.2 m mol of p-methylsulfoneamide-3,4dioctadecyloxybenzenesulfonylanilide. Further, the anilide, 7 m mol, was treated with lead tetraacetate in toluene, thus obtaining 5.3 m mol of N-(3,4-dioctadecyloxybenzenesulfonyl)-N'-methylsulfonyl-p-quinonediimine, which is represented by the following formula:

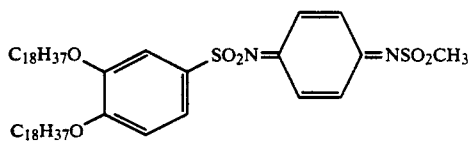

This compound was analyzed for its melting point, its infrared absorption spectra (KBr), and its $^1$H—NMR spectrum (CDCl$_3$). The results were as follows:

Melting Point: 65° C.

Infrared Absorption Spectra (KBr): 2910–2850 (s. —CH$_2$—); 1585, 1570 (s, Bz, C=C, C=N); 1470 (s, —CH$_2$—); 1320, 1150 (s, —SO$_2$—).

$^1$H—NMR Spectrum (CDCl$_3$): 8.2–6.6 (m, Ph—H, N=C—CH=, 7.0 H); 4.05 (t, —OCH$_2$—, 3.9 H); 3.27 (s, SO$_2$—CH$_3$, 2.7 H); 2.0–1.0 (—CH$_2$—, 64 H); 0.88 (t, —CH$_3$, 6.1 H).

The compound thus obtained, i.e., N-(3,4-dioctadecyloxybenzenesulfonyl)-N'-methylsulfonyl-p-quinonediimine was used, exactly in the same way as in Example 12, whereby 20 layers of the monomolecular film were laid, one upon another, on the same silicon substrate as was used in Example 1. These layers of the film were examined under a differential interference microscope and also under an electron microscope. The film was found to be a clean LB film.

EXAMPLE 17

5 m mol of 3,4-dioctadecyloxybenzenesulfonylchloride, which was obtained in Example 16, and 5 m mol of 4-amino-2,6-dichlorophenol were made to react with each other, forming 2,6-dichloro-4-(3,4-dioctadecyloxybenzenesulfonylamide) phenol. This reaction product, 2.7 m mol, was made to react with lead tetraacetate in toluene, thereby preparing 1.8 m mol of N-(3,4-dioctadecyloxybenzenesulfonyl)-quinoneimine, which is identified with the following formula:

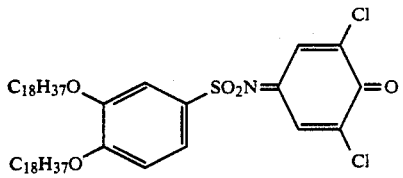

This compound was analyzed for its infrared absorption spectra (KBr), and its $^1$H—NMR spectrum (CDCl$_3$). The results were as follows:

Infrared Absorption Spectra (KBr): 2910–2850 (s. —CH$_2$—); 1690 (s, C=O); 1620 (m, Bz); 1580, 1550 (s, C=C, C=N); 1470 (s, —CH$_2$—); 1320, 1150 (s, —SO$_2$—); 1270 (s, C—O—Ph).

$^1$H—NMR Spectrum (CDCl$_3$): 8.49 (d, syn —SO$_2$—N=C=CH=, 0.8 H); 7.6–6.6 (m, Ph—H, anti —N=C—CH=, 3.9 H); 4.05 (t, —OCH$_2$—, 3.6 H); 2.0–1.0 (—CH$_2$—, 64 H); 0.88 (t, —CH$_3$, 5.9 H).

The compound thus obtained, i.e., N-(3,4-dioctadecyloxy-benzenesulfonyl)-quinoneimine was used, exactly in the same way as in Example 12, whereby 20 layers of the monomolecular film were laid, one upon another, on the same silicon substrate as was used in Example 1. The layers of the film were examined under a differential interference microscope and also under an electron microscope. The film was found to be a clean LB film.

EXAMPLE 18

The compound obtained in Example 9, i.e., 2-octadecyleicosanyl-p-benzoquinone, 3 m mol, was allowed to react with 6.5 m mol of bis (trimethylsilyl) carbodiimide in methylenechrolide in the presence of titanium tetrachloride, thus forming 1.8 m mol of 2-octadecyleicosanyl-N,N'-dicyanoquionediimine, which is represented by the following formula:

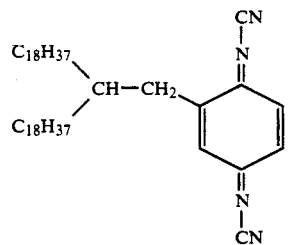

This compound was analyzed for its infrared absorption spectra (KBr). The results were as follows:

Infrared Absorption Spectra (KBr): 2910–2850 (s. —CH$_2$—); 2170 (m, C≡N); 1580 (s, C=C); 1560 (s, C=N).

The compound thus obtained, i.e., 2-octadecyleicosanyl-N,N'-dicyanoquinonediimine was used, exactly in the same way as in Example 12, whereby 20 layers of the monomolecular film were laid, one upon another, on the same silicon substrate as was used in Example 1. The layers of the film were examined under a differential interference microscope and also under an electron microscope. The film was found to be a clean LB film.

EXAMPLE 19

10 m mol of 2-octadecyleicosanyl-p-dimethoxybenzene was treated with sodium in liquid ammonia, thus forming 7.2 m mol of 2-octadecyl-eicosanyl-cyclohexane-1,4-dione. This product, 6 m mol, was reacted with 13 m mol of malononitrile. The resultant reaction product was treated with bromine in pridine, thus obtaining 7 m mol of 2-octadecyleicosanyl-tetracyanoquinodimethane, which is represented by the following formula:

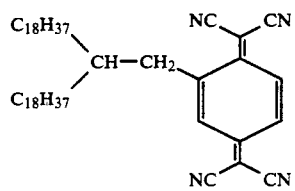

This compound was analyzed for its infrared absorption spectra (KBr). The results were as follows:

Infrared Absorption Spectra (KBr): 2910–2850 (s. —CH$_2$—); 2200 (m, C≡N).

The compound thus obtained, i.e., 2-octadecyleicosanyl-tetracyanoquinodimethane was used, exactly in the same way as in Example 12, whereby 20 layers of the monomolecular film were laid, one upon another, on the same silicon substrate as was used in Example 1. The layers of the film were examined under a differential interference microscope and also under an electron microscope. The film was found to be clean LB film.

EXAMPLE 20

30 m mol of stearoyl chloride and 15 m mol of p-pheylenediamine were allowed to react, thereby synthesizing 11 m mol of p-pheylenediamine distearylamide. The synthesized product was made to react with lead tetraacetate, thus obtaining 7.5 m mol of N,N'-distearoyl-p-quinonediimine, which is represented by the following formula:

This compound was analyzed for its melting point, its infrared absorption spectra (KBr), and its $^1$H—NMR spectrum (CDCl$_3$). The results were as follows:

Melting Point: 106° C.

Infrared Absorption Spectra (KBr): 2910, 2850 (s, —CH$_2$—); 1690 (s, —C=O); 1605 (s, C=C, C=N); 1475 (s, —CH$_2$—).

$^1$H—NMR Spectrum (CDCl$_3$): 6.77 (s, CH=, 3.7 H); 2.49 (t, —CH$_2$—CO, 3.7 H); 2.0–1.0 (—CH$_2$—, 60 H); 0.88 (t, —CH$_3$, 6.3 H).

The compound, thus obtained, i.e., N,N'-distearoyl-p-quinonediimine, and arachidic acid were dissolved in toluene in molar ratio of 1:4, whereby a developing solution was prepared. This solution was dripped onto the Cd Cl$_2$ aqueous solution (concentration: 10$^{-4}$ mol/l) filled in a tank, thereby developing monomolecular film on the surface of the aqueous solution. The monomolecular film was compressed, while maintaining the surface pressure at 25 dyn/cm. Twenty layers of this film were laid, one upon another, on a silicon substrate which has been treated with a silane coupling agent and thus been rendered hydrophobic. The layers were positioned vertically until they were laid on the substrate. The layers of the film were examined under a differential interference microscope. It was ascertained that the film was a clean LB film.

EXAMPLE 21

50 m mol of lauroyl chloride and 50 m mol of 45 m mol of p-nitroaniline were processed, forming p-nitrolauloylanilide. The nitro group of this compound was reduced, whereby 40 m mol of p-aminolauroylanilide was obtained. The p-aminolauroylanilide, 35 m mol, was made to react with 35 m mol of terephthalic acid chloride. The reaction product was treated with ethanol, and then reacted with lead tetraacetate, thereby preparing N-lauroyl-N'(p-ethoxycarbonyl-phenylenecarbonyl)-p-quinonediimine, which is identified with the following formula:

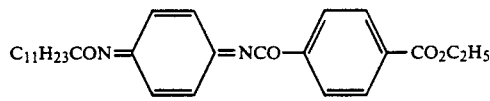

This compound was analyzed for its melting point, its infrared absorption spectra (KBr), and its $^1$H—NMR spectrum (CDCl$_3$). The results were as follows:

Melting Point: 96° C.

Infrared Absorption Spectra (KBr): 2910, 2850 (s, —CH$_2$—); 1720 (s, ester —C=O); 1680, 1655 (s, C=O); 1610 (s, C=C, C=N); 1585 (m, Bz); 1470 (m, —CH$_2$—); 1280, 1105 (s, C=O).

$^1$H—NMR Spectrum (CDCl$_3$): 8.05 (q, Ph—H, 4.0 H); 6.86(d, CH=, 4.0 H); 4.41 (q, O—CH$_2$—, 2.0 H); 2.50 (t, —CH$_2$—CO, 2.0 H); 2.0–1.0 (—CH$_2$—, ethyl—CH$_3$, 23 H); 0.88 (t, —CH$_3$, 3.0 H).

The compound thus obtained, i.e., N-lauloyl-N'-(p-ethoxycarbonyl-phenylenecarbonyl)-p-quinonediimine was used, exactly in the same way as in Example 20, whereby 20 layers of the monomolecular film were laid, one upon another, on the same silicon substrate as was used in Example 1. The layers of the film were examined under a differential interference microscope and also under an electron microscope. The film was found to be a clean LB film.

EXAMPLE 22

The intermediate product obtained in Example 11, i.e., p-cholestaneamino-acetoanilide, 5 m mol, was reacted with 15 m mol of methyl iodide in toluene, thus preparing iodide of p-cholestane (methyl-)aminoacetatoanilide. This iodide was hydrolyzed in ethanol, and stirred with sodium hydroxide in toluene. Toluene was stripped off, and iodide was recrystallized in petroleum benzine, thereby obtaining 1.2 m mol of N-cholestane-N-methyl-p-phenyldiamine, which is represented by the following formula:

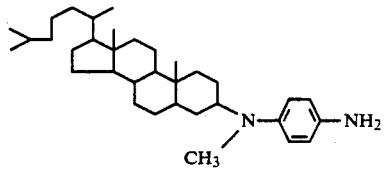

This compound was analyzed for its melting point, its infrared absorption spectra, its $^1$H—NMR spectrum (CDCl$_3$), and its composition. The results were as follows:

Melting Point: 116° C.

Infrared Absorption Spectra: (Nujol method); 3350, 3200 (b, —NH$_2$) (KBr); 2950–2850 (s, cholestane); 1620 (m, Bz); 1520 (s, Bz); 1260 (m, C—N).

$^1$H—NMR Spectrum (CDCl$_3$): 7.12 (d, Ph—H, 1.8 H); 6.79 (d, Ph—H, 1.9 H); 2.97 (b, >CH—N, 0.9 H); 2.60 (s, N—CH$_3$, 2.6 H); 2.0–0.6 (cholestaine, 46 H).

|  | Element Analysis (wt %) | | |
| --- | --- | --- | --- |
|  | C | H | N |
| Measured Value | 82.66 | 11.91 | 5.73 |
| Calculated Value | 82.86 | 11.45 | 5.68 |

The compound thus obtained, i.e., N-cholestane-N-methyl-p-phenylenediamine was used, exactly in the same way as in Example 1, whereby 20 layers of the monomolecular film were laid one upon another, on the same silicon substrate as was used in Example 1. The layers of the film were examined under a differential interference microscope and also under an electron microscope. The film was found to be a clean LB film.

EXAMPLE 23

The product obtained in Example 22, i.e., N-cholestane-N-methyl-p-phenylenediamine, 2.5 m mol, was allowed to react with 6 m mol of 2-bromoethanol in N,N-dimethylformamide in the presence of sodium hydrogen carbonate, thereby forming 1.8 m mol of N-cholestane-N-methyl-N',N'-dihydroxyethyl-p-phenylenediamine, which is identified with the following formula:

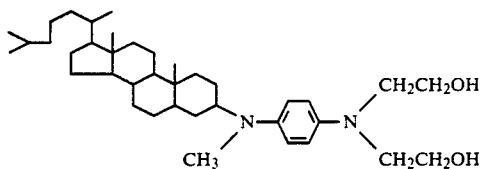

This compound was analyzed for its melting point, its infrared absorption spectra and its $^1$H—NMR spectrum (CDCl$_3$). The results were as follows:

Melting Point: 170° C.

Infrared Absorption Spectra: (Nujol method); 3300 (b, —OH) (KBr); 2950-2850 (s, cholestane); 1610 (m, Bz); 1520 (s, Bz).

$^1$H—NMR Spectrum (CDCl$_3$): 6.98 (b, Ph—H, 1.9 H); 6.68 (b, Ph—H, 1.8 H); 3.8 (b, —OH, —CH$_2$—O, 6.1 H); 3.5 (b, —N—CH$_2$—, 4.2 H); 3.0 (b, CH—N, 1 H); 2.6 (b, —N—CH$_3$, 2.8 H); 2.0-0.6 (cholestane, 46 H).

The compound thus obtained, i.e., N-cholestane-N-methyl-N',N'-dihydroxyethyl-p-phenylenediamine was used, exactly in the same way as in Example 1, whereby 20 layers of the monomolecular film were laid, one upon another, on the same silicon substrate as was used in Example 1. The layers of the film were examined under a differential interference microscope and also under an electron microscope. The film was found to be a clean LB film.

EXAMPLE 24

25 m mol of 5β-cholanic acid was heated in ethanol in the presence of sulfic acid, forming 23 m mol of 5β-cholanic acid ethyl ester. This product was reduced by using lithium aluminum hydride, into 20 m mol of 5β-cholane alcohol. This alcohol, 19 m mol, was subjected to tosylation and then treated with thiourea. The resultant product was treated with bromine water, whereby 10 m mol of 5β-cholanesulfonylbromide was obtained. This compound, 8 m mol, was made to react with 8.5 m mol of nitroaniline. The product of this reaction was subjected to hydrogenation, thus 6.1 m mol of preparing p-amino-5β-cholanesulfonylanilide. This anilide was reacted with cyanogen bromide, and the resultant product was treated with dichloro-dicyanobenzoquinone, thereby obtaining 1.2 m mol of N-5β-cholanesulfonyl-N'-cyano-p-quinonediimine, which is represented by the following formula:

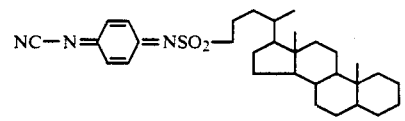

The compound thus obtained, i.e., N-5β-cholanesulfonyl-N'-cyano-p-quinonediimine was used, exactly in the same way as in Example 12, whereby 20 layers of the monomolecular film were laid, one upon another, on the same silicon substrate as was used in Example 1. The layers of the film were examined under a differential interference microscope and also under an electron microscope. The film was found to be a clean LB film.

EXAMPLE 25

The intermediate product obtained in Example 24, i.e., 5β-cholanesulfonylbromide, 2 m mol, was made to react with 3 m mol of p-amino-methylsulfonylanilide in pyridine. The resultant product was dehydrogenated with lead tetraacetate in toluene, thereby preparing 1.1 m mol of N-5β-cholanesulfonyl-N'-methylsulfonyl-p-quinonediimine, which is represented by the following formula:

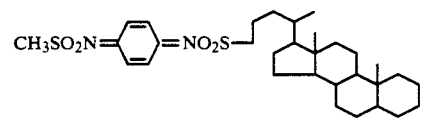

IR (KBr): 2950-2850 (S, steroid); 1590, 1575 (S, C=C, C=N); 1300, 1140 (—SO$_2$—).

The compound thus obtained, i.e., N-5β-cholanesulfonyl-N'-methylsulfonyl-p-quinonediimine, was used, exactly in the same way as in Example 1, whereby 20 layers of the monomolecular film were laid, one upon another, on the same silicon substrate as was used in Example 1. The layers of the film were examined under a differential interference microscope and also under an electron microscope. The film was found to be a clean LB film.

EXAMPLE 26

The intermediate product obtained in Example 24, i.e., 5β-cholane alcohol, 10 m mol, was subjected to tosylation and treated with lithium bromide, thus forming 8 m mol of 5β-cholane bromide. 5β-cholane bromide was made to react with 12 m mol of triphenylphosphine in toluene, thereby preparing 7.8 m mol of 5β-cholane-triphenylphosphonium bromide. This product, 7.5 m mol, was reacted with 7.5 m mol of p-dimethoxybenzaldehyde in ether in the presence of butyl lithium. The product resulting from this reaction was hydrogenated, by using palladium carbon as catalyst, whereby 7.0 m mol of 5β-cholane-p-dimethoxybenzene was obtained. This compound, 6.8 m mol, was treated with sodium in liquid ammonia, thus forming 5.1 m mol of 5β-cholane-cyclohexyl-1,4-dione. This product, 4.5 m mol, was made to react with 10 m mol of malononitrile. The reaction product was treated with bromine, thereby preparing 1.2 m mol of 5β-cholanetetracyanoquinodimethane, which is identified with the following formula:

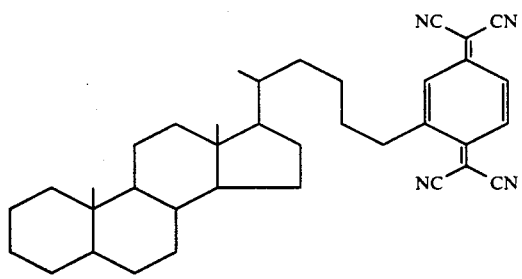

The compound thus obtained, i.e., 5β-cholanetetracyanoquinodimethane, was used, exactly in the same way as in Example 12, whereby 20 layers of the monomolecular film were laid, one upon another, on the same silicon substrate as was used in Example 1. The layers of the film were examined under a differential interference microscope and also under an electron microscope. The film was found to be a clean LB film.

EXAMPLE 27

The intermediate product prepared in Example 26, i.e., 5β-cholane-p-dimethoxybenzene, 2 m mol, was treated with 5 m mol of aluminum chloride in benzene, and dehydrogenated by using silver oxide, thus preparing 0.8 m mol of 5β-cholane-p-benzoquinone, which is represented by the following formula:

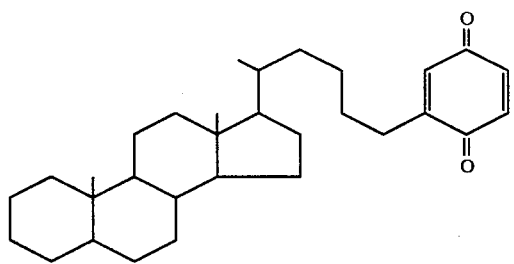

The compound thus obtained, i.e., 5β-cholane-p-benzoquinone, was used, exactly in the same way as in Example 1, whereby 20 layers of the monomolecular film were laid, one upon another, on the same silicon substrate as was used in Example 1. The layers of the film were examined under a differential interference microscope and also under an electron microscope. The film was found to be a clean LB film.

EXAMPLE 28

The compound prepared in Example 27, i.e., 5β-cholane-p-benzoquinone, 1.2 m mol, was reacted with 3 m mol of bis(trimethyl-silyl)carbodiimide in the presence of titanium tetrachloride, thereby forming 0.7 m mol of 5β-cholane-N,N'-dicyanoquinonediimide, which is identified with the following formula:

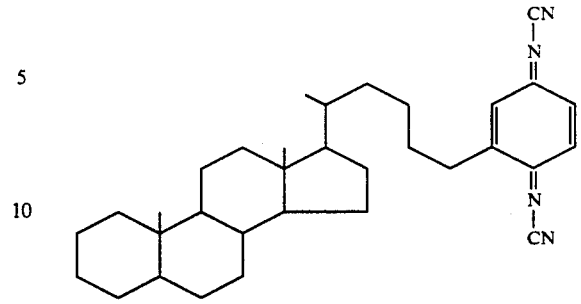

The compound thus obtained, i.e., 5β-cholane-N,N'-dicyanoquinonediimide, was used, exactly in the same way as in Example 12, whereby 20 layers of the monomolecular film were laid, one upon another, on the same silicon substrate as was used in Example 1. The layers of the film were examined under a differential interference microscope and also under an electron microscope. The film was found to be a clean LB film.

EXAMPLE 29

12 m mol of 4-chloro-o-phenylenediamine was allowed to react with 25 m mol of 1-octadecylsulfonyl chloride to produce 4-chloro-N,N'-di(octadecylsulfonyl)-o-benzene diamide, 9.5 m mol.

8 m mol of the diamide was treated with lead tetraacetate to produce 6.5 m mol of 4-chloro-N,N'-di(octadecylsulomyl)-o-quinonediimine; which is represented by the following formula:

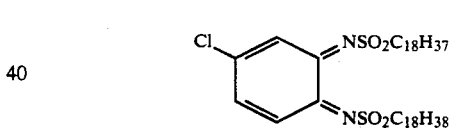

The compound thus obtained, i.e., 4-chloro-N,N'-di(octadecylsulfonyl)-o-quinonediimine was used, exactly in the same way as in Example 1, whereby 20 layers of the monomolecular film were laid, one upon another, on the same silicon substrate. The layers of the film were examined under a differential interference microscope and also under an electron microscope. The film was found to be a clean LB film.

CONTROL 1

Instead of tetracyanodimethane derivative obtained in Examples 19 and 26, octadecyltetracyanoquinodimethane, which is represented by the following formula, was used, exactly in the same way as in Examples 19 and 26, whereby 20 layers of the monomolecular film were laid, one upon another, on the same silicon substrate as was used in Example 1. The layers of the film were examined under a differential interference microscope and also under an electron microscope. The film contained a number of particles (three-dimensional crystals), and was not homogeneous LB film.

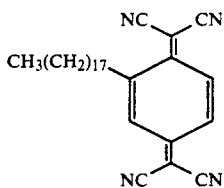

CONTROL 2

Instead of N-cholestane-p-phenylenediamine obtained in Example 11, N-octadecyl-p-phenylenediamine, which is identified with the following formula, was applied, thus developing a monomolecular film on the surface of pure water, while maintaining the pressure of the water surface at 25 dyn/cm. The monomolecular film was gradually condensated. The resultant film was not a stable monomolecular film.

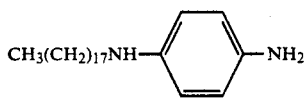

CONTROL 3

Instead of N,N'-dicyanoquinonediimine obtained in Examples 18 and 28, octadecyl-N,N'-dicyanoquinonediimine, which is represented by the following formula, was used, exactly in the same way as in Examples 18 and 26, whereby 20 layers of the monomolecular film were laid, one upon another, on the same silicon substrate as was used in Example 1. The layers of the film were examined under a differential interference microscope and also under an electron microscope The film contained a number of particles (three-dimensional crystals), and was not homogeneous LB film.

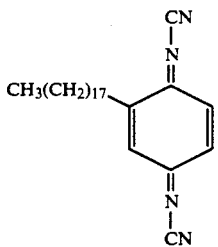

Organic thin film elements according to the present invention will now be described, with reference to the accompanying drawings, wherein D is a donor skeleton and A is an acceptor skeleton.

To form elements each consisting of monomolecular layers made of a compound having donor skeletons and monomolecular layers of a compound having acceptor skeletons, which are alternately laid upon one another, an apparatus is employed which has a trough and a partition dividing the trough into two parts to be used as two water baths for developing the first and second compounds into two strips of monomolecular, respectively. A gap is provided between the bottom of the trough and the lower edge of the partition. A substrate is passed through the gap from one bath into the other, and vice versa, so that the film of the first component and the film of the second component are alternately formed on the substrate.

EXAMPLE 30

Display Element

N-5β-cholanesulfonyl-N'-cyano-p-quinonediimine obtained in Example 24, which has acceptor skeleton, and N-cholestane-N-methyl-p-phenylenediamine obtained in Example 22, which has donor skeleton, were applied, thus manufacturing the display element shown in FIG. 5, as will be explained in detail.

First, a glass substrate (20 mm×30 mm×2 mm) consisting of a glass plate 1 and a transparent electrode 2 formed on the plate was degreased by washing, first with neutral detergent, then with trichloroethylene, and finally with acetone. The degreased substrate was immersed into the aqueous solution of cadmium chloride (concentration: $10^{-4}$ mol/l) filled in the trough. Chloroform solution of stearic acid was dripped onto the surface of the aqueous solution in the trough, and was subsequently developed into monomolecular film. The monomolecular film was compressed by using a Teflon bar until the surface pressure of the film became 25 dyn/cm. The substrate was pulled up from the trough, while maintaining the surface pressure at 25 dyn/cm by using the Teflon bar, whereby a layer of cadmium stearate was laid on transparent electrode 32. The substrate was repeatedly pulled down into the bath and pulled up therefrom, until five layers 33 of cadmium stearate were formed on transparent electrode 32.

Further, N-5β-cholanesulfonyl-N'-cyano-p-quinonediimine was dissolved in toluene, thus preparing a developing solution having a concentration of 1 mg/ml. This solution was dripped onto the surface of the water filled in first bath, thereby forming monomolecular film 34 on the surface of the water. The film was compressed until its surface pressure became 25 dyn/cm. The substrate was immersed into the first bath, and then pulled up therefrom, whereby the organic thin film 34 having acceptor skeleton A (i.e., quinonediimine skeleton) was laid on the uppermost layer 33 of cadmium stearate.

Then, N-cholestane-N-methyl-p-phenylenediamine was dissolved in toluene, thus preparing a developing solution having a concentration of 1 mg/ml. The developing solution was dripped onto the surface of the water filled in second bath of the apparatus, thereby forming monomolecular film 35 on the surface of the water. This film was compressed until its surface pressure changes to 25 dyn/cm. The substrate was immersed into the first bath, and then pulled up therefrom, whereby the organic thin film 35 having donor skeleton D (i.e., p-phenylenediamine skeleton) was laid on the organic thin film 34.

The processes described in the two preceding paragraphs are repeated, thus alternately forming other layers of organic thin film 34 and other layers of organic thin film 35. As a result, the super-lattice structure shown in FIG. 5 was formed.

Twenty layers 36 of polyisobutylmethacrylate were formed on the super-lattice structure. The entire structure, thus obtained, was left for three days within a dry box containing silica gel used as drying agent. Then, a gold electrode 37 was formed on the upper surface of the product. Although not shown in FIG. 5, two gold wires, either having a diameter of 0.3 mm and used as a lead, were connected to transparent electrode 32 and gold electrode 37, respectively, by means of silver paste.

FIG. 6 schematically shows the energy band of the super-lattice structure incorporated in the display element illustrated in FIG. 5. (Each pair of arrows directed in the opposite directions indicate the spinning of electrons.) The acceptor skeleton A (i.e., quinonediimine skeleton) in organic thin film 34 is at the distance of about few angstroms (Å) from the donor skeleton (i.e., p-phenylenediamine skeleton) in the adjacent organic thin film 35. The ionization potential Ip of the donor skeleton D is sufficiently low, but slightly greater than the electron affinity Ea of the acceptor skeleton A. Hence, when a bias is applied to the display element such that the acceptor skeleton A is positively charged, electrons will move from the donor skeleton D to the acceptor skeleton A, as is indicated by the curved, broken-line arrow. As a result, the superlattice structure has its light-absorbing characteristic altered, and can display data.

Actually, the display element shown in FIG. 5 was manufactured, and the element was connected to a power source such that transparent electrode 32 and gold electrode 37 were positively and negatively charged, respectively. In this condition, the light emitted from an incandescent lamp was applied to this display element. As long as no voltage is applied to the display element, the element appeared yellow. When a voltage of 8 V was applied to it, the element turned blue. The voltage of 8 V was repeatedly applied to the display element for two months at temperature of 30° C. and the humidity of 80%, the operating characteristic of the element remained unchanged.

EXAMPLE 31

Display Element

A display element of the same structure as is shown in FIG. 5 was manufactured, exactly in the same way as in Example 30, except that N-(2-octadecyl-eicosanyleicosanoyl)-N'-methylsulfonyl-p-quinonediimine, which was obtained in Example 1, was used as compound having an acceptor skeleton, in place of N-5-cholanesulfonyl-N'-cyano-p-quinonediimine.

This display element appears yellow when no voltage was applied to it, and turned blue when a voltage of 12 V was applied to it. The voltage of 12 V was repeatedly applied to the display element for two months at temperature of 30° C. and the humidity of 80%, the operating characteristic of the element remained unchanged.

EXAMPLE 32

Display Element

A display element of the same structure as is shown in FIG. 5 was manufactured, exactly in the same way as in Example 30, except that N-cholestane-N-methyl-N',N'-dihydroxylethyl-p-phenylenediamine, which was obtained in Example 23, was used as compound having a donor skeleton, in place of N-cholestane-N-methyl-p-phenylenediamine.

This display element appears yellow when no voltage was applied to it, and turned blue when a voltage of 12 V was applied to it. The voltage of 10 V was repeatedly applied to the display element for two months at temperature of 30° C. and the humidity of 80%, the operating characteristic of the element remained unchanged.

EXAMPLE 33

Muli-Value Element

N-5β-cholanesulfonyl-N'-cyano-p-quinonediimine obtained in Example 24, which has acceptor skeleton, and N-(2-octadecyl-eicosanoyl)-N'-methylsulfonyl-p-quinonediimine obtained in Example 1, which has also acceptor skeleton, and N-cholestane-N-methyl-p-pheylenediamine obtained in Example 22, which has donor skeleton, were used, thus forming a display element shown in FIG. 49 as will be described in greater detail.

First, a glass substrate (20 mm×30 mm×1 mm) consisting of a silicon substrate 411 and an aluminum electrode 412 formed on substrate 411 was degreased by washing, first with neutral detergent, then with trichloroethylene, and finally with acetone. The degreased substrate was immersed into the aqueous solution of cadmium chloride (concentration: $10^{-4}$ mol/l) filled in the trough. Chloroform solution of stearic acid was dripped onto the surface of the aqueous solution in the trough, and was subsequently developed into monomolecular film. The monomolecular film was compressed by using a Teflon bar until the surface pressure of the film became 25 dyn/cm. The substrate was pulled up from the trough, while maintaining the surface pressure at 25 dyn/cm by using the Teflon bar, whereby a layer 413 of cadmium stearate was laid on aluminum electrode 412. The substrate was repeatedly pulled down into the bath and pulled up therefrom, until three layers 413 of cadmium stearate were formed on aluminum electrode 412.

Further, N-5β-cholanesulfonyl-N'-cyano-p-quinonediimine and N-(2-octadecyl-eicosanoyl)-N'-methylsulfonyl-p-quinone-diimine were dissolved in toluene, thus preparing an equimolar developing solution having a concentration of 1 mg/ml. This developing solution was dripped onto the surface of the water filled in first bath of the same apparatus used in Example 30, thereby forming monomolecular film 414 on the surface of the water. The film was compressed until its surface pressure changes to 25 dyn/cm. The substrate was immersed into the first bath, and then pulled up therefrom, whereby the organic thin film 414 having acceptor skeleton A1 (i.e., quinonediimine skeleton) and acceptor skeleton A1 (i.e., quinonediimine skeleton) was laid on the uppermost layer 413 of cadmium stearate.

Then, N-cholestane-N-methyl-p-phenylenediamine was dissolved in toluene, thus preparing a developing solution having a concentration of 1 mg/ml. The developing solution was dripped onto the surface of the water filled in second bath of the apparatus, thereby forming monomolecular film 415 on the surface of the water. This film was compressed until its surface pressure changes to 25 dyn/cm. The substrate was immersed into the first bath, and then pulled up therefrom, whereby the organic thin film 415 having donor skeleton D (i.e., p-phenylenediamine skeleton) was laid on the organic thin film 414.

The processes described in the two preceding paragraphs are repeated, thus alternately forming other layers of organic thin film 414 and other layers of organic thin film 415. As a result, the super-lattice structure shown in FIG. 49 was formed.

Twenty layers 416 of polyisobutylmethacrylate were formed on the super-lattice structure. The entire structure, thus obtained, was left for three days within a dry box containing silica gel used as drying agent. Then, a gold electrode 417 was formed on the upper surface of the product. Although not shown in FIG. 49, two gold wires, either having a diameter of 0.3 mm and used as a lead, were connected to transparent electrode 412 and gold electrode 417, respectively, by means of silver paste.

Figure 49:
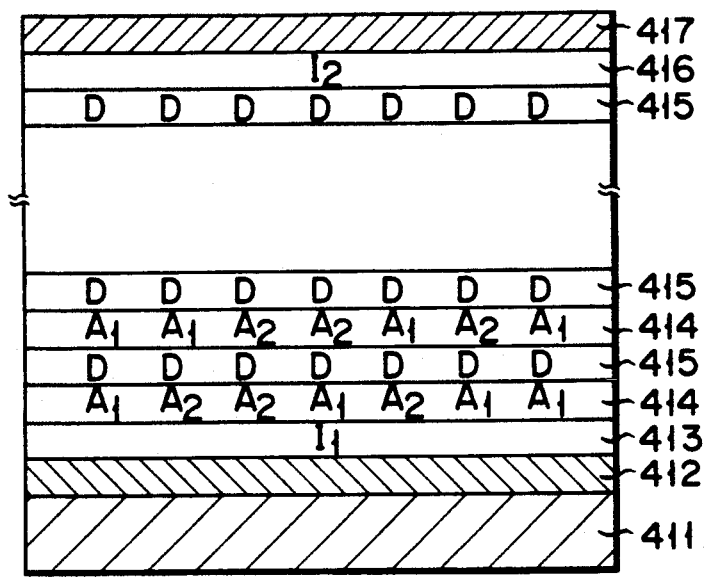
Figure 50:
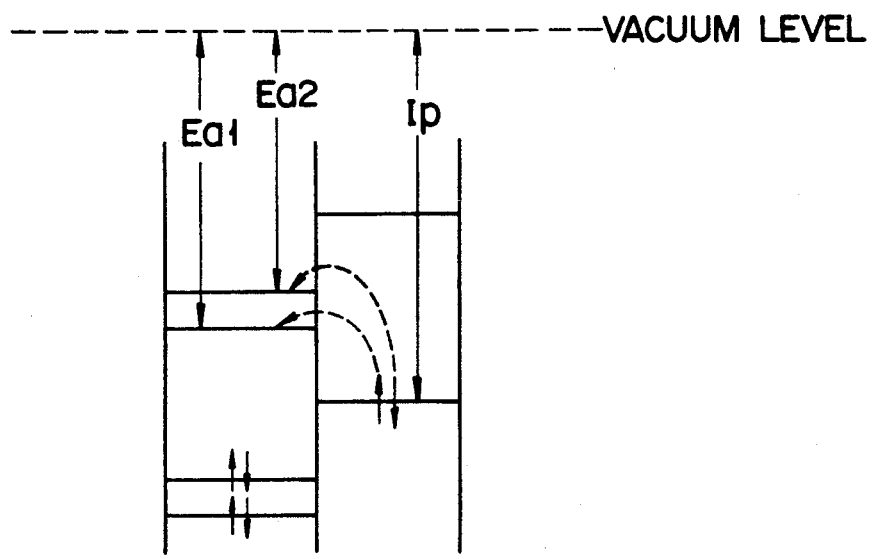

FIG. 50 schematically shows the energy band of the super-lattice structure incorporated in the display element illustrated in FIG. 49. The acceptor skeletons A1 and A2 (either being quinonediimine skeleton) in organic thin film 414 are at the distance of about few angstroms (Å) from the donor skeleton D (i.e., p-phenylenediamine skeleton) in the adjacent organic thin film 415. The ionization potential Ip of the donor skeleton D is sufficiently low, but slightly greater than the electron affinity Ea1 of the acceptor skeleton A1 and the electron affinity Ea1 of the acceptor skeleton A2. Hence, when a bias is applied to the display element such that the acceptor skeleton A is positively charged, electrons will move from the donor skeleton D to the acceptor skeleton A1 at voltage V1, and then electrons will move from donor skeleton D to the acceptor skeleton A2 at voltage V2, as is indicated by the curved, broken-line arrows. Since the electrical conductivity with respect to the direction perpendicular to the film depends upon the concentration of electrons and holes within the film, it can be predicted that the conductivity of this element increases stepwise at voltages V1 and V2.

Figure 51:
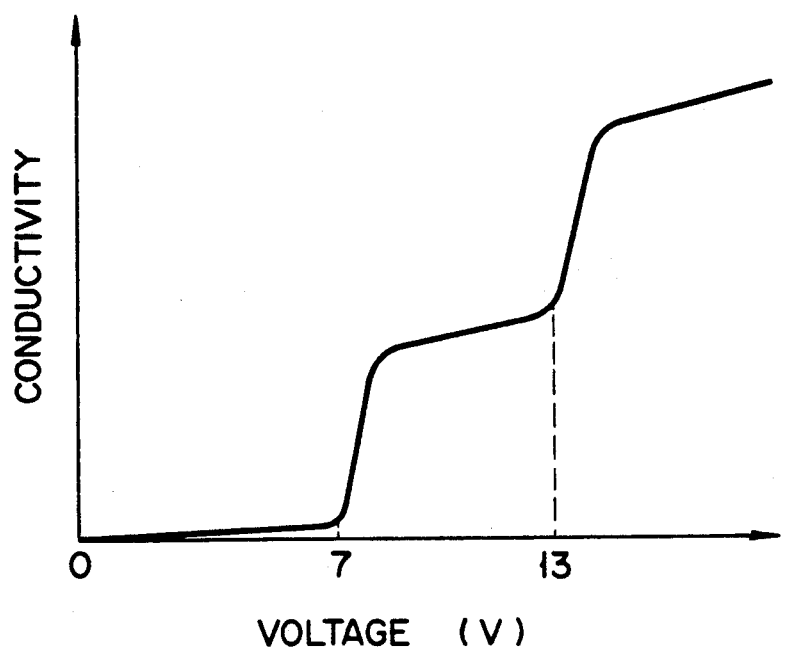

Actually, the display element shown in FIG. 49 was manufactured, and the element was connected to a power source such that aluminum electrode 412 and gold electrode 417 were positively and negatively charged, respectively. Then, the electrical conductivity of this multi-value element increased stepwise, first at voltage of 7 V, then at voltage of 13 V, as is illustrated in FIG. 51. When the multi-value element was repeatedly operated for two months at temperature of 30° C. and the humidity of 80%, the operating characteristic of the element remained unchanged. Therefore, the element can be used as a multi-value logic element or a multi-value memory element.

EXAMPLE 34

Multi-Value Element

N-5β-cholanesulfonyl-N'-cyano-p-quinonediimine obtained in Example 24, which has acceptor skeleton, N-cholestane-N-methyl-p-phenylenediamine obtained in Example 22, which has donor skeleton, and ferrocenepropionic acid dioctadecyl obtained in Example 10, which has also donor skeleton, were used in an equimolar amount, manufacturing a multi-value element in the same way as in Example 33.

This multi-value element had its electrical conductivity changed stepwise, first at 7 V and then at 11 V. When the multi-value element was repeatedly operated for two months at temperature of 30° C. and the humidity of 80%, the operating characteristic of the element remained unchanged.

EXAMPLE 35

Field-Effect Transistor

A field-effect transistor (n-channel MOSFET) of the structure shown in FIG. 45 was manufactured, by using N-cholestane-N-methyl-p-phenylenediamine obtained in Example 22, which has donor skeleton, as will be described in detail.

Figure 45:
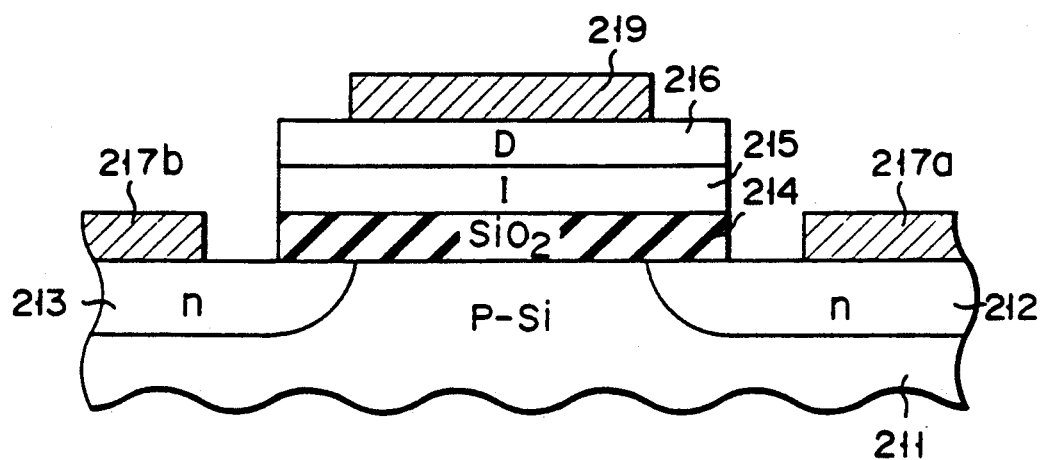

First, as is shown in FIG. 45, n-type source region 212 and n-type drain region 213 were formed in the surface of p-type silicon substrate 211. Oxide film 214 having a thickness of 100A was formed on the gate portion of silicon substrate 211. Insulation film 215 consisting of stacked layers of polyisobutylmethacrylate was formed on oxide film 214. Further, organic dye thin film 216 consisting of stacked layers of N-cholestane-N-methyl-p-pheylenediamine was formed on insulation film 215. Gold electrode 217 was mounted on organic dye thin film 216. Source electrode 217a and drain electrode 217b are formed on source region 212 and drain region 213, respectively. Both insulation film 215 and organic dye thin film 216 were made by the LB method.

Figure 52:
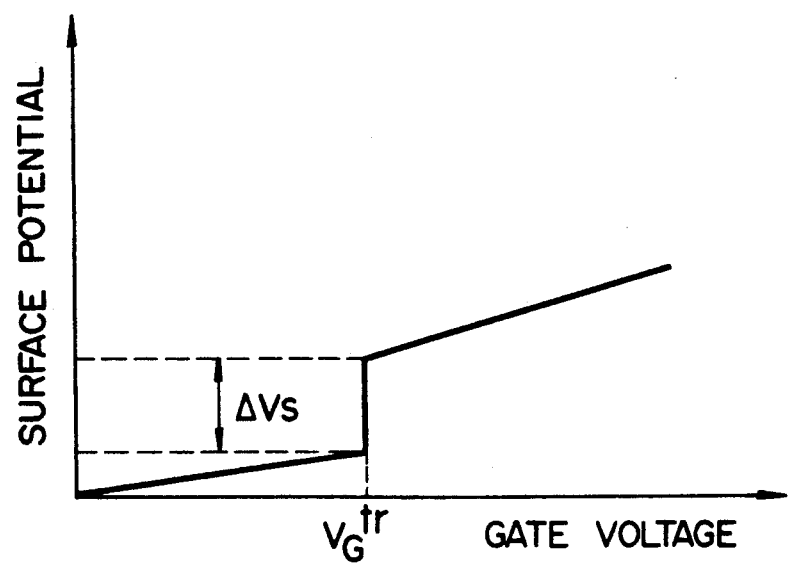

FIG. 52 represents the relationship between the gate voltage $V_G$ and the surface voltage $V_S$ of substrate 211 of the MOSFET. As can be understood from FIG. 52, when the gate voltage rises to value $V_G{}^{tr}$, electrons will move from the donor skeleton of organic dye thin film 216 to gold gate electrode 217, and the surface voltage $V_S$ abruptly increases by $\Delta V_S$. $V_G{}^{tr}$ and $\Delta V_S$ were 1.5 V and 0.5 V, respectively. When the MOSFET was repeatedly operated for two months at temperature of 30° C. and the humidity of 80%, the operating characteristic of the element remained unchanged.

FIG. 53 illustrates the relationship between the drain current and drain voltage of this MOSFET, and FIG. 54 shows the relationship between the drain current and gate voltage of the MOSFET. As is evident from these figures, the drain current quickly increased when the gate voltage $V_G$ was equal to threshold value of $V_G{}^{tr}$. This means that the MOSFET can be used as an efficient switching element.

EXAMPLE 36

Field-Effect Transistor

A field-effect transistor (p-channel MOSFET) of the structure shown in FIG. 46 was manufactured, by using N-5β-cholanesulfonyl-N'-cyano-p-quinonediimine prepared in Example 24, which has acceptor skeleton skeleton, as will be described in detail.

Figure 46:
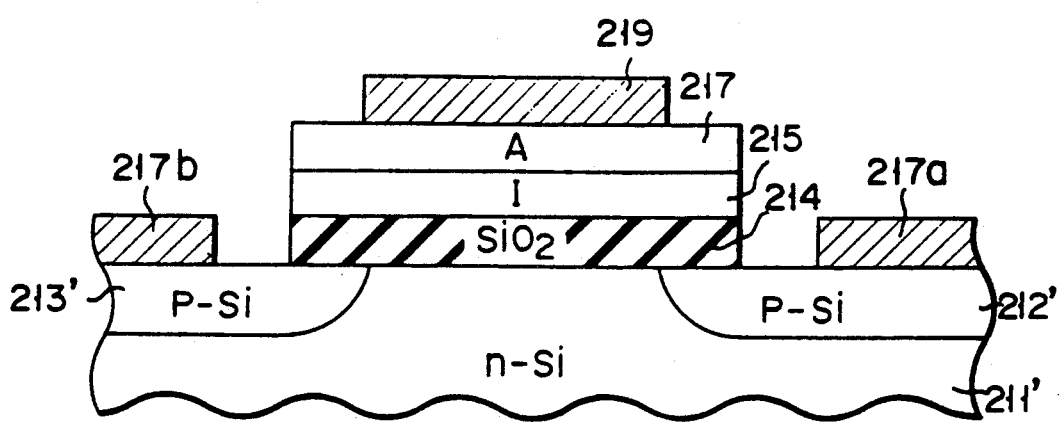

First, as is shown in FIG. 46, p-type source region 212' and p-type drain region 213' were formed in the surface of n-type silicon substrate 211'. Oxide film 214 having a thickness of 100A was formed on the gate portion of silicon substrate 211'. Insulation film 215 consisting of thin layers of polyisobutylmethacrylate was formed on oxide film 214. Further, organic dye thin film 46 consisting of thin layers of N-5-cholanesulfonyl-N'-cynano-p-quinonediimine was formed on insulation film 215. Gold electrode 219 was mounted on organic dye thin film 216. Source electrode 217a and drain electrode 217b are formed on source region 212' and drain region 213', respectively. Both insulation film 215 and organic dye thin film 217 were made by the LB method.

In the case of the p-channel MOSFET (FIG. 29), $V_G{}^{tr}$ and $\Delta V_S$ were $-1.3$ V and 0.6 V, respectively. When this MOSFET was repeatedly operated for two months at temperature of 30° C. and the humidity of 80%, the operating characteristic of the element remained unchanged.

EXAMPLE 37

Field Effect Transistor

Figure 55:
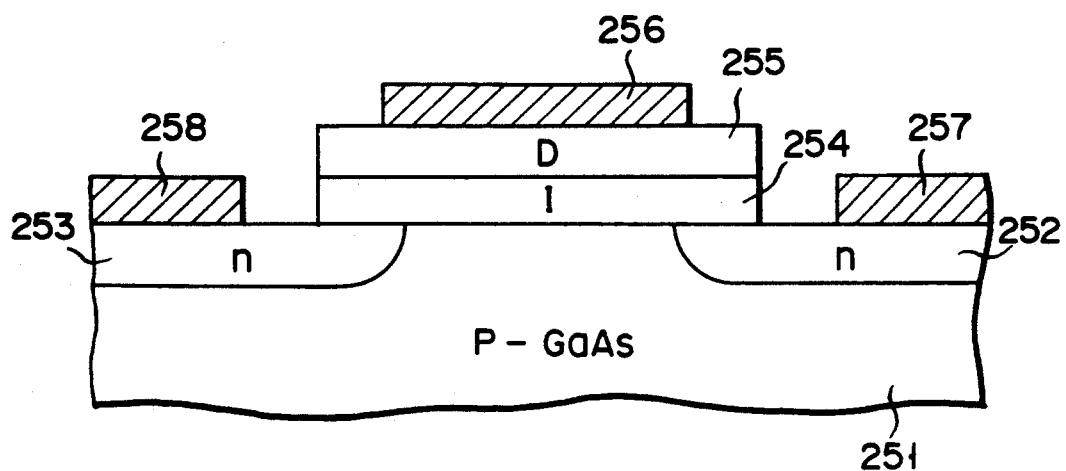

An n-channel GaAs MISFET of the structure shown in FIG. 55 was manufactured by using N-cholestane-N-methyl-p-phenylenediamine obtained in Example 22, which has donor skeleton. More specifically, as is shown in FIG. 55, n-type source region 252 and n-type drain region 253 were formed in the surface of p-type GaAs substrate 251. Insulation film 254 consisting of stacked layers of polyisobutylmethacrylate was formed on the gate portion of substrate 251. Organic dye thin film 255 made up of stacked layers N-cholestane-N-methyl-p-phenylenediamine was formed on insulation film 254. Gold gate electrode 256 was mounted on organic dye thin film 255. Source electrode 257 and drain electrode 258 were formed on source region 252 and drain region 253, respectively. Both insulation film 254 and organic dye thin film 255 were made by the LB method.

When this GaAs MISFET was repeatedly operated for two months at temperature of 30° C. and the humidity of 80%, the operating characteristic of the element remained unchanged.

EXAMPLE 38

Field-Effect Transistor

A MOSFET of the same type as that of Example 35 was manufactured in the same way, except that N-cholestane-N-methyl-p-phyenylenediamine obtained in Example 22, which has donor skeleton, ferrocenepropyionic acid dioctadecyl obtained in Example 10, which also has donor skeleton, were used in an equimolar amount.

Figure 56:
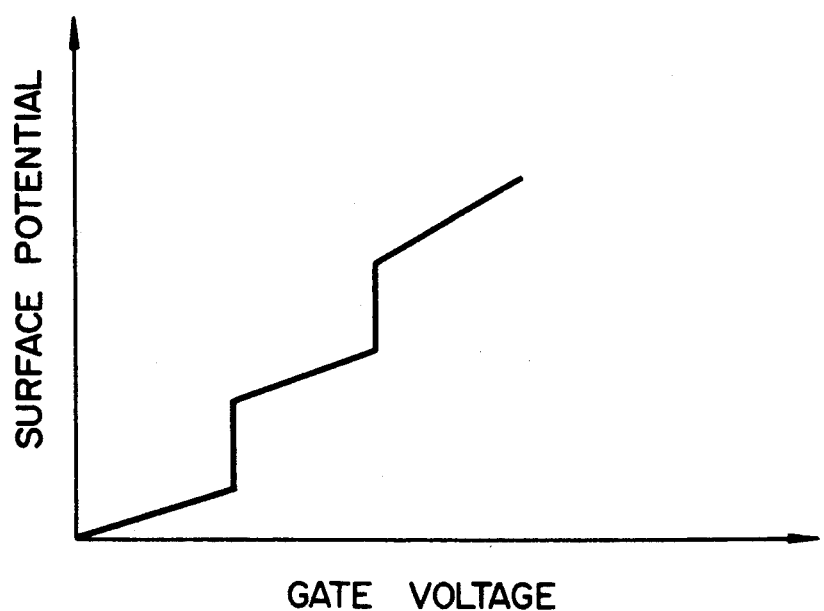

As is shown in FIG. 56, as the gate voltage $V_G$ of this MOSFET rises, the surface voltage $V_S$ increased twice abruptly. Hence, the MOSFET can be used as a multi-value logic element or a multi-value memory element.

EXAMPLE 39

Field-Effect Transistor

Figure 29:
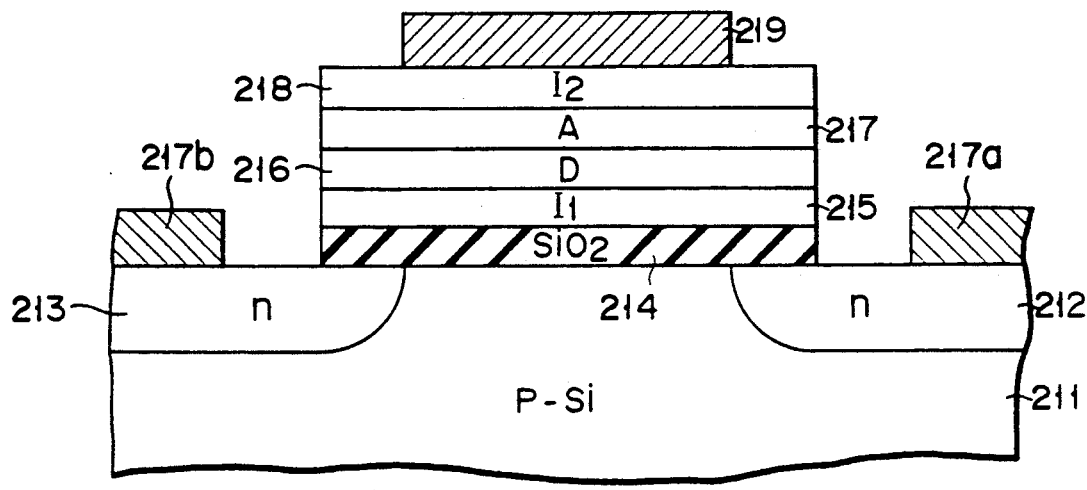

An n-channel MOSFET having the structure shown in FIG. 29 was manufactured, by using N-cholestane-n-methyl-p-phenylenediamine obtained in Example 22, which has donor skeleton, and N-5β-cholanesulfonyl-N'-cyano-p-quinonediimine prepared in Example 24, which has acceptor skeleton. More specifically, as is illustrated in FIG. 29, n-type source region 212 and n-type drain region 213 were formed in the surface of p-type silicon substrate 211. Oxide film 214 having a thickness of 100Å was formed on the gate portion. Insulation film 215 was then formed on oxide film 214. This film 215 was made of stacked layers of polyisobutylmethacrylate, laid one upon another. Organic dye thin film 216 made up of stacked layers of N-cholestane-N-methyl-p-phenylenediamine, laid on upon another, was formed on insulation film 215. Further, organic dye thin film 217 made up of stacked layers of N-5-cholane-sulfonyl-N'-cyano-p-quinonediimine, laid on upon another, was formed on insulation film 216. Insulation film 218 was formed on organic dye thin film 216. Insulation film 218 was formed of layers of polyisobutylmethacrylate, laid one upon another. Gold gate electrode 219 was formed on this insulation film 218. Source electrode 217a and drain electrode 217b were formed on source region 212 and drain region 213, respectively. Both insulation films 215 and 218, and both organic dye thin films 216 and 217 were made by the LB method.

Figure 30:
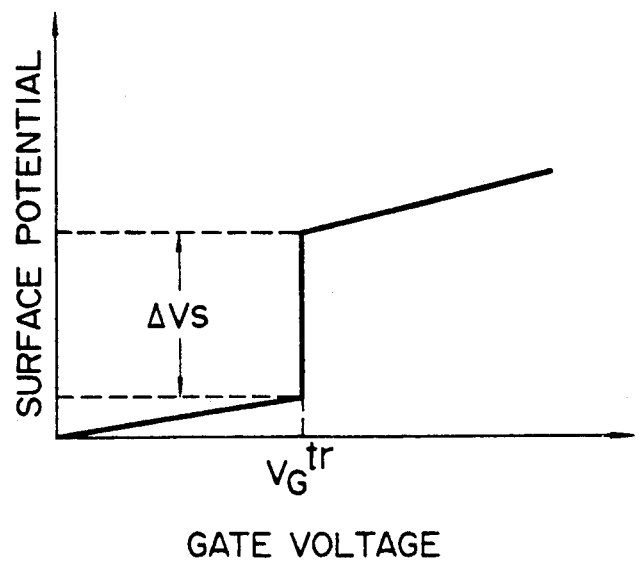
Figure 31:
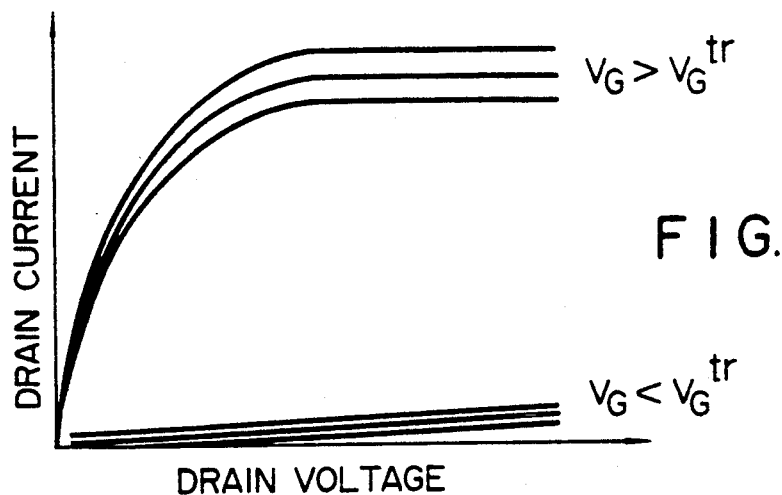
Figure 32:
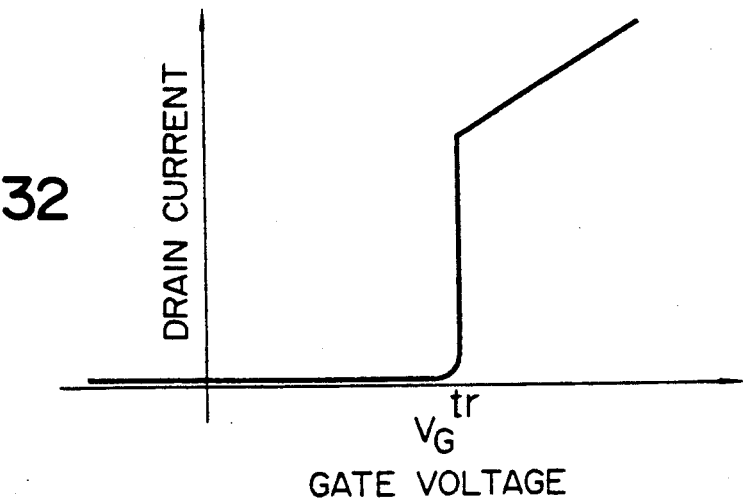
Figure 33:
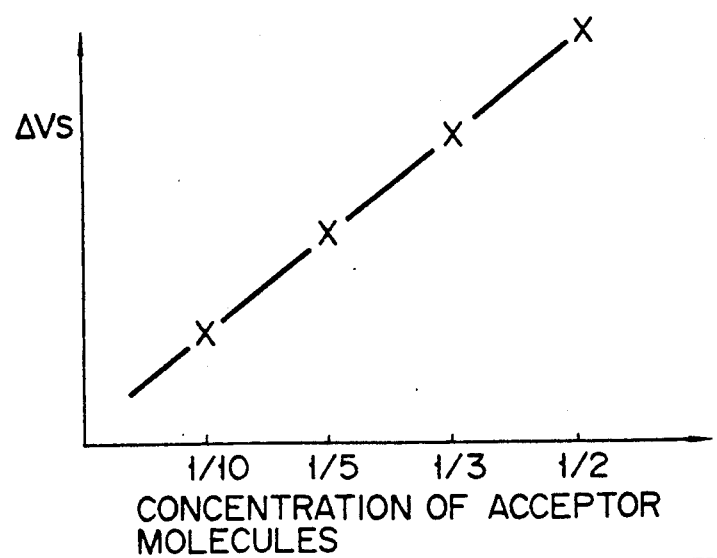
Figure 34:
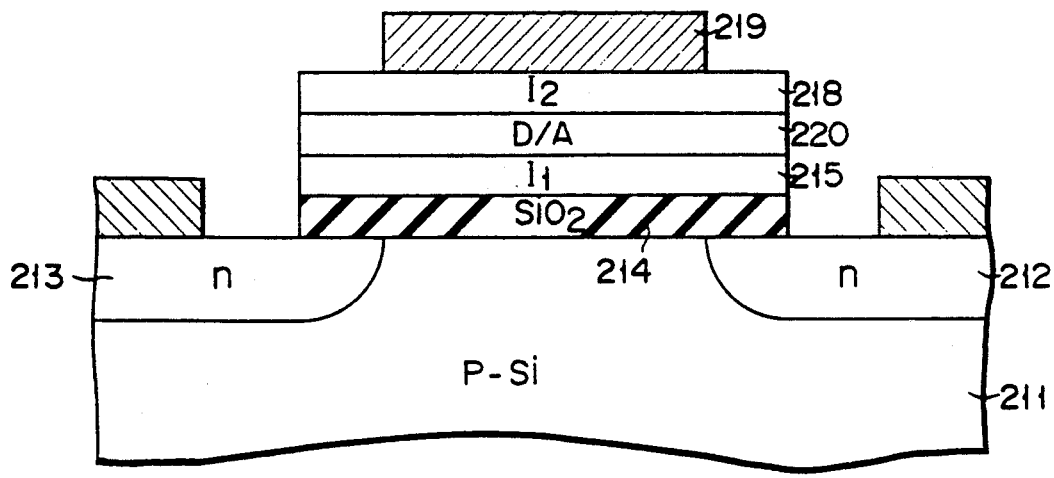
Figure 35:
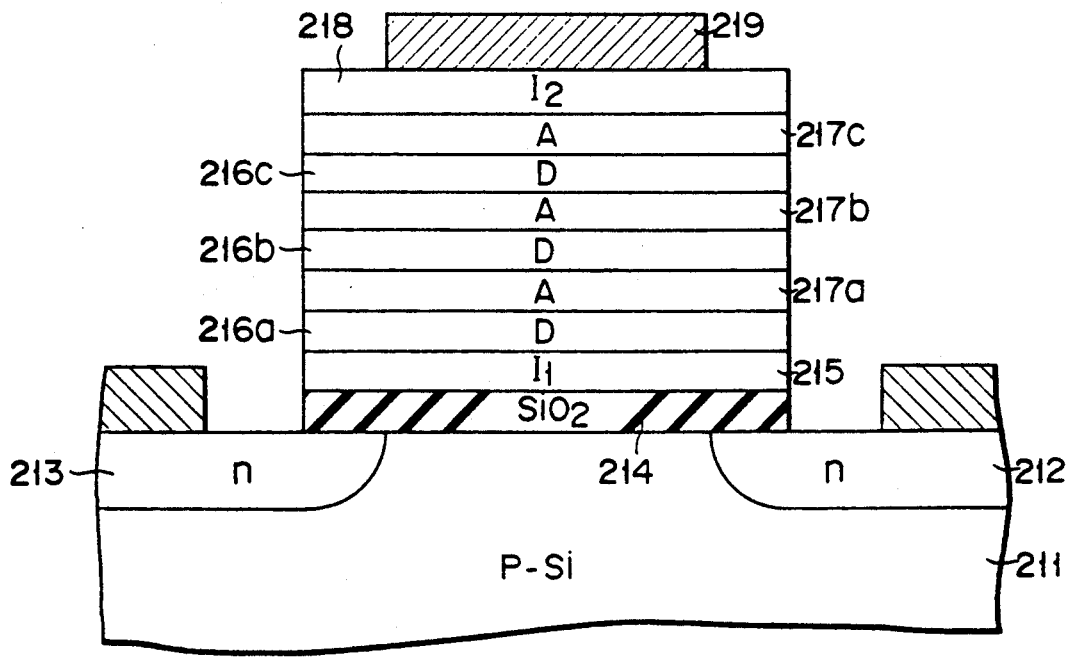
Figure 37:
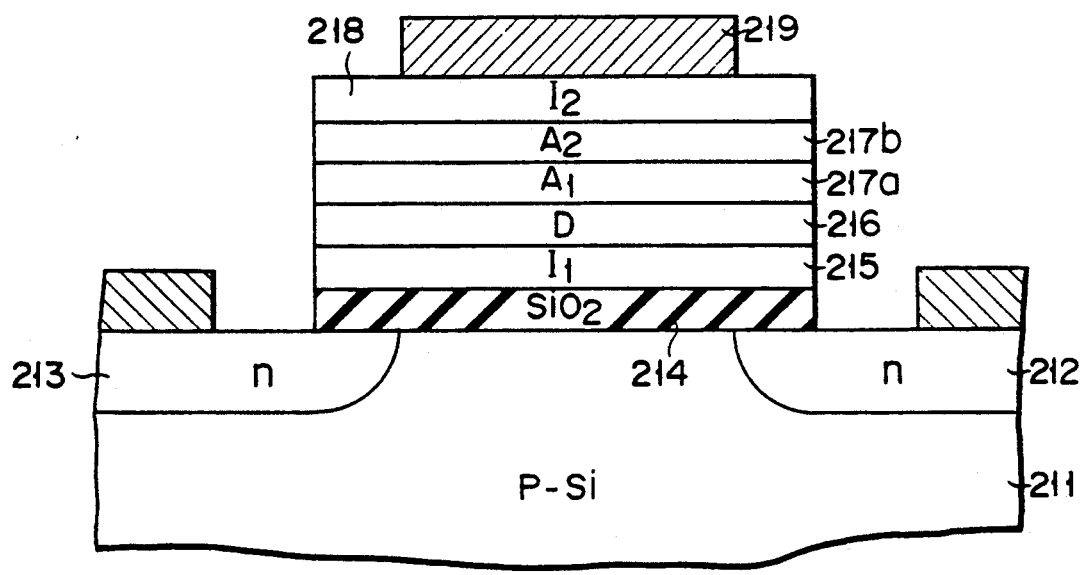
Figure 38:
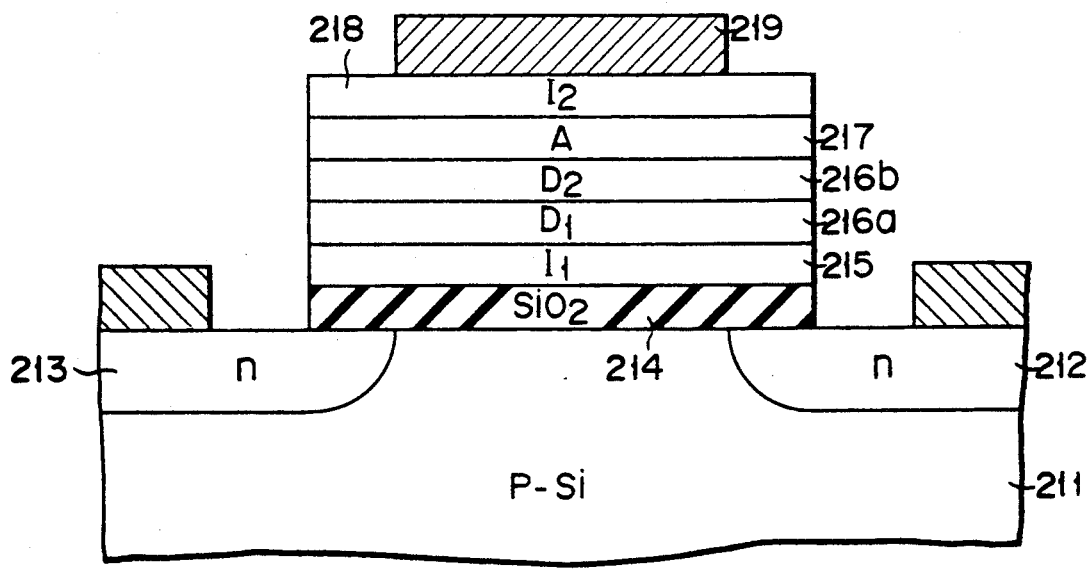
Figure 39:
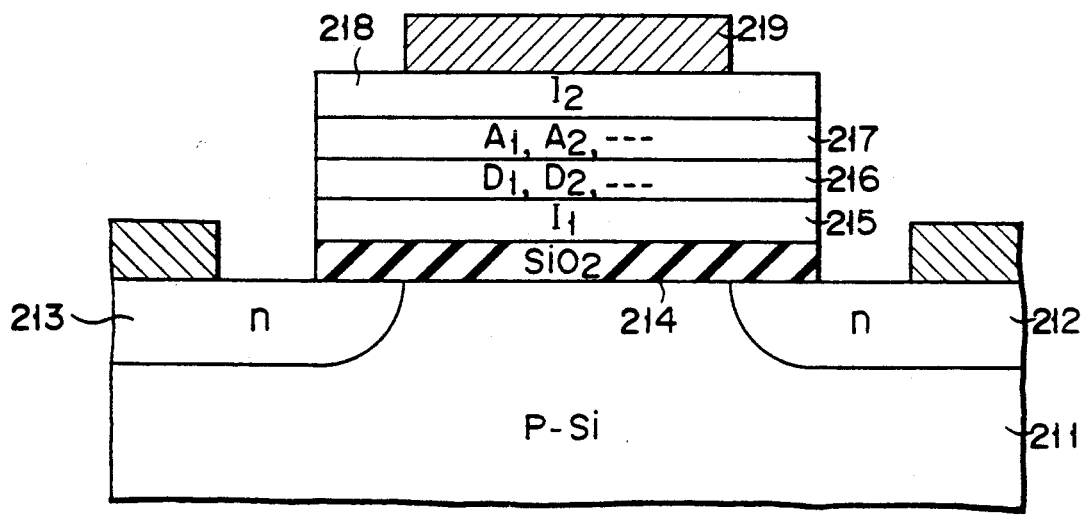
Figure 40:
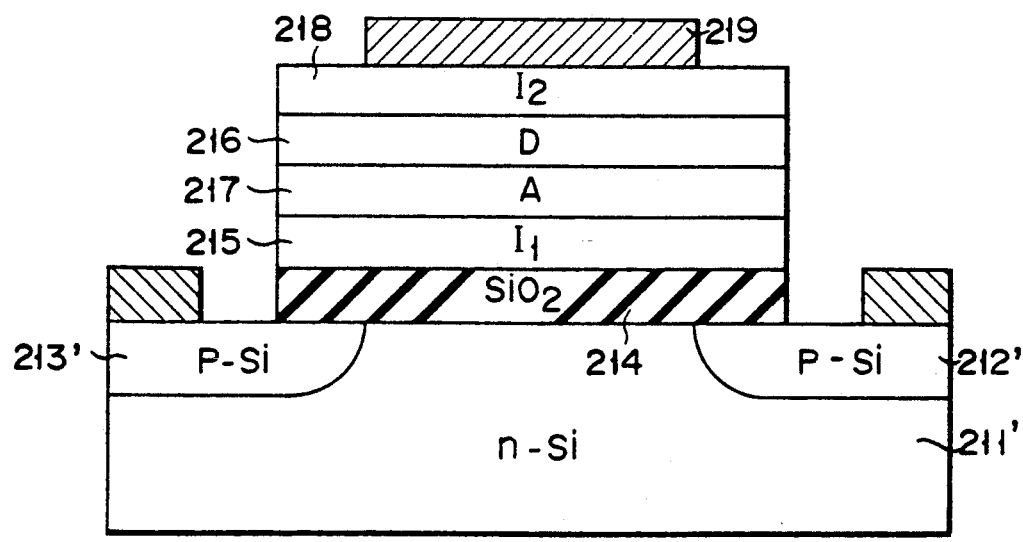
Figure 41:
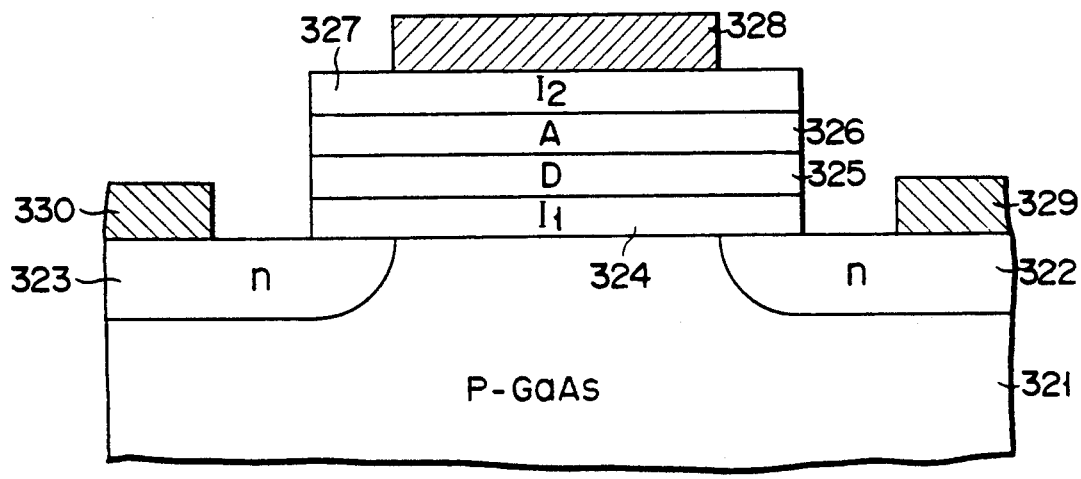
Figure 42:
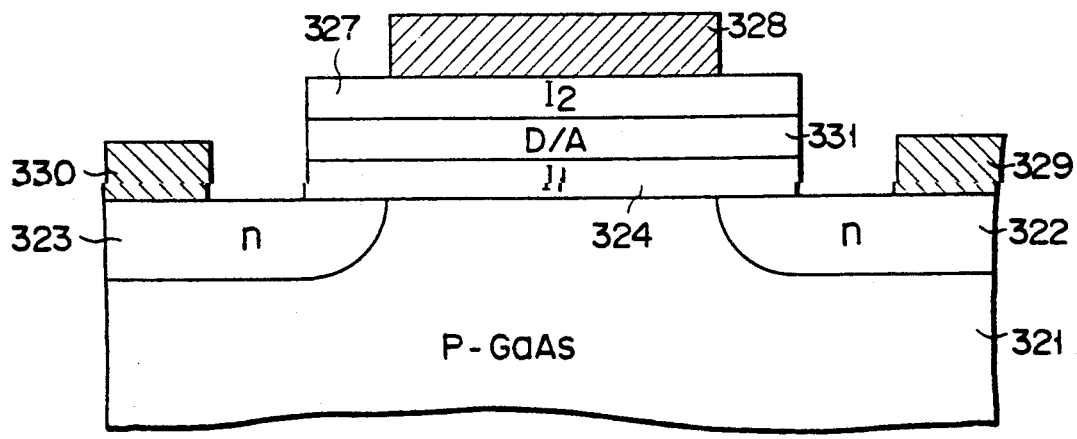
Figure 43:
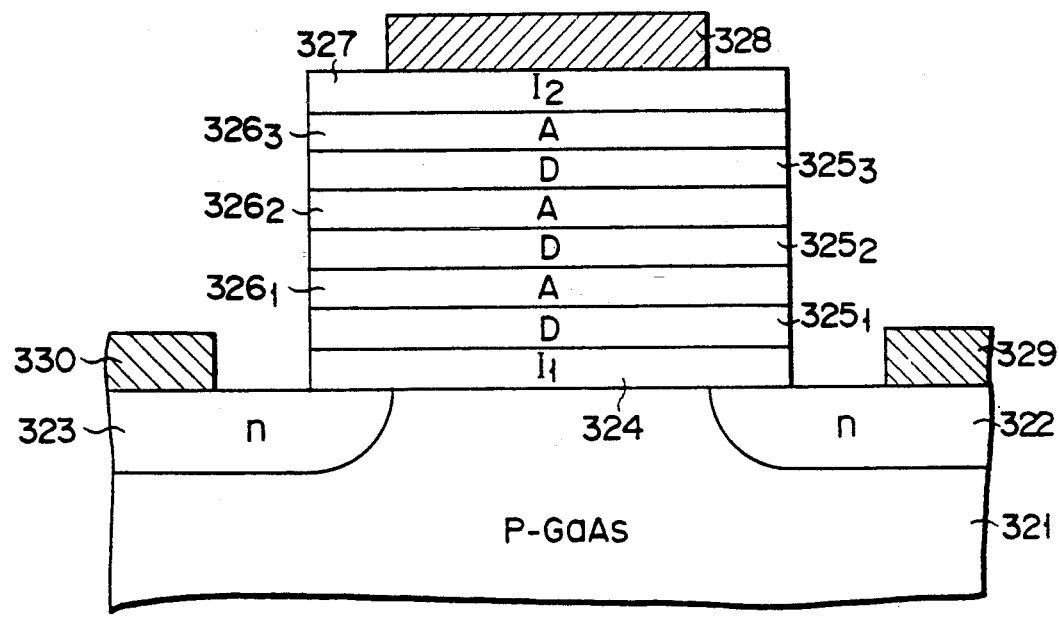
Figure 44:
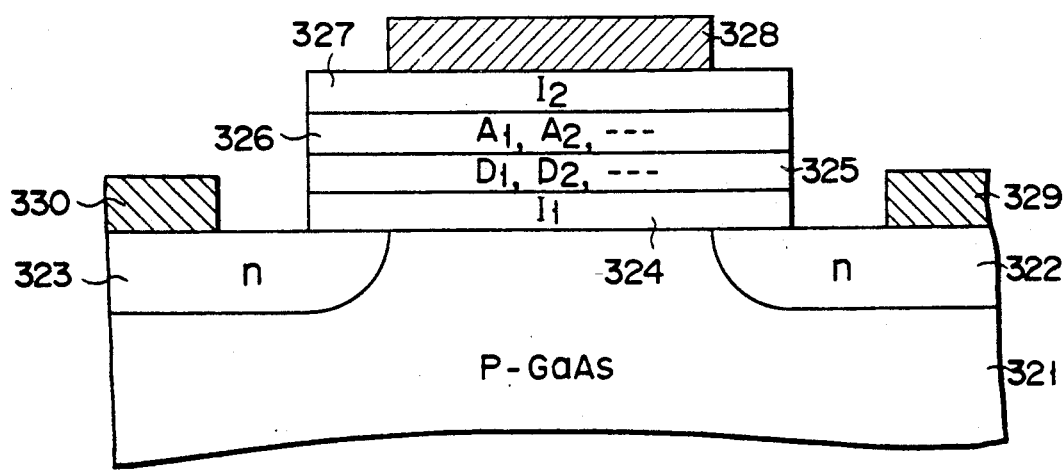

FIG. 30 represents the relationship between the gate voltage $V_G$ of the MOSFET (FIG. 29) and the surface voltage $V_S$ of substrate 211. As can be understood from this figure, when the gate voltage rises to a specific value $V_G{}^{tr}$, electrons will move from the donor skeleton of film 216 to the acceptor skeleton of film 217, whereby the surface voltage $V_S$ abruptly increases by $\Delta V_S$. This means that the MOSFET can function as a switching element.

$V_G{}^{tr}$ and $\Delta V_G{}^S$ were 1.2 V and 1.0 V. When this MISFET was repeatedly operated for two months at temperature of 30° C. and the humidity of 80%, the operating characteristic of the element remained unchanged.

CONTROL 4

A MOSFET of the same structure as Example 35 was manufactured in the same way, except that N-octadecyl-p-phenylenediamine which has donor skeleton was used in stead of N-cholestane-N-methyl-p-phenylenediamine. This MOSFET operated substantially in the same manner for some time, but when it was repeatedly for two months at temperature of 30° C. and the humidity of 80%, its operating characteristic deteriorated and became unstable.

As has been described in detail, the present invention can provide organic thin film made of dye compound molecules which can be easily synthesized and which can form LB film by themselves, though the molecules have bulky hydrophobic groups. Moreover, the invention can provide an organic dye thin film element comprising the organic thin film, whose operating characteristics little changes with time and which is, therefore, reliable.

What is claimed is:

1. An organic thin film comprising molecules of at least one dye compound selected from the group consisting of the compounds represented by the following general formulae:

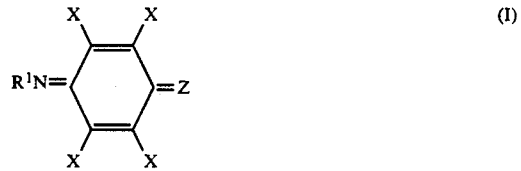
(I)

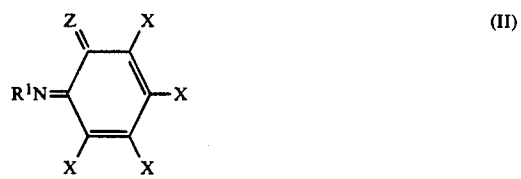
(II)

where X is hydrogen atom, a methyl group, or a halogen atom, $R^1$ is an electron attractive group substituted with a hydrophobic group, having 12 or more carbon atoms, and having the formula R R , wherein R° is a hydrophobic group and R°° is an electron attractive group, Z is either O or $NR^2$, and $R^2$ is an electron attractive group or an electron attractive group substituted with an organic group having 1 to 50 carbon atoms; and

R—(DS)    (III)

where R is an organic hydrophobic group terminated with two long chain alkyl groups represented by the formula:

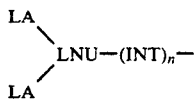

where each LA is a long chain alkyl group, LNU is a non-hydrolyzable linking unit, INT is an intervening group, and n is 0 or 1, or R is an organic hydrophobic group having a steroid carbon skeleton, and DS is a dyestuff group having a dye skeleton of tetracyanoquinodimethane, N,N'-dicyanoquinonediimine, N-cyanoquinoneimine, benzoquinone, phenylenediamine, tetrathiafulvalene, tetraselenafulvalene, ferrocene, phthalocyanine, or porphyrin.

2. The thin film according to claim 1, which is in the form of a monomolecular layer.

3. The thin film according to claim 1, which is in the form of a plurality of stacked monomolecular layers.

4. The thin film according to claim 1, wherein said $R^1$ is non-hydrolyzable.

5. The thin film according to claim 1, wherein said $R^1$ is non-hydrolyzable.

6. The thin film according to claim 1, wherein said $R^1$ has up to 100 carbon atoms.

7. The thin film according to claim 1, wherein said $R^1$ is terminated with two alkyl groups.

8. The thin film according to claim 1, wherein said $R^1$ has steroid carbon skeleton.

9. The thin film according to claim 1, wherein said DS is the tetracyanoquinodimethane skeleton.

10. The thin film according to claim 1, wherein said DS is the N, N'-dicyanoquinonediimine skeleton.

11. An organic thin film functional element comprising the organic thin film of claim 1 as a constituent.

12. An optical recording device comprising:
a recording medium comprising a thin organic film layer, including a first thin organic film containing donor molecules and a second thin organic film containing acceptor molecules, for recording as information a change in optical characteristics, caused upon charge transfer between said donor and acceptor molecules, wherein at lest one of said first and second thin organic films includes different donor and acceptor molecules, respectively; and
means for irradiating said thin organic film layer to perform information writing and erasing:
wherein said thin organic film layer comprises plural repeatedly stacked layers each comprising said first thin organic film containing donor molecules and said second thin organic film containing acceptor molecules, and an insulating molecule film sandwiches between said first and second thin organic films, and
wherein said acceptor molecules are selected from molecules of dye compounds represented by the formulas:

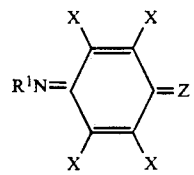

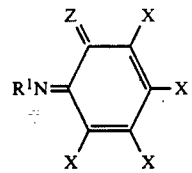

where X is independently a hydrogen atom, methyl group or a halogen atom, $R^1$ is an electron-attractive group substituted with an organic hydrophobic group, having 12 or more carbon atoms, and having the formula R R , wherein $R°$ is a hydrophobic group and $R°°$ is an electron attractive group, Z is O or $NR^2$, $R^2$ is an electron-attractive group or an electron-attractive group substituted with an organic group having 1 to 50 carbon atoms; and $$R'—(DS) \quad \text{(III-a)}$$

wherein R' is an organic hydrophobic group terminated with two long-chain alkyl groups represented by the formula:

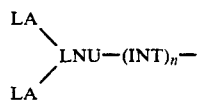

where each LA is a long chain alkyl group, LNU is a non-hydrolyzable linking group, INT is an intervening group and n is 0 or 1, or R' is an organic hydrophobic group having a steroid carbon skeleton, and DS is a dyestuff radical having tetracyanoquinodimethane, N,N-dicyanoquinonediimine, N-cyanoquinoneimine, or benzoquinone dye skeleton; and
said donor molecules are selected from molecules of dye compounds represented by the formula:

$$R''—(DS) \quad \text{(III-b)}$$

where R" is an organic hydrophobic group terminated with two long-chain alkyl groups represented by the formula:

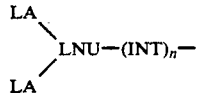

where each LA is a long chain alkyl group, LNU is a non-hydrolyzable linking group, INT is an intervening group and n is 0 or 1, or R" is an organic hydrophobic group having a steroid carbon skeleton, and DS is a dyestuff radical having a phenylenediamine, tetrathiafulvalene, tetraselenafulvalene, ferrocene, phthalocyanine or porphyrin dye skeleton.

13. The thin film according to claim 1, wherein said thin film comprises molecules of at least one dye compound selected from the group consisting of the compounds represented by formulas (I) and (II).

14. The device according to claim 12, wherein said acceptor molecules are selected from molecules of dye compounds represented by the formulas (I) and (II).

* * * * *